United States Patent
Frick

(10) Patent No.: US 10,166,489 B2
(45) Date of Patent: *Jan. 1, 2019

(54) METHODS AND SYSTEMS FOR HEATING AND MANIPULATING FLUIDS

(71) Applicant: Phoenix Caliente LLC, Houston, TX (US)

(72) Inventor: Franklin Alan Frick, Houston, TX (US)

(73) Assignee: Phoenix Caliente, LLCDE (US)

( * ) Notice: Subject to any disclaimer, the term of this patent is extended or adjusted under 35 U.S.C. 154(b) by 1197 days.

This patent is subject to a terminal disclaimer.

(21) Appl. No.: 14/026,842

(22) Filed: Sep. 13, 2013

(65) Prior Publication Data

US 2014/0021033 A1 Jan. 23, 2014
US 2017/0225099 A9 Aug. 10, 2017

Related U.S. Application Data

(60) Division of application No. 13/947,082, filed on Jul. 21, 2013, now Pat. No. 9,776,102, which is a division of application No. 13/555,122, filed on Jul. 21, 2012, which is a continuation-in-part of application No. 13/467,551, filed on May 9, 2012, and a continuation-in-part of application No. 13/069,363, filed on Mar. 22, 2011, said application No. 13/467,551 is a continuation-in-part of application No. 13/069,363, said application No. 13/555,122 is a continuation-in-part of application No. 12/638,984, filed on Dec. 16, 2009, now Pat. No. 8,371,251, said application No. 13/069,363 is a continuation-in-part
(Continued)

(51) Int. Cl.
| | |
|---|---|
| B01D 3/06 | (2006.01) |
| B01D 3/00 | (2006.01) |
| B01D 1/00 | (2006.01) |
| C02F 1/16 | (2006.01) |

(52) U.S. Cl.
CPC .......... B01D 3/007 (2013.01); B01D 1/0058 (2013.01); B01D 3/06 (2013.01); C02F 1/16 (2013.01)

(58) Field of Classification Search
CPC ... B01D 3/007; B01D 3/06; C02F 1/12; C02F 1/16; F22B 1/18; F22B 1/1807; F01K 27/02
See application file for complete search history.

(56) References Cited

U.S. PATENT DOCUMENTS

| | | |
|---|---|---|
| 2,156,333 A | 5/1939 | Cross |
| 3,198,191 A | 8/1965 | Wyszomirski |

(Continued)

OTHER PUBLICATIONS

Leader Energy Services LTD., Flameless Hot Oiler/Pumping Unit, 2004, 4 pgs, Canada.
(Continued)

Primary Examiner — Jonathan Miller
(74) Attorney, Agent, or Firm — Jones Walker, LLP

(57) ABSTRACT

Systems and methods are provided for heating and manipulating a fluid to heat the fluid, evaporate water from the fluid, concentrate the fluid, separate the fluid into fractions; and/or pasteurize the fluid, comprising a closed-loop heating subsystem coupled to a primary fluid-to-fluid heat exchanger, and one or more fluid manipulation subsystems also coupled to the primary fluid-to-fluid heat exchanger.

19 Claims, 28 Drawing Sheets

Related U.S. Application Data of application No. 12/638,984, filed on Dec. 16, 2009, now Pat. No. 8,371,251, which is a continuation-in-part of application No. 12/615,331, filed on Nov. 10, 2009, and a continuation-in-part of application No. 11/934,645, filed on Nov. 2, 2007, and a continuation-in-part of application No. 11/764,270, filed on Jun. 18, 2007, said application No. 12/615,331 is a continuation of application No. 11/748,475, filed on May 14, 2007, now Pat. No. 7,614,367, said application No. 11/764,270 is a continuation of application No. 11/741,570, filed on Apr. 27, 2007, said application No. 12/638,984 is a continuation-in-part of application No. 11/738,644, filed on Apr. 23, 2007.

(60) Provisional application No. 61/510,485, filed on Jul. 22, 2011, provisional application No. 61/484,210, filed on May 9, 2011, provisional application No. 61/316,362, filed on Mar. 22, 2010, provisional application No. 61/249,841, filed on Oct. 8, 2009, provisional application No. 60/883,178, filed on Jan. 3, 2007, provisional application No. 60/864,160, filed on Nov. 2, 2006, provisional application No. 60/800,495, filed on May 15, 2006, provisional application No. 60/795,983, filed on Apr. 28, 2006, provisional application No. 60/794,413, filed on Apr. 24, 2006.

(56) References Cited

U.S. PATENT DOCUMENTS

| | | | |
|---|---|---|---|
| 3,243,359 A | 3/1966 | Schmidt | |
| 3,345,272 A | 10/1967 | Collins | |
| 3,533,480 A | 10/1970 | Chenevert | |
| 3,757,909 A | 9/1973 | McClure | |
| 3,791,349 A | 2/1974 | Schaefer | |
| 3,844,899 A | 10/1974 | Sager, Jr. | |
| 4,027,631 A | 6/1977 | Lavery | |
| 4,196,854 A | 4/1980 | Prucyk | |
| 4,264,826 A * | 4/1981 | Ullmann | F01K 17/005 |
| | | | 122/26 |
| 4,273,075 A | 6/1981 | Freihage | |
| 4,303,478 A | 12/1981 | Field | |
| 4,370,885 A | 2/1983 | Alekhin | |
| 4,377,443 A | 3/1983 | Tuck et al. | |
| 4,438,729 A | 3/1984 | Loesch et al. | |
| 4,458,633 A | 7/1984 | Loesch et al. | |
| 4,483,277 A | 11/1984 | Perkins | |
| 4,494,524 A | 1/1985 | Wagner | |
| 4,576,122 A | 3/1986 | Marcato | |
| 4,651,681 A | 3/1987 | Perkins | |
| 4,693,304 A | 9/1987 | Volland | |
| 4,746,610 A | 5/1988 | Smith | |
| 4,779,575 A | 10/1988 | Perkins | |
| 4,781,151 A | 11/1988 | Wolpert et al. | |
| 4,843,824 A | 7/1989 | Mushines | |
| 5,188,090 A | 2/1993 | Griggs | |
| 5,239,948 A | 8/1993 | Sajewski | |
| 5,279,262 A | 1/1994 | Muehleck | |
| 5,341,768 A | 8/1994 | Pope | |
| 5,385,298 A | 1/1995 | Griggs | |
| 5,419,306 A | 5/1995 | Huffman | |
| 5,472,620 A | 12/1995 | Huang | |
| 5,551,242 A | 9/1996 | Loesch et al. | |
| 5,656,136 A | 8/1997 | Gayaut et al. | |
| 5,717,181 A | 2/1998 | Colgate | |
| 5,925,223 A | 7/1999 | Simpson et al. | |
| 5,931,153 A | 8/1999 | Giebeler | |
| 5,937,848 A | 8/1999 | Madden | |
| 5,957,122 A | 9/1999 | Griggs | |
| 5,968,321 A * | 10/1999 | Sears | B01D 1/221 |
| | | | 159/24.1 |
| 5,988,280 A | 11/1999 | Crawford et al. | |
| 6,016,798 A | 1/2000 | Selivanov | |
| 6,164,274 A | 12/2000 | Giebeler et al. | |
| 6,200,486 B1 | 3/2001 | Chahine et al. | |
| 6,250,561 B1 | 6/2001 | Fujiwara et al. | |
| 6,294,054 B1 * | 9/2001 | Sutter | B01D 3/10 |
| | | | 202/176 |
| 6,299,735 B1 | 10/2001 | Lumbreras | |
| 6,321,552 B1 | 11/2001 | Frederiksen | |
| 6,371,381 B1 | 4/2002 | Niwa | |
| 6,386,751 B1 | 5/2002 | Wootan et al. | |
| 6,581,859 B2 | 6/2003 | Adams et al. | |
| 6,595,759 B2 | 7/2003 | Crosta et al. | |
| 6,596,178 B1 | 7/2003 | Archibald et al. | |
| 6,627,784 B2 | 9/2003 | Hudson et al. | |
| 6,666,906 B2 | 12/2003 | Hallman | |
| 6,833,056 B1 * | 12/2004 | Kamiya | B01D 1/0047 |
| | | | 159/44 |
| 6,896,718 B2 | 5/2005 | Hallman | |
| 6,910,448 B2 | 6/2005 | Thoma | |
| 6,974,305 B2 | 12/2005 | Garrett | |
| 7,032,544 B2 | 4/2006 | Kuo et al. | |
| 7,037,105 B2 | 5/2006 | Hayes | |
| 7,073,337 B2 * | 7/2006 | Mangin | B01D 3/007 |
| | | | 60/783 |
| 7,089,886 B2 | 8/2006 | Thoma | |
| 7,201,225 B2 | 4/2007 | Smith et al. | |
| 7,284,709 B2 | 10/2007 | Guyer | |
| 7,318,553 B2 | 1/2008 | Thoma | |
| 7,424,916 B2 | 9/2008 | Foster et al. | |
| 7,546,874 B2 | 7/2009 | Smith et al. | |
| 7,568,523 B2 | 8/2009 | Smith et al. | |
| 7,614,367 B1 | 11/2009 | Frick | |
| 7,637,232 B2 | 12/2009 | Foster | |
| 2003/0132097 A1 | 7/2003 | Kenet et al. | |
| 2005/0224223 A1 | 10/2005 | Hayes | |
| 2005/0230238 A1 * | 10/2005 | Klausner | B01D 3/346 |
| | | | 203/10 |
| 2006/0185621 A1 | 8/2006 | Foster et al. | |
| 2007/0144785 A1 | 6/2007 | Smith et al. | |

OTHER PUBLICATIONS

PD&E Resources Services Corp., ProHeat Flameless Steamers, 2004, 3 pgs, Canada.

PD&E Resources Services Corp., ProHeat Flameless Boilers, 2004, 3 pgs, Canada.

* cited by examiner

METHODS AND SYSTEMS FOR HEATING AND MANIPULATING FLUIDS

CROSS REFERENCE TO RELATED APPLICATIONS

This continuing application is based on, claims priority to, and benefit of the following applications and patents, the entire contents of each of which are incorporated herein by reference for all purposes:

U.S. Non-Provisional application Ser. No. 13/947,082, filed Jul. 21, 2013 (pending), which is a division of U.S. Non-Provisional application Ser. No. 13/555,122, filed Jul. 21, 2012, (abandoned), which is a non-provisional of U.S. Provisional Application No. 61/510,485, filed on Jul. 22, 2011.

U.S. Non-Provisional application Ser. No. 13/467,551, filed on May 9, 2012, which claims priority to U.S. Provisional Application 61/510,485, filed on Jul. 22, 2011 and U.S. Provisional Application 61/484,210, filed on May 9, 2011; and which is a continuation-in-part of U.S. Non-Provisional application Ser. No. 13/069,363 filed on Mar. 22, 2011; and a continuation-in-part of U.S. Non-Provisional application Ser. No. 12/638,984, filed on Dec. 16, 2009.

U.S. Non-Provisional application Ser. No. 13/069,363, filed on Mar. 22, 2011 (pending), which claims priority to U.S. Provisional Application 61/316,362, filed on Mar. 22, 2010; and which is a continuation-in-part of U.S. Non-Provisional application Ser. No. 12/638,984 filed on Dec. 16, 2009 (pending).

U.S. Non-Provisional application Ser. No. 12/638,984 filed on Dec. 16, 2009 (pending), and which is a continuation-in-part of U.S. Non-Provisional application Ser. No. 12/615,331 filed on Nov. 10, 2009 (abandoned); a continuation-in-part application of U.S. Non-Provisional application Ser. No. 11/934,645 filed on Nov. 2, 2007 (abandoned); a continuation-in-part application of U.S. Non-Provisional application Ser. No. 11/764,270 filed on Jun. 18, 2007 (abandoned); a continuation-in-part application of U.S. Non-Provisional application Ser. No. 11/748,475 filed on May 14, 2007, now U.S. Pat. No. 7,614,367, issued on Nov. 10, 2009; a continuation application of U.S. Non-Provisional application Ser. No. 11/741,570 filed on Apr. 27, 2007 (abandoned); and a continuation-in-part application of U.S. Non-Provisional application Ser. No. 11/738,644, filed on Apr. 23, 2007 (abandoned); and which claims priority to U.S. Provisional Application Ser. No. 61/249,841 filed on Oct. 8, 2009; U.S. Provisional Application Ser. No. 60/883,178 filed on Jan. 3, 2007; U.S. Provisional Application Ser. No. 60/864,160 filed on Nov. 2, 2006; U.S. Provisional Application Ser. No. 60/800,495 filed on May 15, 2006; U.S. Provisional Application Ser. No. 60/795,983 filed on Apr. 28, 2006; and U.S. Provisional Application Ser. No. 60/749,413, filed on Apr. 24, 2006.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed herein relate generally to systems and their use for manipulating fluids, and relate specifically to heating, evaporating, condensing, separating, sterilizing and/or otherwise manipulating fluids, including, but not limited to, industrial fluids associated with the oil and gas industries.

Description of the Related Art

Industrial operations, such as, but not limited to, oilfield operations, oftentimes require sources of heat for a variety of purposes, such as heating a fluid, evaporating a component from a fluid, condensing a fluid, separating a fluid according to its properties, and/or sterilizing or killing objectionable organisms in a fluid. In the past, industry has looked to both open flame (or direct fired) and flameless systems to provide the thermal energy for such systems.

For example, U.S. Pat. No. 7,424,916 B2 entitled "Flameless Hot Oiler" is said to describe "[a] flameless heating system comprising: at least one engine, each engine including a coolant for removing heat from the engine and each engine producing exhaust; a loading means for loading the engine; a heat exchange system, the heat exchange system comprising: a heat exchange fluid; a pump for circulating the heat exchange fluid; at least one heat exchanger for transferring heat from the at least one engine coolant to the heat exchange fluid; and an exhaust heat exchanger for transferring heat from the exhaust of the at least one engine to the heat exchange fluid; a batch fluid; and a heat exchanger for transferring heat from the heat exchange system to the batch fluid, wherein heat is transferred from the engine to the heat exchange system, and from the heat exchange system to the batch fluid."

U.S. Pat. No. 5,279,262 entitled "Mechanical Liquid Vaporizing Waterbrake" is said to describe "[a] water brake which uses mechanical power to kinetically heat water to vapor or steam, and use thereof as a steam generator or cooling water conserving dynamometer or motion retarder. In the simplest embodiment, radial impeller vanes (5b) throw water against stator vanes (6e), whence the water rebounds to the impeller (5). The peripheral rebounding movement continues back and forth. Power dissipates as heat in the water causing the water to increase in temperature and to vaporize. The vapor, being lower in density and viscosity than is the water, flows to and out a central outlet (9) while the denser water is centrifugally separated from the vapor and retained in the peripheral rebounding motion. Water leaving as vapor is continually replaced through a cooling water inlet (8), allowing continuous operation over wide ranges of speed, torque, power and steam generation rates, both at steady state and at controlled rates of change."

U.S. Pat. No. 4,264,826 entitled "Apparatus For Generating Thermal Energy And Electrical Energy" is said to describe "[a]n apparatus for generating thermal and electrical energy includes an internal combustion engine connected to and adapted to drive a generator for providing electrical power and a brake for generating thermal energy. In one embodiment, a heat carrier flows through appropriate conduits for absorbing heat energy from the brake, from the combustion chamber of the engine, and from the engine exhaust gases and delivers the heat energy to a end-use heat exchanger, for example, a room or space heater. In a second embodiment, the engine exhaust gas flow is used to drive a gas turbine that, in turn, drives a compressor in a thermal cycle to provide additional heat transfer capability."

U.S. Patent Application Publication No. 2006/0185621 A1, published on Aug. 24, 2006 and entitled "Flameless Boiler," is said to describe "[a] flameless boiler comprising generator means for generating heat in fluid circulated there through by shearing of the fluid; a prime mover drivingly connected to the generator means for shearing of the fluid; a supply reservoir for the fluid; a first pump for circulating the fluid from the supply reservoir to the generator means; and a pressure vessel in fluid communication with the generator means for receiving heated fluid there from, the pressure vessel having an outlet for drawing steam therefrom."

U.S. Patent Application Publication No. 2005/0224223 A1, published on Oct. 13, 2005 and entitled "Heating Apparatus for Wells," is said to describe "[a]n apparatus for warming objects such as production conduits at a well site comprises an internal combustion engine driving a well pump. A heat exchanger shell is connected to an exhaust port of the engine, and has an output port. A circulating pump is driven by the engine, and a heating circuit is connected to the circulating pump such that liquid in the heating circuit is pumped from a pump output of the circulating pump through the heating circuit to a pump intake of the circulating pump. The heating circuit comprises a heat absorbing portion inside the heat exchanger shell arranged such that heat from the exhaust of the engine is transferred to the liquid therein, and a heating conduit arranged adjacent to a production conduit or other desired object such that heat from the liquid in the heating conduit is transferred to the object."

The present disclosure is directed to improved systems and methods for heating and/or manipulating a fluid.

BRIEF SUMMARY OF THE INVENTION

As a brief summary of the inventions disclosed herein, and without limitation, I have invented methods and systems for manipulating a heated fluid. My inventions include heating systems or subsystems in which a thermal energy source is used to heat a fluid in opened-loop arrangement or closed-loop arrangement. The thermal energy source may comprise a direct fired or open flame boiler, an internal combustion engine driving a rotary heating device, or an internal combustion engine powering an electric boiler. The heating system may be operated at a desired temperature and may be operated at less than atmospheric pressure, atmospheric pressure or may be pressurized. Various plumbing, pumping and control systems are disclosed for the various heating systems taught herein.

As a brief summary of the inventions disclosed herein, and without limitation, my inventions also include methods and systems for evaporating a fluid, such as water. These systems and methods may utilize any of the heating subsystems disclosed herein as a source of thermal energy to effect evaporation, and a fluid-to-fluid heat exchanger to transfer heat between the heating systems or subsystem and the evaporation subsystem. The evaporation systems may comprise a flash tank for separating the fluid into its vapor and liquid phases and a condensing heat exchanger for condensing the vapor to liquid. Single and multiple effect evaporation systems are disclosed. Various plumbing, pumping, measuring and control systems are disclosed for the various evaporation systems and subsystems taught herein.

As a brief summary of the inventions disclosed herein, and without limitation, my inventions also include methods and systems for concentrating a fluid. These systems and methods may utilize any of the heating systems or subsystems disclosed herein as a source of thermal energy to effect concentration, and a fluid-to-fluid heat exchanger to transfer heat between the heating subsystem and the concentration subsystem. The concentration systems may comprise a flash tank for separating the fluid into its vapor and liquid phases and a condensing heat exchanger for condensing the vapor to liquid. Extraction systems are disclosed for removing concentrated liquid from the flash tank. Various plumbing, pumping, measuring and control systems are disclosed for the various concentrating systems or subsystems taught herein.

As a brief summary of the inventions disclosed herein, and without limitation, my inventions also include methods and systems for separating a fluid into its fractional or property-based components. These systems and methods may utilize any of the heating systems or subsystems disclosed herein as a source of thermal energy to effect concentration, and a fluid-to-fluid heat exchanger to transfer heat between the heating subsystem and the separating subsystem. The separating systems may comprise a separation tower for separating the fluid into its fractional components and a condensing heat exchanger for condensing fluid vapors. Various plumbing, pumping, measuring and control systems are disclosed for the various separating systems and subsystems taught herein As a brief summary of the inventions disclosed herein, and without limitation, my inventions also include methods and systems for pasteurizing a fluid. These systems and methods may utilize any of the heating systems or subsystems disclosed herein as a source of thermal energy to effect pasteurization, and a fluid-to-fluid heat exchanger to transfer heat between the heating subsystem and the pasteurizing subsystem. The pasteurizing systems may comprise a flash tank for separating the fluid into its vapor and liquid phases and a condensing heat exchanger for condensing the vapor to liquid. Extraction systems are disclosed for removing pasteurized liquid from the flash tank. Various plumbing, pumping, measuring and control systems are disclosed for the various pasteurizing systems or subsystems taught herein.

BRIEF DESCRIPTION OF THE SEVERAL VIEWS OF THE DRAWINGS

The Figures described below are provided as an aid to understanding the written descriptions provided herein of my inventions. Neither the Figures nor the written descriptions thereof are intended to limit the scope of the appended claims. Rather, the Figures and written descriptions are provided to illustrate the inventive concepts to a person of skill in the art and to enable such person to make and use the inventive concepts.

DETAILED DESCRIPTION

Figure 1:
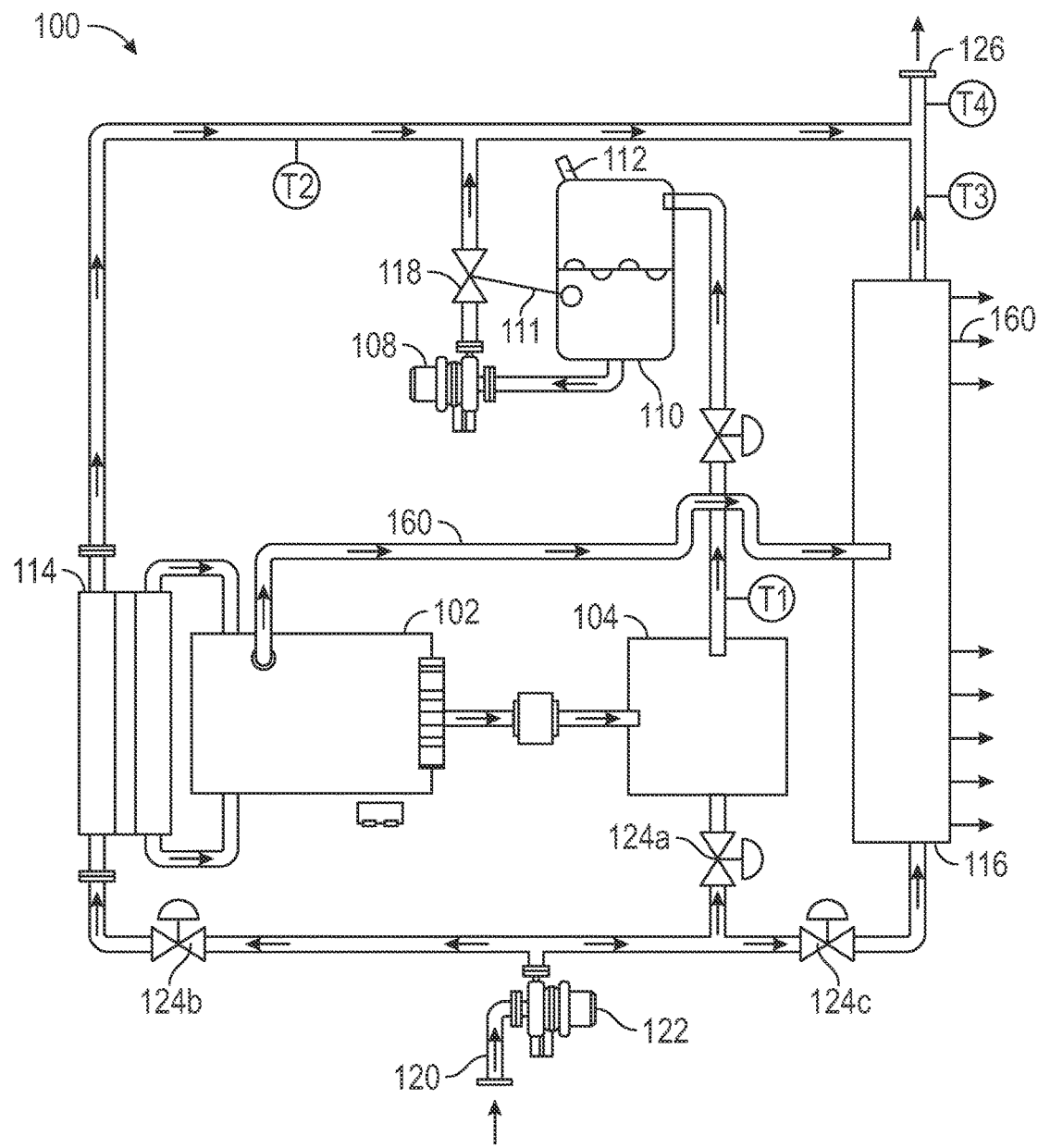
FIG. 1 illustrates an opened-loop fluid heating system utilizing a rotary heating device.

One or more illustrative embodiments incorporating the inventions disclosed herein are presented below. For the sake of clarity, not all features of an actual implementation are described or shown. Persons of skill appreciate that in the development of an actual embodiment incorporating aspects of the present inventions, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a normal undertaking for those of ordinary skill in the art having benefit of this disclosure.

In general terms, I have invented various systems and methods for heating and/or otherwise manipulating a fluid. Embodiments of my fluid heating systems may comprise an opened-loop system or a closed-loop system. By "opened loop," I mean that the fluid that is desired to be manipulated is the fluid that flows through the primary heating devices. By "closed loop," I mean that the fluid that is desired to be manipulated flows through a heat exchanger to pick up heat from another fluid that that flows through the primary heating devices in closed loop arrangement. The opened loop and closed loop systems described and illustrated herein can be implemented as batch systems or continuous systems.

One embodiment of my fluid heating and manipulating inventions is a opened-loop system in which the fluid to be heated flows along a plurality of heat paths. For example, one heat path may comprise a rotary heating device coupled to a rotary kinetic energy generator, such as, but not limited to, an internal combustion engine, an external combustion engine or an electric motor. The fluid may be heated in the rotary heating device and delivered to a reservoir or accumulator. A second heat path may comprise a fluid-to-fluid heat exchanger configured to transfer heat from the engine's water jacket to the fluid. A third heat path may comprise and air-to-fluid heat exchanger configured to transfer heat from the engine's exhaust to the fluid. All three paths may be combined to produce heated fluid. It will be appreciated that pumps and valving can be used to control the temperature of the fluid.

Another embodiment of my fluid heating inventions is a closed-loop system having a first fluid-to-fluid (such as liquid-to-liquid) heat exchanger that divides the heating system into a primary fluid section and a secondary fluid section. The primary fluid section may comprise a primary energy source, such as a rotary kinetic energy generator, preferably a diesel engine. The rotary kinetic energy is used to energize a rotary heating device. Regardless of the primary energy source, a primary or working fluid, such as, but not limited to, water or a water-based mixture, is circulated through the primary energy source to thereby heat the working fluid. In addition, all or a portion of the thermal energy from the primary energy source may be transferred to the working fluid as well by one or more heat exchangers. A secondary, or worked, fluid may be passed through the first heat exchanger to transfer energy from the working fluid to the worked fluid, thereby heating the worked fluid.

Any variety of rotary heating devices may be used for embodiments of the inventions disclosed herein. For example, a rotary heating device may comprise any of a number of known devices, such as, but not limited to, a water brake, a dynamometer, a cavitation heater (such as those disclosed in U.S. Pat. No. 7,201,225), and a shear plate or friction heater. It is preferred that the rotary heating device for the closed-loops systems disclosed herein comprise an instrumented water brake (e.g., a dynamometer), such as, but not limited to, a Model TD3100 available from Taylor Dynamometer.

Yet another embodiment of my fluid heating inventions is a closed-loop system having a direct-fired boiler, such as a natural gas heater, as the primary energy source. Fluid heated in the boiler flows through a primary heat exchanger, such as a fluid-to-fluid heat exchanger to transfer heat to the fluid to be heated, i.e., the worked fluid. Fluid leaving the primary heat exchanger may be accumulated in a reservoir prior to being re-heated in the boiler. Alternately, electrical energy may be supplied by a Diesel-Electric generator set, which is used to heat the fluid in an electric resistance heater or boiler.

Turning now to more specific embodiments of my inventions, FIG. 1 illustrates a flameless fluid heating system 100. The system 100 illustrated in FIG. 1 directly heats the fluid of interest, i.e., the worked fluid. In other words, this is an "opened-loop" design in which the fluid to be heated, such as, for example, fracturing fluid, is passed directly through the rotary heating device 104. In this embodiment, the rotary generator 102 is a diesel engine of, for example, 750 hp and the rotary heater is a Taylor Dynamometer model TD3100. Fluid enters the system 100 at inlet 120, preferably through an appropriately sized centrifugal pump 122, and is allowed to flow through three substantially parallel heating paths.

Adjustment of fluid flow among these paths and, therefore, fluid temperature may be controlled by flow control devices or valves 124*a*, 124*b* and 124*c*.

A first path is through valve 124*a* to the rotary heater 104 where torque from the engine 102 heats the fluid. The fluid leaves the rotary heater 104 and is collected in a tank 110 that is vented 112 to atmosphere. A main circulation pump 108 draws heated fluid from the tank 110 and returns it to system 100, generally. The tank 110 may have a fluid level control 111 adapted to control a flow valve 118 to regulate the level of fluid inside the tank 110.

A second fluid heating path has a portion of the fluid passing through restriction 124*b* and into a fluid-to-fluid heat exchanger 114 adapted to transfer heat from the diesel engine 102, such as from the water jacket coolant, to the worked fluid. Fluid heated in exchanger 114 is combined with fluid from the rotary heater 104 as illustrated in FIG. 1 A third fluid heating path has a portion of the fluid passing through valve 124*c* and an air-to-fluid heat exchanger 116, such as a finned tube heat exchanger, adapted to transfer heat from the engine exhaust 160 to the fluid. Heated fluid exiting the heat exchanger 116 is combined with heated fluids from the rotary heater 104 and heat exchanger 114, with the combined heated fluid exiting the system 100 at outlet 126. The system illustrated in FIG. 1 was designed to raise the temperature of water by about 38° F. at a flow rate of about 280 gallons per minute.

Figure 2:
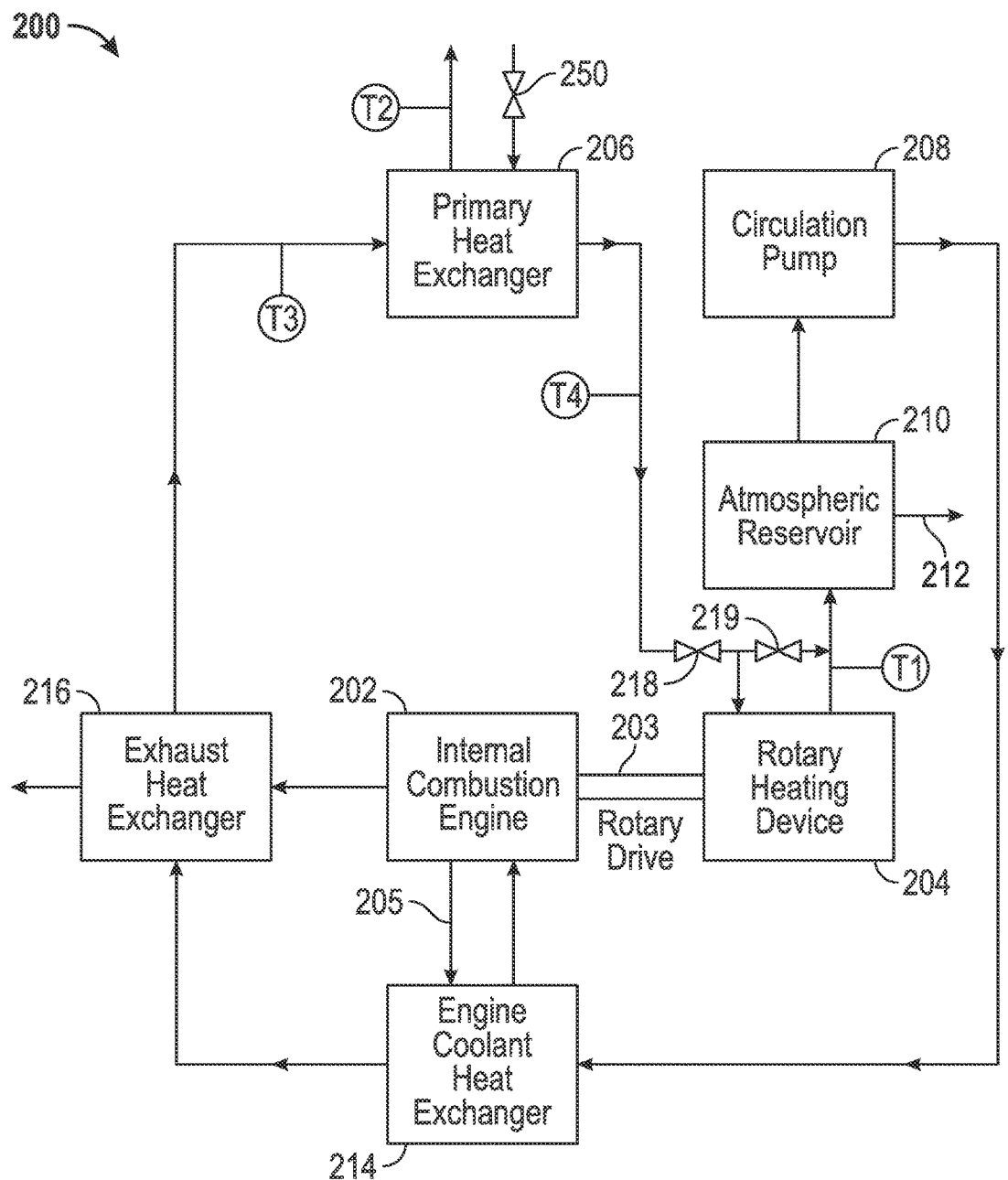
FIG. 2 illustrates a closed-loop fluid heating utilizing a rotary heating device.

Turning now to FIG. 2, disclosed is one of many possible embodiments of a closed-loop fluid heating system 200. The heating system 200 may comprise a rotary kinetic energy generator 202, a rotary heating device 204 and a primary heat exchanger 206 all plumbed in closed-loop fluid communication.

The rotary kinetic energy generator 202 may comprise any of a number of rotary prime movers, such as, but not limited to electric, pneumatic or hydraulic motors, and internal or external combustion engines. It is preferred that rotary generator 202 be a conventional diesel or natural gas engine, such as, for example, a 750 hp diesel engine. It will be appreciated that the amount of horsepower generated by the prime mover 202 will control the amount of heat generated by the system 200.

The rotary heating device 204 is preferably a water brake, and most preferably a water brake dynamometer, such as Model TD3100 available from Taylor Dynamometer.

The output shaft 203 of the rotary generator 202 may be coupled to the rotary heater 204 in known fashion. For example, flex joints or other coupling mechanisms (not shown) may be used as needed to couple the rotary generator 202 to the rotary heater 204. One benefit of using a water brake dynamometer as the rotary heating device is that it may be directly coupled to the flywheel or output shaft of an internal combustion engine.

The outlet side of the rotary heater 204 may be coupled to a reservoir or tank 210. Based on the operating characteristics of the rotary heater 204, the tank 210 may be pressurized, evacuated or un-pressurized. For the present embodiment using a water brake dynamometer as the rotary heater 204, it is preferred that tank 210 be un-pressurized and vented 212 to atmosphere, thereby operating at atmospheric conditions. A fluid circulation pump 208, such as a centrifugal pump, is adapted to circulate or pump the fluid, i.e. the working fluid, through the system 200.

Working fluid may be circulated from the tank 210 to a fluid-to-fluid heat exchanger 214 adapted to transfer heat from the rotary generator 202 to the working fluid to further heat the fluid. For example, FIG. 2 illustrates that the engine coolant 205 from, e.g., the engine's water jacket, is used to further heat the working fluid. It will be appreciated that heat exchanger 214 may be in addition to or in lieu of the engine's conventional air-to-fluid radiator. The working fluid that exits the heat exchanger 214 may pass through another heat exchanger 216, such as an air-to-fluid heat exchanger, to transfer energy from the engine's exhaust gases to the working fluid. As a matter of system design left to those of skill in the art, the engine's exhaust may pass entirely through the heat exchanger 216, or may be apportioned such that one portion passes through the heat exchanger 216 and the remainder passes through a conventional muffler or exhaust system (not shown).

It will be appreciated that while FIG. 2 illustrates the water jacket heat exchanger 214 downstream from the exhaust gases heat exchanger 216, such orientation is not required and may be reversed or eliminated. It is preferred, however, that any supplemental heat exchangers, such as heat exchangers 214 and 216 be located between the discharge side of the rotary heater 204 and the primary heat exchanger 206. Heated working fluid is circulated from supplemental heat exchangers 214 and/or 216 to primary heat exchanger 206 and from there back to the rotary heating device 204 to complete the closed loop.

A controllable valve or other flow restriction device 218 may be located on the inlet side of the rotary heating device 204. In the embodiment shown in FIG. 2, the valve 218 is controlled by the water brake controller (not shown) as a function of engine 202 torque. Thus, valve 218 is controlled to load the rotary heater 204 such that the engine operates near its peak torque.

Also shown in FIG. 2 is bypass circuit 219, which may be used to control the temperature of the fluid exiting the rotary heating device 204. It will be appreciated that depending on the type of rotary heating device 204 used, a backpressure valve (not shown) between the rotary heater 204 and the tank 210 may be used to maintain appropriate pressure on the rotary heater 204.

It will be appreciated that heating system 200 may be used to heat fluids of all types by flowing such fluid (the "worked" fluid) through primary heat exchanger 206 as illustrated in FIG. 2. System 200 may be instrumented as desired, and as illustrated in FIG. 2, several temperature transducers, T, may be beneficial. For example, monitoring the temperature T1 of the working fluid prior to entry into tank 210 is useful especially where the tank is vented 212 to atmosphere. Keeping the temperature of the working fluid below its atmospheric boiling point will prevent loss of the working fluid to the atmosphere. It may be desired to monitor the temperature T4 of the working fluid as it enters the rotary heater 204 and/or prior to its entry T3 into the primary heat exchanger 206. It will be appreciated that working fluid temperature T3 can be controlled in several ways, including adjusting the flow rate of the worked fluid through heat exchanger 206, and/or adjusting the torque generated by the rotary generator 202, and/or adjusting the flow or working fluid into the rotary heating device. Controllable bypass loops (not shown) can also be established for each heating source, such as rotary heater 204 and heat exchangers 214 and 216. It will be appreciated that the system 200 can be used to heat a fluid, i.e., the "worked fluid" by passing the worked fluid through fluid-to-fluid heat exchanger 206. A flow control device 250, such as a valve or a pump, can be used to control the temperature, T2, of the worked fluid.

Figure 3:
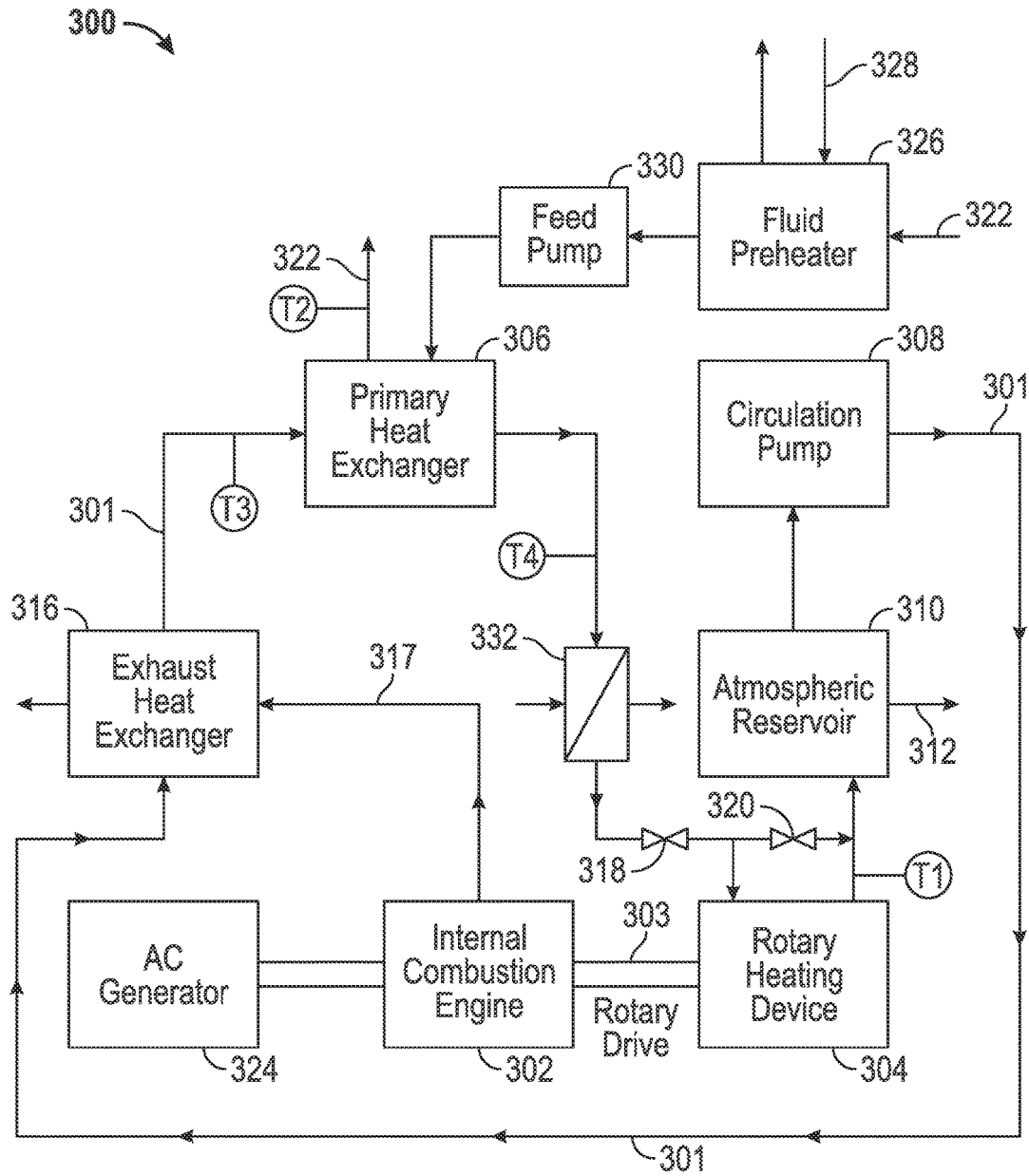
FIG. 3 illustrates another embodiment of a closed-loop fluid heating system utilizing a rotary heating device.

Moving on to FIG. 3, another embodiment comprising a flameless heating system 300 is illustrated. The fluid heating system 300 may comprise a rotary kinetic energy generator 302, a rotary heating device 304 and a primary heat exchanger 306 all plumbed in closed-loop fluid communication. The fluid to be heated, or worked fluid 322, is passed through the primary heat exchanger 306 to transfer heat from the working fluid 301 to the worked fluid 322.

It is preferred that rotary generator 302 be a conventional diesel or natural gas engine, such as, for example, a 600 hp diesel engine and that the rotary heating device 304 be a water brake dynamometer, such as, but not limited to, Model TD3100 available from Taylor Dynamometer.

The output shaft 303 of the rotary generator 302 may be coupled to the rotary heater 304 in known fashion. For example, flex joints or other coupling mechanisms (not shown) may be used as needed to couple the rotary generator 302 to the rotary heater 304. One benefit of using a water brake dynamometer as the rotary heating device 304 is that it may be directly coupled to the flywheel or output shaft of an internal combustion engine.

The outlet side of the rotary heater 304 may be coupled to a reservoir or tank 310. Based on the operating characteristics of the rotary heater 304, the tank 310 may be pressurized, evacuated or un-pressurized. For the embodiment of FIG. 3 using a water brake dynamometer as the rotary heater 304, it is presently preferred that tank 310 be un-pressurized and vented 312 to atmosphere, thereby operating at atmospheric conditions. A fluid circulation pump 308, such as a centrifugal pump, may be adapted to circulate or pump the fluid, i.e. the working fluid, through the system 300.

The working fluid 301 may pass through a heat exchanger 316, such as an air-to-fluid heat exchanger, to transfer energy from the engine's exhaust gases 317 to the working fluid 301. As a matter of system design left to those of skill in the art, the engine's exhaust 317 may pass entirely through the heat exchanger 316, or may be apportioned such one portion passes through the heat exchanger 316 and the remainder passes through a conventional muffler or exhaust system (not shown). It is preferred that exhaust gas heat exchanger 316, and any additional or supplement heat exchangers, be located between the discharge side of the rotary heater 304 and the primary heat exchanger 306. Heated working fluid 301 is circulated from heat exchangers 316 to primary heat exchanger 306 and from there back to the rotary heating device 304 to complete the closed working fluid heating loop.

A controllable valve or other flow restriction device 318 may be located on the inlet side of the rotary heating device 304 In the embodiment shown in FIG. 3, the valve 318 is controlled by the water brake controller (not shown) as a function of engine 302 torque. Thus, valve 318 is controlled to load the rotary heater 304 such that the engine operates near it peak torque or peak efficiency. Also shown in FIG. 3 is bypass circuit 320, which may be used to control the temperature of the working fluid 301 exiting the rotary heating device 304. It will be appreciated that depending on the type of rotary heating device 304 used, a backpressure valve (not shown) between the rotary heater 304 and the tank 310 may be used to maintain appropriate pressure on the rotary heater 304.

It will be appreciated that most, if not all, internal combustion engines suitable for use with the embodiment described in FIG. 3 will be supercharged by either an exhaust gas supercharger (i.e., turbocharger) or a mechanical supercharger. In either instance, the pressurized air is heated by the supercharger to typically undesirable levels, which temperature adversely affects the power that the engine 302 can generate. To recover some of that waste heat and/or to increase the efficiency of the engine, either the worked fluid 322 or the working fluid 301 may be used to cool the supercharged air. In a preferred embodiment of the system 300 illustrated in FIG. 3, an air-to-fluid heat exchanger 332 may be inserted into the working fluid 301 discharge line between the primary heat exchanger 306 and the rotary heating device 304 to transfer heat from the supercharged air to the working fluid 301.

Also shown in FIG. 3 is an optional electrical generator 324 coupled to the engine 302. For example and not limitation, the generator 324 may be a 50 kilowatt AC generator producing 480 volt, 3 phase power for use in powering and controlling the various pumps and instruments associated with system 300.

Alternately, the rotary heating device 304 may be replaced with an electrically heated boiler or tank (not shown). In such embodiment, the engine 302 would drive the electrical generator 324 or other electrical generator to provide the electrical energy for at least the electrically heated tank. In all other material respects, such alternate embodiment could be fashioned similarly to the embodiment shown in FIG. 3. Thus, in this alternate embodiment, the working fluid could be heated by at least the electrically heated tank (not shown) and the engine exhaust 317.

It will be appreciated that the fluid heating system 300 may be used to heat fluids of all types by flowing such fluid 322 (the "worked" fluid) through primary heat exchanger 306 as illustrated in FIG. 3.

In contrast to the system 200 shown in FIG. 2, system 300 of FIG. 3 is designed to use the waste heat from the engine's 302 water jacket to preheat the worked fluid 322. As shown in FIG. 3, a worked fluid preheat heat exchanger 326 may be used to transfer heat from the engine coolant 328 to the worked fluid 322 before it enters the primary heat exchanger 306. It will appreciated that heat exchanger 326 may be in addition to or in lieu of the engine's conventional air-to-fluid radiator heat exchanger. It is preferred a temperature controlled valve (not shown) be used to control the volume or flow rate of engine coolant delivered to heat exchanger 326 so that the engine 302 is not overcooled. Worked fluid pump 330 maybe located before or after preheater 326, but preferably before. Although not shown in FIG. 3, it will be appreciated that valves, controllable valves, instruments or transducers can be located adjacent the worked fluid inlet or outlet of the primary heat exchanger 306 to monitor or control the properties and characteristics of heated worked fluid 322.

System 300 may be instrumented as desired, and as illustrated in FIG. 3, several temperature transducers, T, may be beneficial. For example, monitoring the temperature T1 of the working fluid 301 prior to entry into tank 310 is useful especially where the tank is vented 312 to atmosphere. Keeping the temperature of the working fluid 301 below its atmospheric boiling point will prevent loss of the working fluid to the atmosphere. It may be desired to monitor the temperature T4 of the working fluid 301 as it enters the rotary heater 304 (or prior to charge air heat exchanger 332) and/or prior to its entry T3 into the primary heat exchanger 306. It will be appreciated that working fluid temperature T3 can be controlled in several ways, including adjusting the flow rate of the worked fluid through heat exchanger 306, and/or adjusting the torque generated by the rotary generator 302, and/or adjusting the flow of working fluid into the rotary heating device 304. Controllable bypass loops (not shown) can also be established for each heating source, such as rotary heater 304 and heat exchanger 316. It will be appreciated that the system 300 can be used to heat a fluid 322, i.e., the "worked fluid" by passing the worked fluid through fluid-to-fluid heat exchanger 306. A flow control device 330, such as a valve or a pump, can be used to control the temperature, T2, of the worked fluid.

Figure 4:
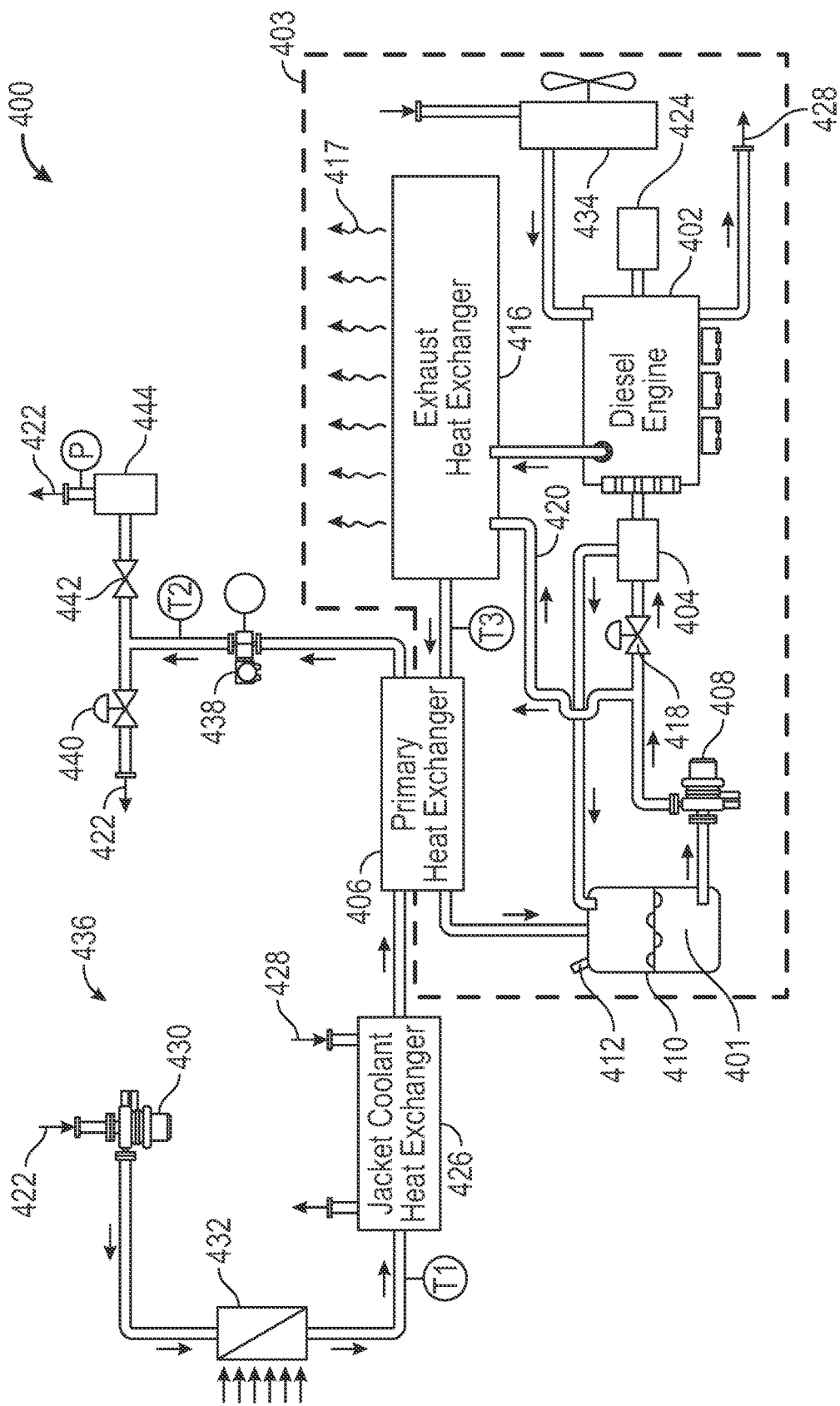
FIG. 4 illustrates yet another embodiment of a closed-loop fluid heating system utilizing a rotary heating device.

In FIG. 4, another embodiment of a flameless fluid heating system 400 is illustrated. The fluid heating system 400 may comprise a closed-loop heat transfer subsystem shown by a dashed line 403. The closed-loop heat transfer system 403 of FIG. 4 comprises a diesel engine 402, which is preferably a 600 horsepower, Tier III, turbocharged, diesel engine; a rotary heating device 404, which is preferably a Model TD3100 available from Taylor Dynamometer; a working fluid tank 410; an engine exhaust gas heat exchanger 416; and a primary fluid-to-fluid heat exchanger 406, all plumbed in closed-loop fluid communication.

The water brake 404 is directly coupled to the flywheel or output shaft of the diesel engine 402. The inlet of the water brake 404 is coupled to a controllable valve 418 to control the amount of closed-loop fluid, i.e., working fluid 401, allowed into the water brake 404 at any given time. The water brake 404 heats the working fluid 401 therein and discharges the heated working fluid to the tank 410. For the embodiment of FIG. 4, the tank 410 is un-pressurized and vented 412 to atmosphere, thereby operating at atmospheric conditions.

Working fluid 401, which is preferably a glycol and water mixture, is drawn from the tank 410 by pump 408 and the working fluid 420 that is that is not passed through valve 418 to the water brake 404 is directed to exhaust gas heat exchanger 416 where it is further heated by the engine exhaust gas 417. Heated working fluid 401 is then pumped from the exhaust gas heat exchanger 416 into the primary heat exchanger 406, which is preferably a frame-and-plate, fluid-to-fluid heat exchanger.

Also shown in FIG. 4 is an optional electrical generator 424 coupled to the engine 402. In the embodiment illustrated in FIG. 4, the generator 424 is a 50 kilowatt AC generator producing 480 volt, 3 phase power for use in powering and controlling the various pumps and instruments associated with system 400. FIG. 4 also shows conventional engine radiator 434.

Having now described the heat transfer system 403 illustrated in FIG. 4, it will be appreciated that the system 403 may be run continuously to provide thermal energy in the working fluid 403 that can be used to heat another fluid passing through the other portion of primary heat exchanger 406.

To accomplish this heating of a another fluid, i.e., the worked fluid 422, system 400 also comprises an open system 436 comprising an inlet pump 430 and an engine jacket heat exchanger 426 fluidly coupled to the primary heat exchanger 406. The discharge side of the primary heat exchanger 406 comprises instrumentation 438, such as but not limited to, temperature transducers, flow rate transducers, mass flow rate transducers and others; controllable valves 440, manual valves 442 and discharge pumps 444, as desired or required for a particular purpose.

Because the diesel engine 402 preferred for use in this embodiment described in FIG. 4 is air supercharged, the embodiment of FIG. 4 includes a charge air heat exchanger 432 positioned upstream of the engine jacket coolant 428 heat exchanger 426. In this configuration, the relatively cool fluid-to-be-heated 422 cools the charge air before it is introduced into the engine's combustion chambers, thereby preheating the worked fluid 422. Alternately, as described with respect to FIG. 3, the charge air heat exchanger 432 may be located in the heat transfer system 403 and preferably between the discharge of the primary heat exchanger 406 and the tank 410.

It will now be appreciated that heating system 400 may be used to heat fluids, i.e., a worked fluid 422, of all types by flowing such fluid 422 through primary heat exchanger 406 as illustrated in FIG. 4. System 400 may be instrumented as desired, and as illustrated in FIG. 4, several temperature transducers, T, may be beneficial. For example, monitoring the temperature T1 of the worked fluid 422 prior to entry into charge air heat exchanger 432 and temperature, T2, of the worked fluid 422 exiting the system 400. It will be appreciated that worked fluid temperature T2 can be controlled in several ways, including adjusting the flow rate of the worked fluid through heat exchanger 406, and/or adjusting the torque generated by the engine 402, and/or adjusting the flow of working fluid into the water brake 404.

Figure 5:
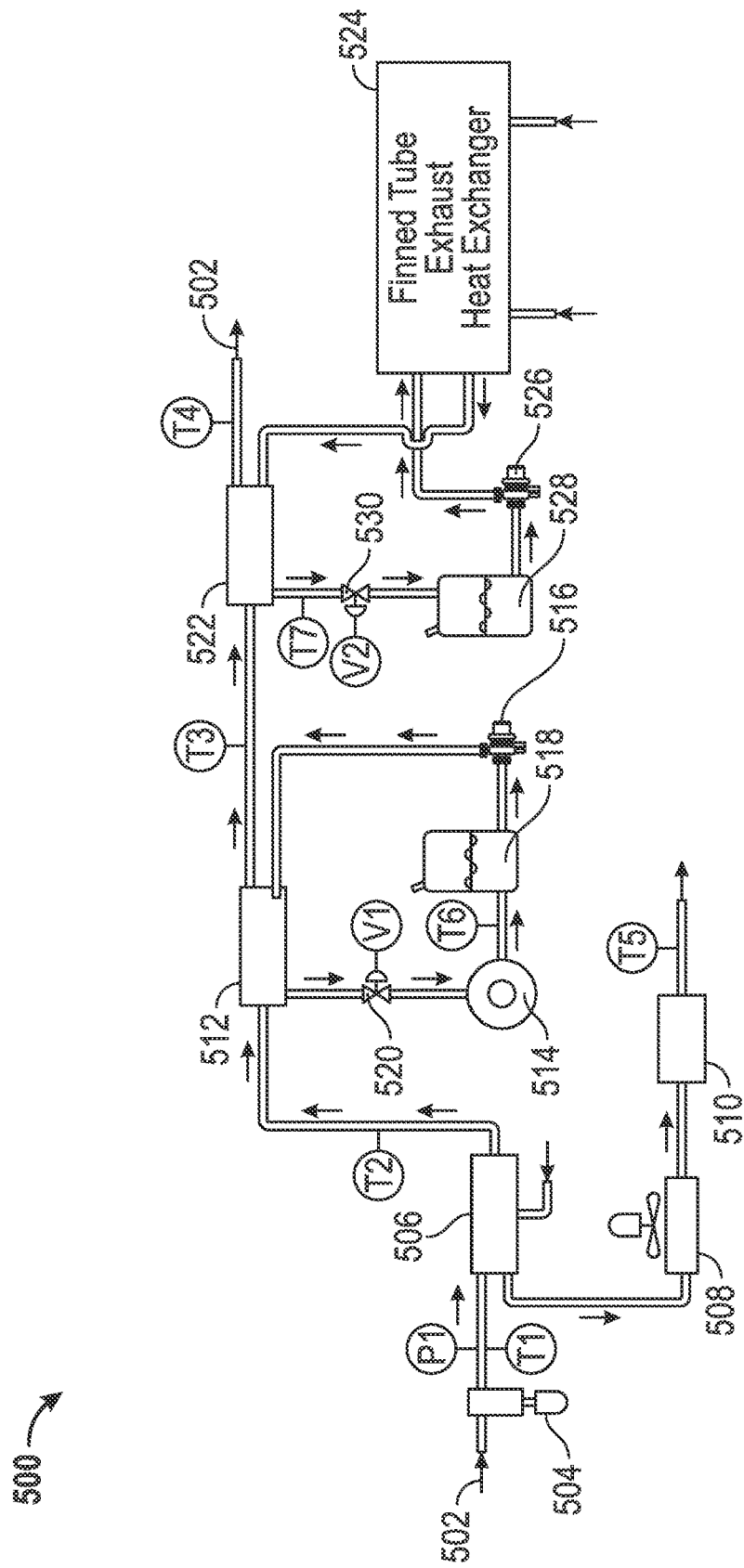
FIG. 5 illustrates still another embodiment of a closed-loop fluid heating system utilizing a rotary heating device

FIG. 5 illustrates another embodiment of a fluid heating system 500 using aspects of my inventions. The system 500 comprises a plurality of closed-loop heating circuits arranged sequentially to heat a worked fluid 502. The fluid to be heated 502 is pumped into the system 500 by a variable speed pump 504, such as those offered by Viking. The speed control allows the residence time of the fluid 502 within the system 500 to be controlled, thereby controlling the final temperature, T4, of the fluid 502. Indeed, in a preferred embodiment, temperature transducer T4 controls the pump 504.

The fluid 502 is pumped through one side/portion of a fluid-to-fluid heat exchanger 506. In FIG. 5, heat exchanger 506 is configured to transfer heat from an internal combustion engine's (not shown) water jacket (working fluid #1) to the fluid 502. As shown, this first closed-loop heating circuit may also include an auxiliary air-to-fluid heat exchanger 508 (or radiator) to ensure that the engine has adequate cooling, and may include an after cooler heat exchanger 510 to cool supercharged or pressurized intake air for the engine.

Fluid 502 heated by this first closed-loop section to temperature T2 is pumped to a second fluid-to-fluid heat exchanger 512. Heat exchanger 512 is configured to transfer heat from another fluid (working fluid #2) heated by a rotary heating device 514, such as a water brake, to the fluid 502. The water brake 514, preferably a TD3100 Taylor dynamometer, is driven by an internal combustion engine (not shown), such as a 700 hp diesel engine. The working fluid heated by the water brake is pumped 516 to an atmospheric reservoir or accumulator 518. Controllable valve 520 controls the volume of working fluid entering the water brake 514 and, therefore, the temperature T6. After passing through heat exchanger 512, the worked fluid 502 is heated to temperature T3.

Fluid 502 heated by the first and second closed-loop sections to temperature T3 is pumped to a third fluid-to-fluid heat exchanger 522. Heat exchanger 522 is configured to transfer heat from yet another fluid (working fluid #3) heated by an engine exhaust heat exchanger 524, such as a finned tube air-to-fluid heat exchanger, to the fluid 502. It will be appreciated that the exhaust gasses from any internal combustion or external combustion engine may be used by heat exchanger 524 to heat the working fluid. In FIG. 5, exhaust gasses from the engine that drives rotary heating device 514 and exhaust gasses from a 75 kW electrical generator, which provides electricity for operating an controlling the pumps, valves and other equipment associated with system 500, are used to heat the working fluid.

The working fluid heated by the exhaust heat exchanger 524 is pumped 526 to the third fluid-to-fluid heat exchanger 522 to raise the temperature of the worked fluid 502 to its final temperature, T4. Working fluid exits the heat exchanger 522 and flows into an atmospheric reservoir or accumulator 528. Controllable valve 530 controls the residence time of the working fluid in the heat exchanger 522 and, therefore, the temperature T7.

While the system 500 illustrated in FIG. 5 is a sequential or serial heating system, it will be appreciated that the plurality of closed-loop heating circuits can be arranged in parallel similar to the opened-loop system disclosed in FIG. 1.

It is contemplated that an embodiment of the system 500 illustrated in FIG. 5 may consume 5,000,000 Btu/Hr (35 gallons diesel/hr) and transfer approximately 4,500,000 Btu/hr to the worked fluid 502. The system 500 may raise the temperature of 60° F. water to 140° F. at a rate of 2.7 Bbl/min or 3.1 hours for 500 Bbl, and the temperature of oil at 60° F. to 210° F. at 3.3 Bbl/min.

Figure 6A:
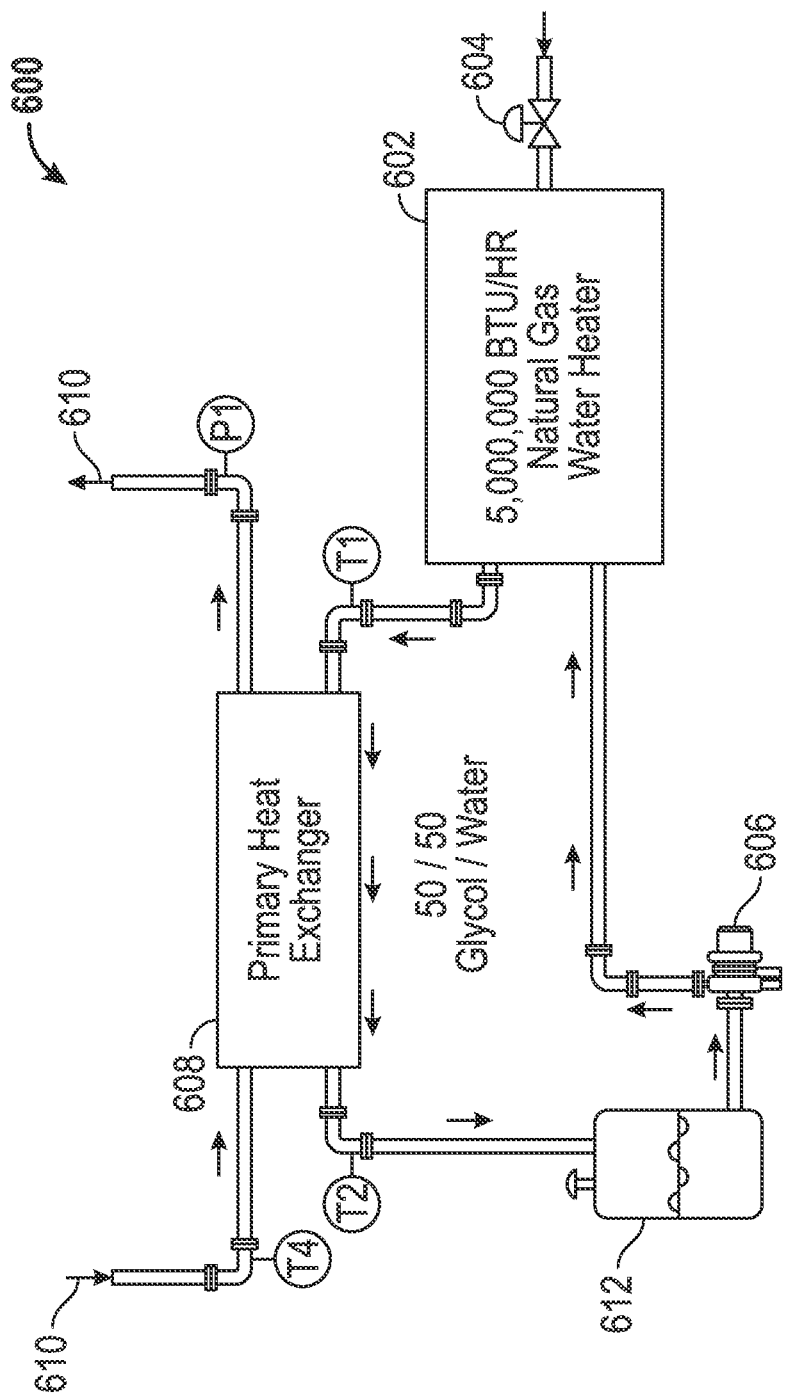
FIG. 6A illustrates a closed-loop fluid heating system utilizing a direct-fired boiler.

Turning now to FIG. 6A, a direct-fired fluid heating system 600 is disclosed. The heating system 600 comprises a direct-fired fluid heater 602, which is preferably a 5,000,000 BTU/hr natural gas water heater, such as, for example, a Parker Boiler Model 6200. It is contemplated that the heater 602 would be fired with waste gas from the field metered into the heater 602 through pressure control valve 604. Therefore, it is desirable that the heater 602 burner controls (not shown) allow for substantially real-time gas-to-air adjustments to account for changing gas quality. The working fluid in the closed-loop heating circuit is preferably a 50/50 mixture of water and glycol. The heater 602 heats the working fluid to temperature T1, which may be, for example, 210° F. The heated working fluid is pumped 606 through a fluid-to-fluid heat exchanger 608 to transfer heat from the working fluid to the worked fluid 610. Working fluid exits the heat exchanger 608 and enters an atmospheric reservoir or accumulator 612. Pump 606 draws working fluid out of the reservoir 612 and feeds it back to heater 602. A temperature transducer T1 cooperates with controllable valve 604 to control the temperature of the working fluid. In the system illustrated in FIG. 6, the worked fluid may be heated to about 170° F.

Figure 6B:
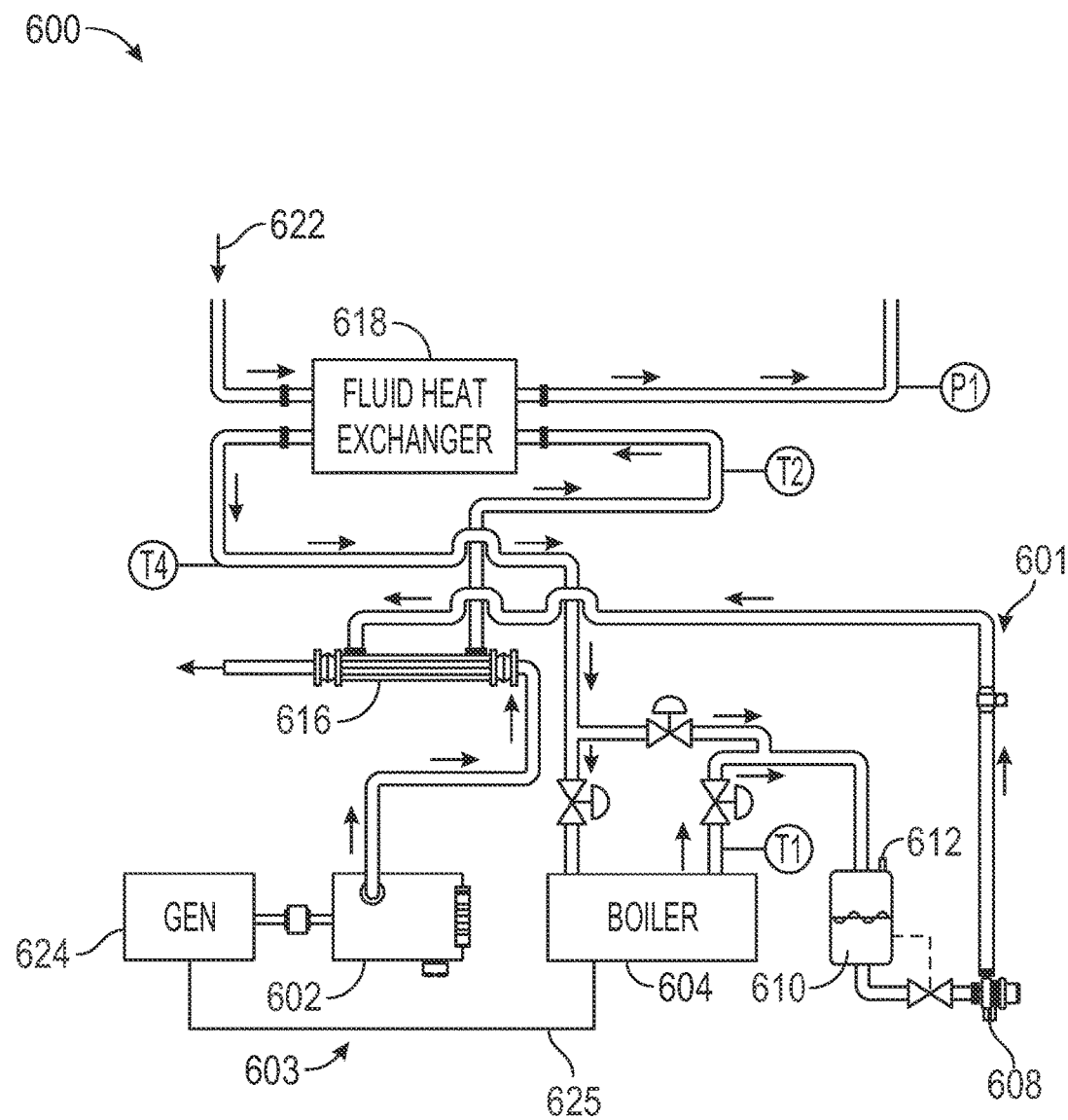
FIG. 6B illustrates a closed-loop fluid heating system utilizing a Diesel genset.

FIG. 6B illustrates an alternative heating system 600 utilizing a Diesel genset, 603 to power an electric boiler 604. The heating system 600 comprises a Diesel engine 602 and electrical generator 624, which together may be considered "genset" 603 and an electrical boiler 604. The genset 603 generates electricity, such as three-phase alternating current power, which is fed to the electric boiler 604 by suitable power cables 625. The working fluid in the closed-loop heating system is preferably a 50/50 mixture of water and glycol. The boiler 604 heats the working fluid to temperature T1, which may be, for example, 210° F. The heated working fluid is pumped 608 through a fluid-to-fluid heat exchanger 618 to transfer heat from the working fluid to the worked fluid 622. Working fluid exits the heat exchanger 618 and returns to boiler 604. An reservoir or accumulator 610 may be utilized as needed, and may be located before or after the boiler 604. FIG. 6B shows an atmospheric reservoir 610 located downstream of boiler 604. A temperature transducer T1 cooperates with controllable valves to control the temperature of the working fluid. In the system illustrated in FIG. 6B, the worked fluid may be heated to about 170° F.

Also shown in system 600 of FIG. 6B is an exhaust gas heat exchanger 616 configured to transfer waste heat from the engine's 602 exhaust to the working fluid. As illustrated in FIG. 6B, the exhaust gas heat exchanger 616 may be located downstream of the boiler 604 and upstream of the primary heat exchanger 618. It will be appreciated that other sources of waste heat may be captured to heat the working fluid. For example, as is taught herein with respect to other embodiments of my inventions, a water jacket heat exchanger (not shown) configured to use the waste heat from the engine's 602 water jacket may be used to, for example, preheat the worked fluid 622, or heat the working fluid. It will be appreciated that a water jacket heat exchanger may be in addition to or in lieu of the engine's conventional air-to-fluid radiator heat exchanger. It is preferred a temperature controlled valve (not shown) be used to control the volume or flow rate of engine coolant delivered to the water jacket heat exchanger so that the engine 602 is not over-cooled. Also, as is taught herein with respect to other embodiments of my inventions, waste heat from the engine's 602 mechanical or gas supercharger, if any, may be captured.

It will now be appreciated that FIGS. 1-6B illustrate merely several of many possible embodiments of fluid heating systems (or subsystems) using rotary heating devices, direct-fired heating devices, or electric heating devices. Those of skill in the art will be able to design closed- or opened-loop fluid heating systems according to this disclosure for a wide variety of fluids and for a wide variety of purposes, as contemplated by this disclosure. For example, heating of corrosive or abrasive fluids may benefit from the closed-loop design of FIGS. 2-6B, although the rotary heater, direct-fired heater or electric heater may be fabricated from corrosion and/or abrasion resistant materials, if desired, for opened-loop systems. In addition, the temperature(s) to which the fluid is heated may determine whether a closed- or open-loop system is desired. For example, the potential for and effects of scaling in the heat exchangers and/or heating devices should be considered in any design incorporating the present inventions.

A fluid heating system, such as those described above, may form a subsystem of a larger system, such as a fluid concentrating system, a fluid evaporating system, a fluid separating system, and/or a fluid pasteurizing system, as discussed below. Any person of skill having benefit of this disclosure will know how to interchange the various subsystems disclosed herein to achieve a desired design goal. In addition, the fluid heating systems described herein may be also used simply to heat fluids, such as, without limitation, for paraffin flushing or for an oil well "kill" truck.

Turning now to fluid evaporation systems and methods, such systems may comprise a flash tank in which the heated worked fluid is separated into vapor (e.g., steam) and liquid portions. The steam portion may be passed through an air-to-fluid heat exchanger to transfer heat from the steam to the air. The heated air may then be used to evaporate some or the entire liquid portion of the worked fluid.

Figure 7:
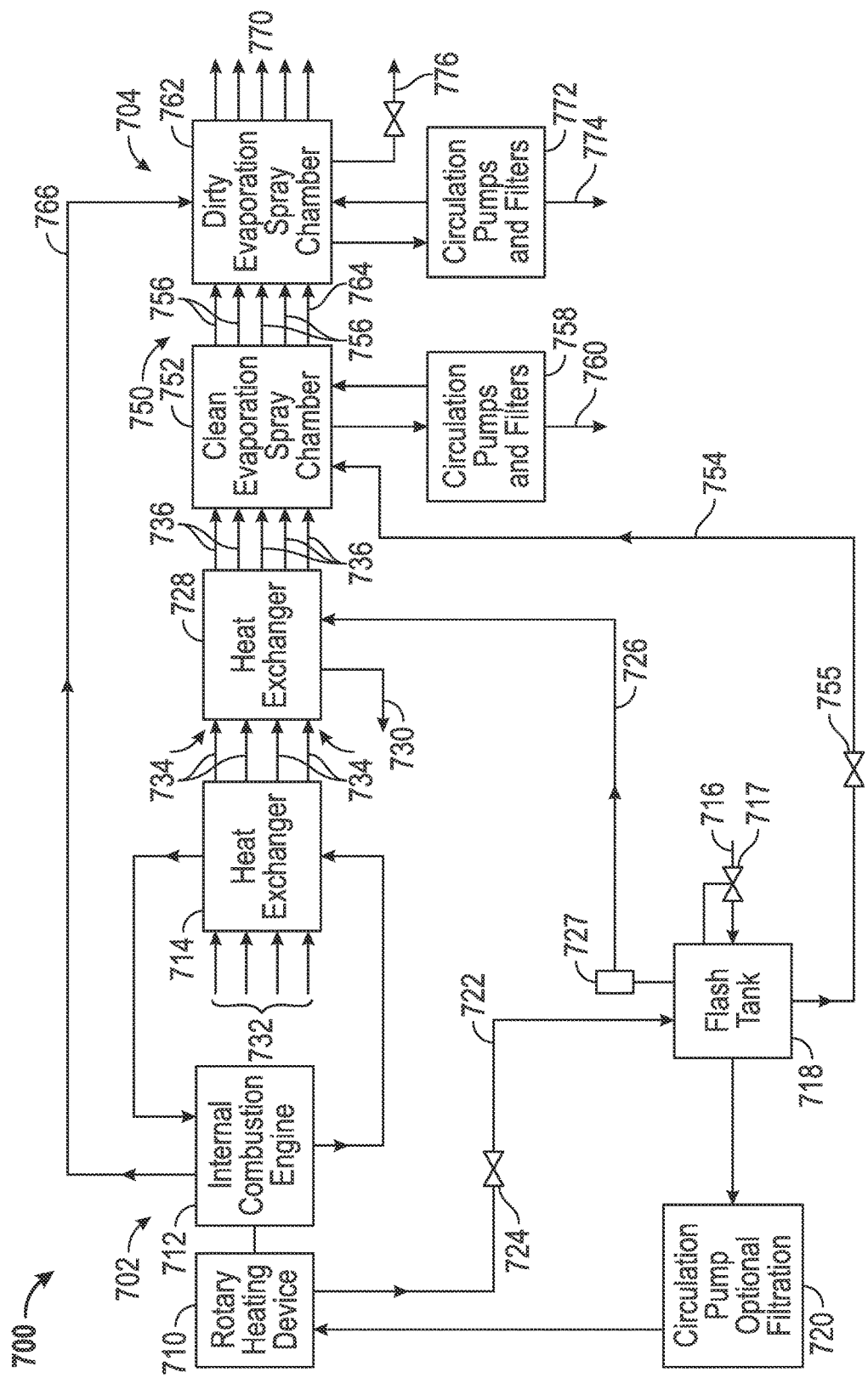
FIG. 7 illustrates an opened-loop fluid evaporating system utilizing a rotary heating device.

FIG. 7 depicts one of many possible embodiments of a fluid evaporating system 700. The system 700 may be characterized as comprising a heating section 702 and an evaporating section 704. In this embodiment, the heating section 702 comprises a rotary heating device 710, preferably a cavitation-based rotary heater, such as described previously, coupled to an output of a prime mover 712, such as a diesel or most preferably a natural gas engine. Flex joints or other coupling mechanisms (not shown) may be used as needed to couple the engine 712 to the rotary heating device 710. As will be described in more detail below, it is preferred that the engine 712 cooling system, such as closed loop water jacket and radiator 714, be a component of the heating section 702.

The fluid to be evaporated 716 (i.e., the worked fluid), such as produced water, is introduced to a tank 718 by any convenient means. It is preferred that the tank 718 have a level control device 717 to control the amount of fluid 716 supplied to the tank 718. The liquid phase of the fluid 716 is pumped by a circulation pump 720 to the rotary heating device 710. It will be appreciated that the pump system 720 may include one or more filters, filtration system or other discrimination devices adapted to remove particulate matter from the fluid 716. The type and efficiency of the filtration system may be selected based on the operational requirements of the rotary heating device 710 or other heating system 702 component. In other words, particulate matter may be removed as required to prevent damage to heating system 702 components. As the fluid 716 is pumped through the rotary heating device 710, the device 710 heats the fluid 716, such through as cavitation. Heated fluid 722 is returned to the tank 718 The return conduit preferable includes a valve, orifice plate or other type of restriction device 724 to create sufficient backpressure in the heating section 702 to maintain sensible heat in the fluid 722.

As heated fluid 722 enters the tank 718 it may flash, with a portion of the fluid 722 becoming steam and with the remainder being liquid. The steam portion 726 of the fluid 722 is communicated to a heat exchanger 728, which is preferably a finned tube air-to-fluid condenser adapted to remove heat from the fluid 726. It is preferred that a demister 727 be used to ensure that the fluid 726 is clean vapor. As the fluid 726 condenses, it collects and can be extracted from the heat exchanger 728 by known means as condensate 730.

As shown in FIG. 7, ambient air 732 is forced through engine heat exchanger or radiator 714 to maintain the engine 712 at operating temperature. Heated air 734 may be passed through the condenser 728 to further heat the air by transferring heat from the fluid 726 as described previously. The primary end product of heating system 702 is heated air 736.

Evaporation section 704 may comprise one or more evaporation chambers 750. As illustrated in FIG. 7, evaporation section 704 comprises a first evaporation chamber 752. In this chamber, a selected portion of the liquid phase 754 of fluid 722 is injected, such as by spraying, into the chamber 752. It is preferred that the chamber 750 be oriented such that fluid 754 is sprayed or injected adjacent the top of the chamber 750 so that the fluid falls through the heated air 736. A restriction device 755, such as a valve and/or orifice plate, may be used to control the volume of liquid fluid 754 introduced into the chamber 750. It is preferred that the restriction device 755 be a variable flow rate control valve adapted to receive control information form a liquid level indicator in the chamber 750, as discussed below. A fluid 716 preheater (not shown), such as a fluid-to-fluid heat exchanger, may be used to preheat the fluid 716 with fluid 754.

Heated air 736 is forced into and through the chamber to contact the liquid fluid 754. The heated air 736 causes a portion of the liquid 754 to evaporate and exit the chamber 752 as heated moist air 756. That portion of the fluid 754 that does not evaporate collects in the bottom of the chamber 752. Because this collected fluid likely has some degree of particulate contamination, it is desirable to agitate or stir the fluid, such as by fluid circulation. In a preferred embodiment, a circulation pump and filter system 758 is used to both agitate the fluid that collects in chamber 752 and to filter out the particulate contaminate 760, which can be disposed of as required and allowed.

Also shown in FIG. 7 is a second evaporation chamber 762. Chamber 762 may use fluid collected in chamber 752 as shown by transfer conduit 764. Additional evaporative heat may be supplied to chamber 762 by exhaust 766 from engine 712. Thus, chamber 762 uses moist heated air 756 and exhaust gases 766 to evaporate another portion of fluid 754. The evaporated fluid is released from the chamber 762 as heated, moist air 770. Chamber 762 may also include a circulation pump and filter system 772 to both agitate the fluid that collects in chamber 762 and to filter out the particulate contaminate 774, which can be disposed of as required and allowed. The pump system 772 may also be used to re-inject (or re-spray) the fluid 754 in subsequent chambers.

As discussed above, evaporation section 704 comprises a fluid level control, preferably associated with chamber 762, so that the system 700 is controlled to allow most of the fluid 754 entering evaporation section 704 to be evaporated. Chamber 762 also includes a reduced water blow down valve 776 that allows extraction and disposal of concentrated or reduced water, such as that portion of fluid 754 this is not evaporated.

Having now described an embodiment of a fluid evaporation system 700, it will be apparent that the invention has multiple synergistic attributes and functionalities. For example, using the engine 712 exhaust gases 766 to evaporate a portion of the fluid 722 also cleanses to a certain degree the exhaust gases that are returned to the environment. In addition, it should be noted that the fluid 754 to be evaporated is the working fluid as well.

A specific construction of the produced water evaporator system described above was designed to use a 36-inch diameter Shock Waver Power Reactor fabricated under license from Hydro Dynamics, Inc. The SPR was coupled to a 600 horsepower natural gas engine having a fuel consumption of 4,300 cubic feet per hour. The system was designed to accept up to 7,250 pounds of produced water per hour (approximately 14.5 gallons per minute). The system 100 was designed to evaporate approximately 80% of the produced water input or 5,800 pounds/hour, and to create approximately 1,450 pounds/hour of reduced (unevaporated) water for disposal. The system 100 was also calculated to produce about 1,500 pounds/hour (approximately 3.0 gallons per minute) of condensate or distilled water. The finned tube condenser was designed to have aluminum fins on carbon steel tubes having about 6,800 square feet of surface area and adapted to exchange about 3,337,565 BTU/hour. The heating section was designed to operate at about 250° F. at about 35 psig. An orifice or other restriction, such as valve 724, adjacent the flash tank is useful to maintain these operating conditions. The flash tank was designed to operate at about 220° F. at about 10 psig. The condenser was designed to output air heated to about 200° F. at a velocity of about 10 feet per second.

The evaporator chambers were designed as a fiberglass tank having four successive sections. In the first evaporative section, it was contemplated that liquid from the flash tank would be sprayed into the chamber at about 150° F. to 220° F. (depending, for example, on whether a fluid 716 preheater is used) in the presence of about 200° F. air. Two successive chambers were designed to spray unevaporated liquid from the prior sections across the heated air flowing through the chambers. The third section was similarly designed. The last section utilized the heat energy from the engine exhaust gases to aid further evaporation of the fluid. After passing through the four chambers, the heated air, laden with moisture from the fluid, was expelled from the system. As described above, reduced, unevaporated water, which is likely laden with particulates, such as salts of sodium, magnesium and/or calcium, chlorides, sulfates and/or carbonates, may be expelled from the evaporation chamber 750.

It will be appreciated that whether to use the heat energy from the engine exhaust and whether to use one or multiple evaporation chambers or process sections is a matter of design choice based upon numerous design criteria well within the capabilities of those of skill in this art having benefit of this disclosure.

Figure 8:
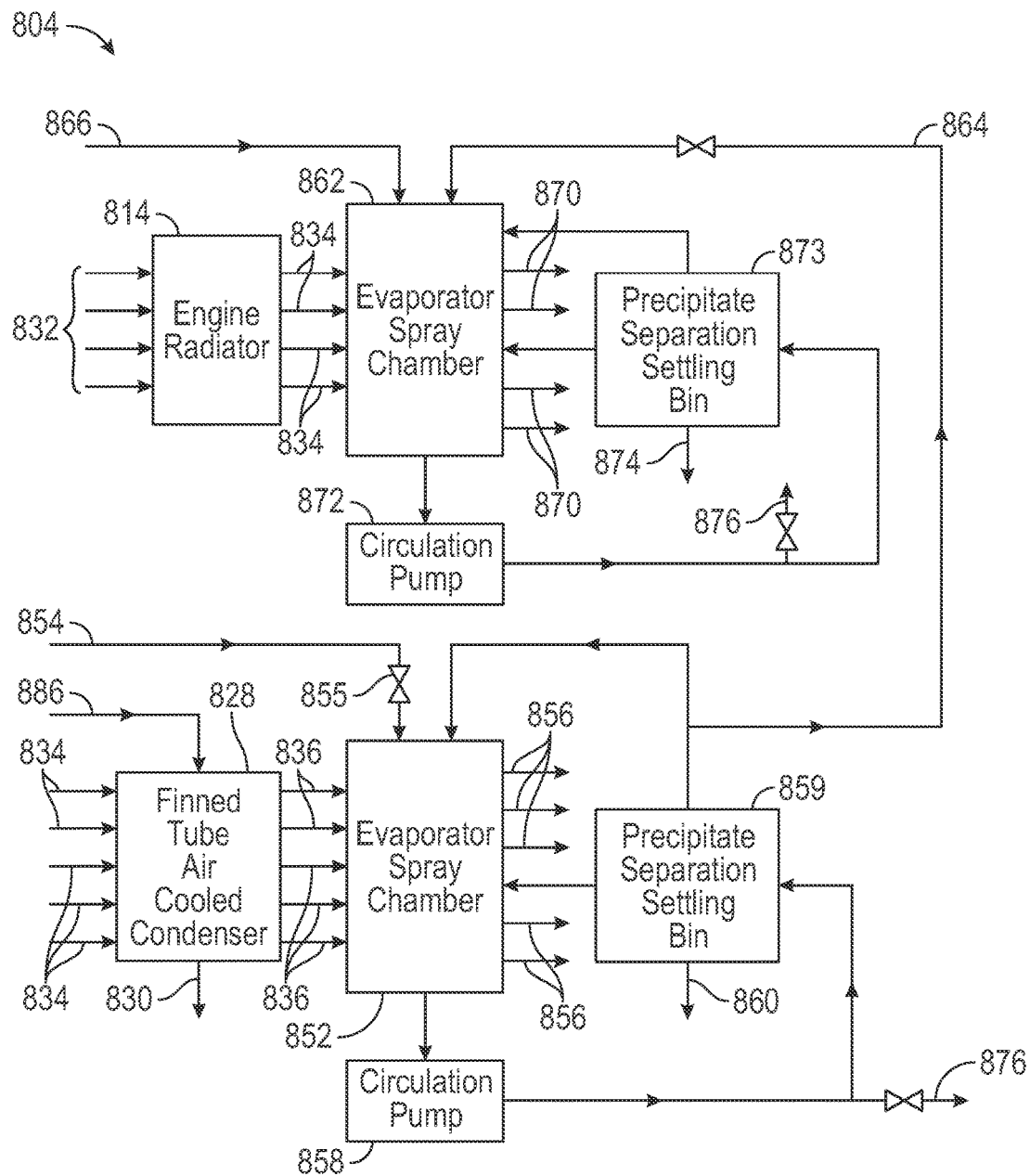
FIG. 8 illustrates another embodiment of a fluid evaporating subsystem.

FIG. 8 illustrates an embodiment of a fluid evaporating subsystem 804. It will be appreciated that FIG. 8 is based on the embodiment shown in FIG. 7. In fact, the reference numbers used and discussion provided with respect to FIG. 7 directly translate to those used in FIG. 8. For example, reference number 814 identifies structure similar to that shown as 714 in FIG. 7. More specifically, the disclosure provided for structures and/or functions identified as 704, 714, 728, 730, 732, 734, 736, 752, 754, 755, 756, 758, 759, 760, 762, 764, 766, 770, 772, 773, 774, 776, 786 and 788 in FIG. 7 provides disclosure for similar structures and functions identified by reference numerals 804, 814, 828, 830, 832, 834, 836, 852, 854, 855, 856, 858, 859, 860, 862, 864, 866, 870, 872, 873, 874, 876, 886 and 888 in FIG. 8.

The modifications disclosed in FIG. 8 involve using two separate evaporation chambers 852, 862. Chamber 852 is a "clean" evaporation chamber in that the evaporating air 836 is air heated by the condenser 828. Rather than the optional filtration system 758 described in FIG. 7, FIG. 8 makes use of particle separating system 859, which may comprise a particulate separator, such as a hydrocyclone separator, and a settling bin. The particulate matter 860 that is recovered from system 859 is "clean" in that it will have little to no atmospheric contamination and, to the extend a market exists, the particulates recovered may be reused or sold.

The second evaporation chamber 862 is a "dirty" chamber in that engine exhaust gases 866 are used in conjunction with air 834 heated by engine radiator 814 to evaporate fluid 864. It is believed that the modifications disclosed in FIG. 8 results in a better heat balance than the embodiment disclosed in FIG. 7. Also shown in FIG. 8, the "dirty" chamber 862 may use a particle separating system 873 as described above.

Figure 9:
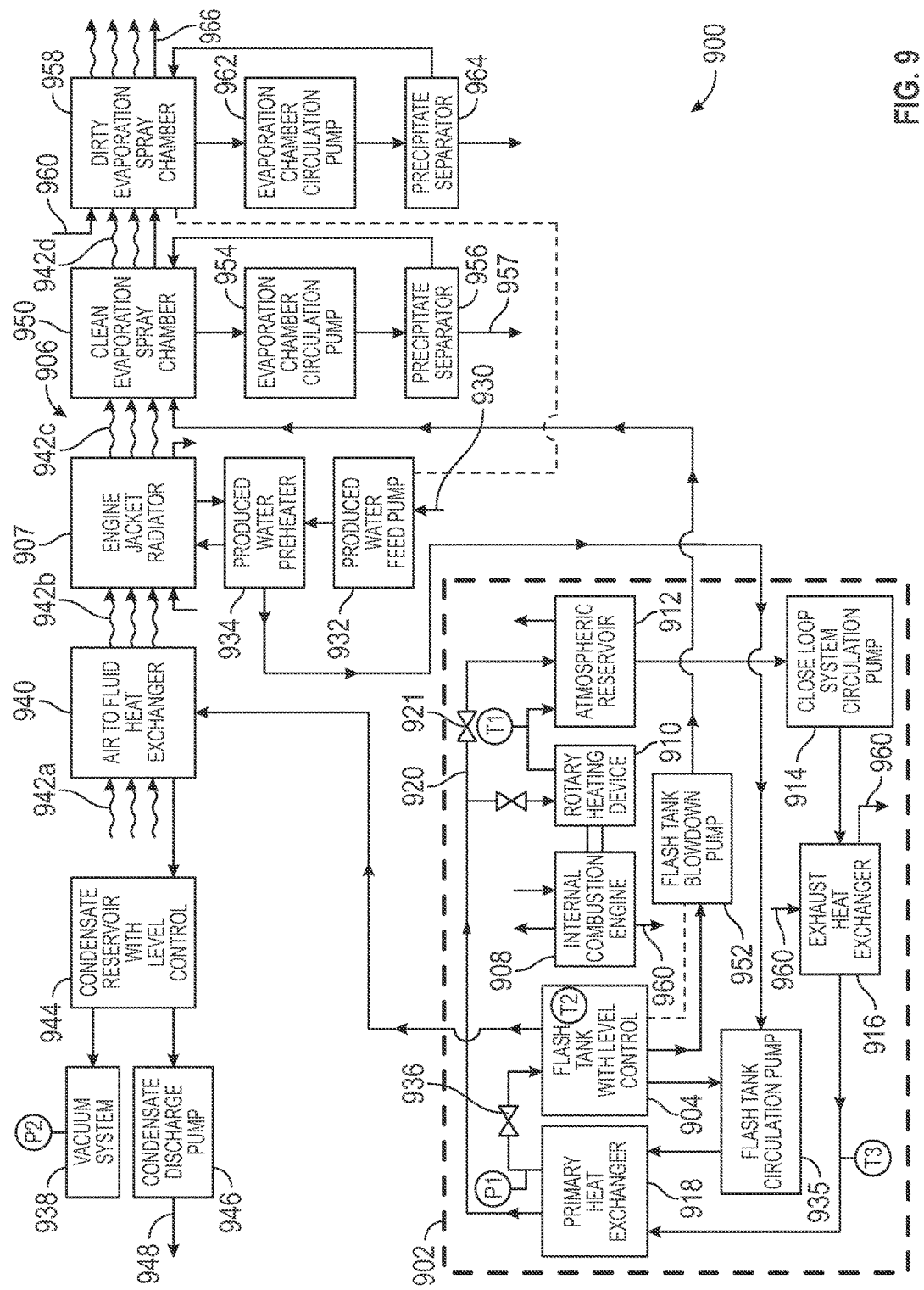
FIG. 9 illustrates a closed-loop fluid evaporating system utilizing a rotary heating device.

Illustrated in FIG. 9 is an embodiment of an evaporation system 900 particularly suited for evaporating water produced from subterranean wells or mines. Shown generally by dashed line is a heating subsystem 902 (as described below, flash tank 904 is rightly considered a part of the evaporation subsystem 906 and not the heating subsystem 902, and engine jacket heat exchanger 907 is rightly a part of the heating subsystem 902).

Closed-loop heating subsystem 902 comprises a rotary generator 908, preferably a natural gas or diesel engine, coupled to a rotary heating device 910, preferably a water brake dynamometer. The rotary heater 910 is plumbed in closed-loop fashion to a tank 912 that is vented to the atmosphere, a circulation pump 914, such as a centrifugal pump, an engine exhaust gas 960 heat exchanger 916, engine jacket heat exchanger 907 and a primary heat exchanger 918. It will be appreciated that the heating subsystem 902 may comprise any of the heating subsystems described with reference to FIGS. 1-8.

Also shown in FIG. 9 is rotary heater bypass 920 and bypass valve 921. In a preferred embodiment, the temperature T3 of the working fluid as it enters the primary heat exchanger 918 is used to control the position of the bypass valve 921 to maintain the temperature of the working fluid at a desired point, such as at a temperature below its atmospheric boiling point.

Also illustrated in FIG. 9 is an evaporating section 906 comprising a inlet 930 for the worked fluid (i.e., the fluid that is subject to evaporation), a positive displacement feed pump 932, preferably a Moyno metering pump, and a fluid-to-fluid heat exchanger 934 adapted to preheat the worked fluid with heat from the engine jacket coolant. Preheated worked fluid is pumped 935 to the primary heat exchanger 918 where it picks up additional energy from the heating subsystem 902. The heated worked fluid is pumped to the flash tank 904 through orifice or valve 936, which is selected to maintain sufficient pressure in the system to prevent the fluid from flashing (i.e., vaporizing) until it enters the flash tank 904. It is preferred that the flash tank operate at negative atmospheric pressure, typically around about 0.9 to 2.5 psia (i.e., a vacuum of about 25 to 28 inches of mercury). A vacuum system 938, such as a liquid ring pump, may be used to maintain the vacuum in the flash tank. It will be appreciated that as heated fluid enters the flash tank 904 a portion flashes off into steam (or vapor), which is drawn by vacuum system 938 to an air-to-fluid heat exchanger 940, preferably a finned tube heat exchanger. Ambient air 942a is forced through heat exchanger 940 to transfer heat from the fluid vapor to the air 942a. As will be described below, the heated air 942b will be used to evaporate fluid that collects in the flash tank 904.

The transfer of heat in heat exchanger 940 causes the fluid vapor to condense to liquid, which is collected in a condensate receiver 944. It is preferred that the condensate receiver 944 be equipped with a fluid level control adapted to control a condensate pump 946. The level control and pump 946 may be configured to maintain a relatively fixed fluid level in condensate receiver 944. It will be appreciated that condensed fluid 948, for example water, may be used for various purposes as needed (e.g., for desuperheating purposes) or disposed of as allowed.

Returning to the heat exchanger 940, heated air 942b exits the heat exchanger 940 and a portion is forced through the engine jacket heat exchanger or radiator 907, where the air 942b picks up additional heat. This heated air 942c along with the remainder of the air 942b is forced through one or more evaporation chambers 950. Evaporation chamber 950 may be considered a "clean" chamber insofar as the heated air 942c is relatively clean, typically having only natural contaminants, such as dust, pollen and the like.

A fluid pump 952, such as a variable positive displacement pump, is coupled to the flash tank 904 so that collected fluid, i.e. liquid, is pumped to evaporation chamber 950. It is preferred that spray nozzles or other types of misting or spraying devices be used to spray or mist flash tank 904 fluid inside chamber 950. In a preferred embodiment, one or more spray nozzles are located adjacent an upper surface of the chamber 950. Also in the preferred embodiment, heated air 942c is forced to flow substantially normal or perpendicular to the sprayed fluid to thereby evaporate at least a portion of the liquid. It will be appreciated that suitable baffles or other contact surfaces can be installed in chamber 950 to minimize or eliminate condensed fluid from exiting chamber 950 with heated moist air 942d.

Unevaporated fluid collects in the chamber 950 and a circulation pump 954 may be used to recirculate this fluid through the chamber for additional evaporation. Additionally, if desired, the fluid can be passed through a filtration or separation system 956 to remove particulates 957 from the fluid. It is preferred that separation system 956 comprises a hydrocyclone. Excess fluid from system 956 can be returned to the chamber 950 for evaporation. Recovered particulates 957 can be disposed of as allowed, or if a market exists for such recovered particulates, for example, for gypsum, sold.

If only one evaporation chamber 950 is utilized, it is preferred that chamber 950 comprise a fluid level control device adapted to control fluid pump 952, preferably a positive displacement pumps such as those offered by Moyno, to maintain the fluid flow and evaporation through chamber 950 at a desired level.

Optionally, an additional evaporation chamber 958 may be utilized as desired. This evaporation chamber 958 may be described as a "dirty" chamber in that exhaust gasses from rotary generator 908 (e.g., natural gas or diesel engine) may be used to further evaporate fluid.

Exhaust gasses 960 from the heat exchanger 916 are introduced, along with warm, moist air 942*d*, if desired, into chamber 958. Chamber 958 may be designed similarly to chamber or chamber 950. Fluid to be evaporated may be drawn from chamber 950 and sprayed or otherwise contacted with air 942*d* and gasses 960 to evaporate at least a portion of the fluid. Chamber 958 may likewise comprise a circulation pump 962 and filter/separation system 964, as desired. It will be appreciated that an additional benefit of "dirty" chamber 958 is that it can be used to scrub or clean the exhaust gasses 960 prior to discharge into the environment.

It will be appreciated that system 900 can be designed and operated to evaporate all of the fluid input into the system or only a portion of the fluid inputted. For those systems where less than complete evaporation is desired or required, evaporation chamber blowdown may be extracted and disposed of as allowed and required. For systems utilizing scrubbing of the exhaust gasses, disposal of at least a portion of the blowdown 966 will likely be required.

Figure 10:
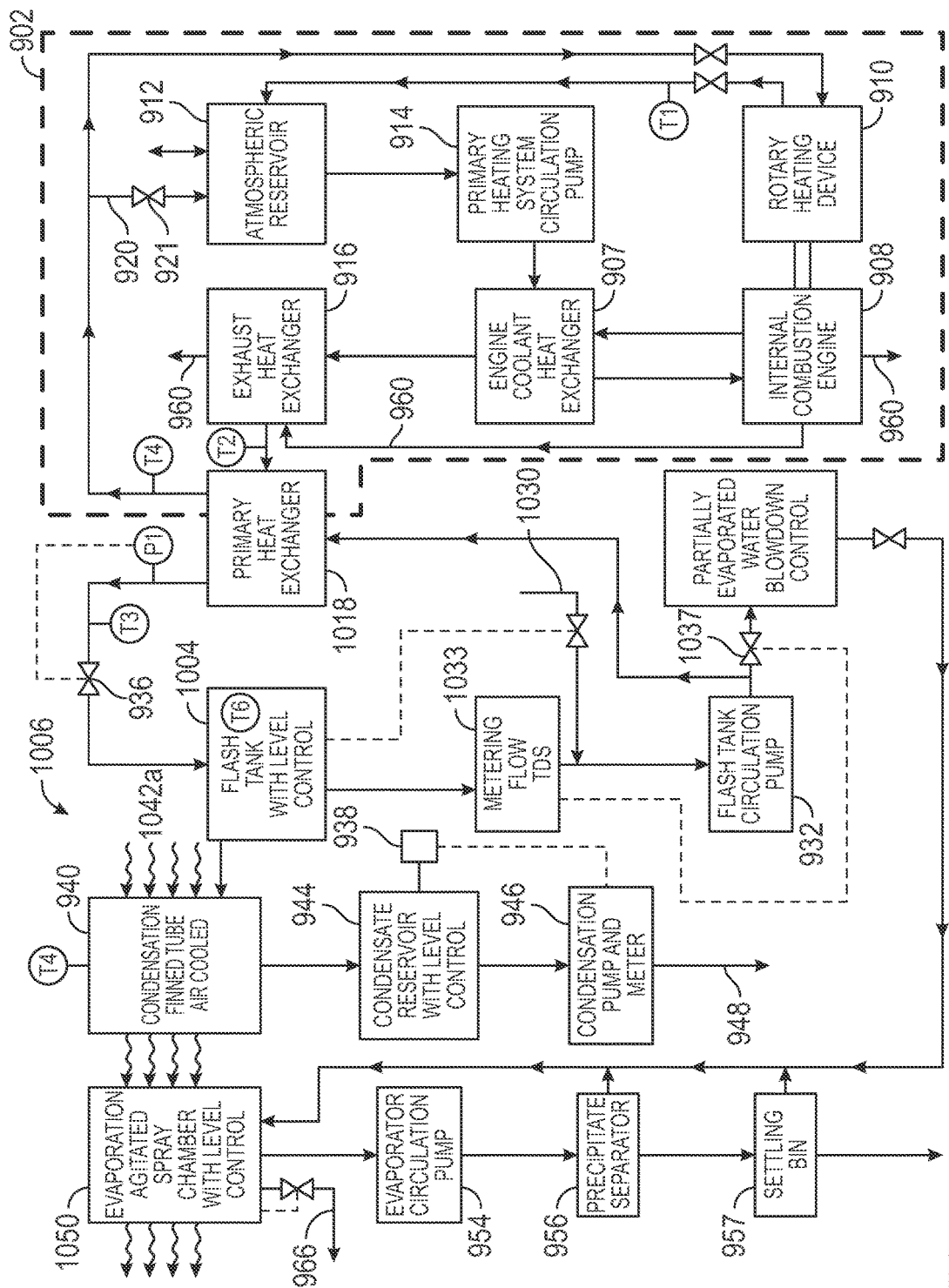
FIG. 10 illustrates another embodiment of a closed-loop fluid evaporating system utilizing a rotary heating device.
Figure 11:
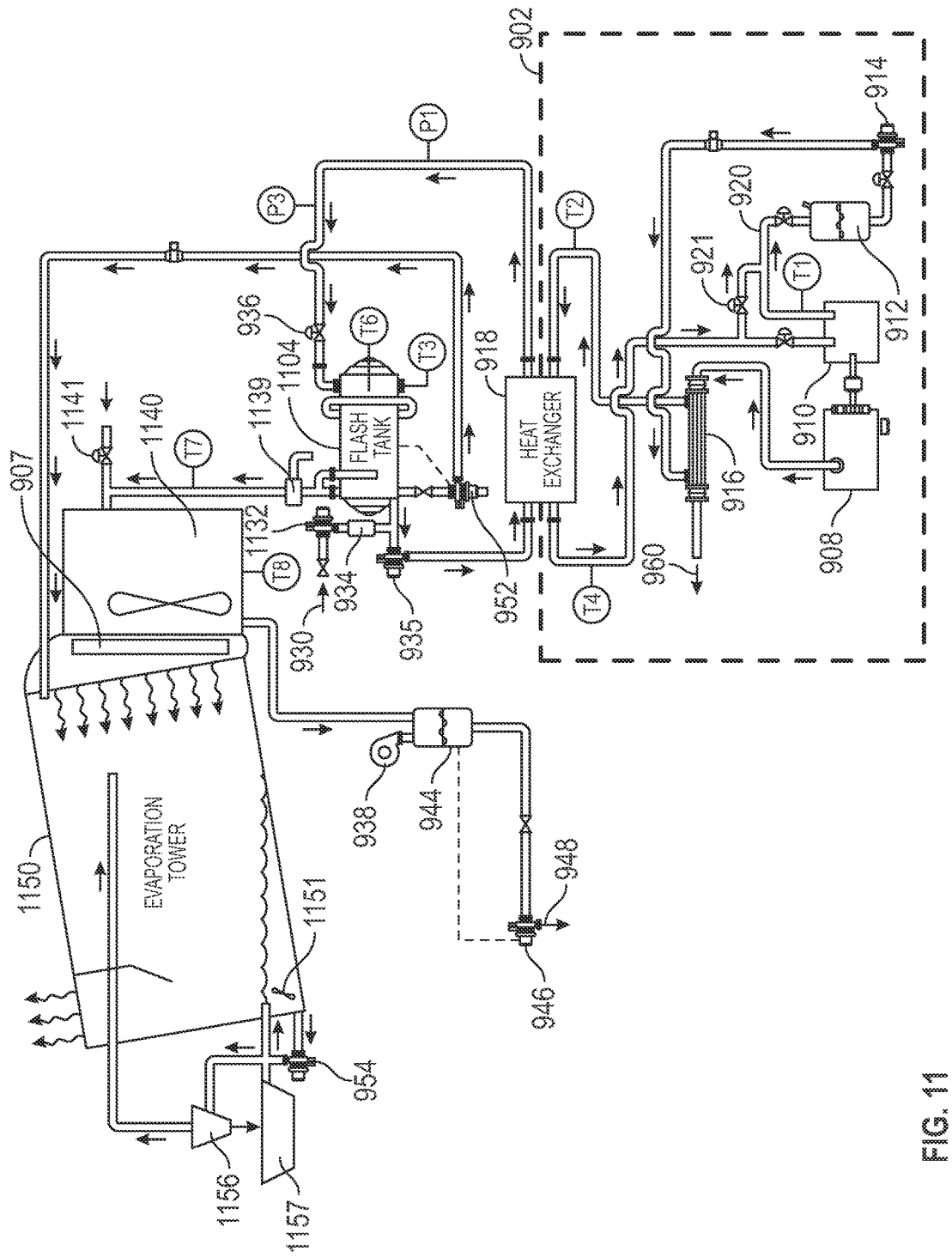
FIG. 11 illustrates yet another embodiment of a closed-loop fluid evaporating system utilizing a rotary heating device.

FIGS. 10 and 11 illustrate alternate embodiments of fluid evaporating systems and methods 1006, 1106. The detailed description set forth above with respect to FIG. 9 substantially applies to FIGS. 10 and 11 with common structures and functions having similar reference numbers. For example, in all of FIGS. 9, 10 and 11, the flash tank is identified by similar reference numbers 904, 1004 and 1104, respectively.

Concerning FIG. 10, incoming fluid 1030 is mixed with fluid from the flash tank 1004 and then split with a portion flowing directly to primary heat exchanger 1018 and back to the flash tank 1004, and the other portion diverted to the evaporation chamber 1050 for evaporation. In one embodiment, as the amount of total dissolved solids, TDS, in the flash tank increases, more fluid is diverted to the evaporation chamber 1050, which allows more new fluid 1030 to enter the system. For example, a TDS instrument 1033 may be used to control flow device 1037 based on the TDS value determined.

Additionally, FIG. 11 discloses the flash tank 1104 having a demister hood 1139 to ensure that the vapor conducted to the heat exchanger 1140 is relatively dry. In addition, chamber 1150 is disclosed as having an agitator system 1151 to keep any particulate matter suspended in the liquid fluid for removal by systems 1156 and 1157. FIG. 11 also shows a desuperheating inlet 1141 allowing the introduction of fluid, if needed, such as condensate, to desuperheat the steam entering the condenser 1140.

In the embodiment shown in FIG. 11, inlet pump 1132 may be controlled by a fluid level control associated with flash tank 1104, and evaporator pump 1152 may be controlled by the TDS of the fluid in the flash tank 1104 and/or a fluid level control in the evaporator chamber 1150. The embodiment shown in FIG. 11 may be operated to achieve substantially complete evaporation of the inputted fluid.

An embodiment of an evaporator system utilizing aspects of the present inventions was designed for produced water having total dissolved solids of about 9,000 parts per million. A 600 horsepower natural gas engine with a fuel consumption of 4,300 cubic feet per hour was selected as the prime mover. The system was designed to accept up to 7,135 pounds of produced water per hour (approximately 14.3 gallons per minute). The system was designed to evaporate approximately 100% of the produced water input or 7,135 pounds/hour, and to create approximately 2,651 pounds/hour condensate for use or disposal. The system was calculated to produce about 1,500 pounds/day of solids for disposal. The finned tube condenser was designed to have aluminum fins on carbon steel tubes having about 6,800 square feet of surface area and adapted to exchange about 3,337,565 BTU/hour. The heating section was designed to operate at between about 150 and 180° F. at about atmospheric pressure. The flash tank was designed to operate at about 130 to 170° F. at about 25 inches of mercury (vacuum). The condenser was designed to output air heated to about 130° F. at a velocity of about 60,000 cfm.

As will now be appreciated, FIGS. 9, 10 and 11 illustrate merely three of many embodiments of a fluid evaporator comprised of a flameless heating subsystem and an evaporation subsystem. Depending upon the characteristics of the fluid to be evaporated (the worked fluid), the environment in which the system will be used and economic considerations, the evaporation system may be designed and operated to evaporate substantially all of the worked (e.g., produced water) or only a portion of the worked fluid, with the remainder being disposed of, if necessary, by allowable and economic means.

It will also be appreciated that any of the embodiments illustrated and described in FIGS. 7-11 may be implemented with any of the various heating subsystems described herein, including, but not limited to, a rotary heating subsystem, a direct fired or open flame heating system or an genset/electric boiler subsystem.

Figure 12A:
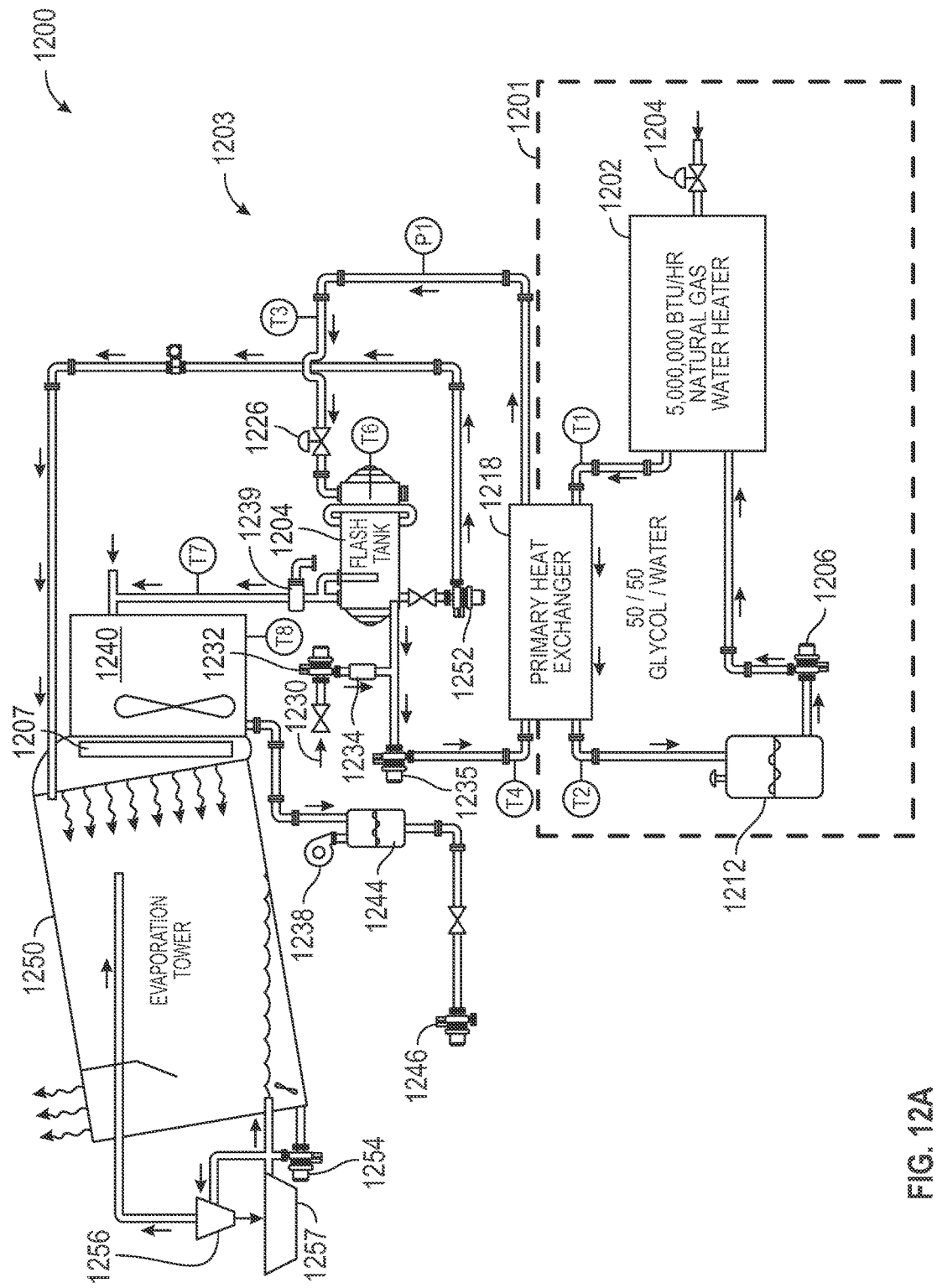
FIG. 12A illustrates a closed-loop fluid evaporating system utilizing a direct-fired boiler.

FIG. 12A illustrates a fluid evaporating system and method comprising a direct-fired heating subsystem coupled to a single chamber evaporation subsystem. For all intents and purposes, the systems illustrated in FIGS. 11 and 12A are the same except that the fluid heating subsection 1202 in FIG. 12A is direct fired. Thus, the description and operation of the fluid evaporating subsystem in FIG. 11 applies to the fluid evaporating subsystem of FIG. 12, where similar structures have similar numbers. For example, flash tank is 1104 in FIGS. 11 and 1204 in FIG. 12A.

Concerning the fluid system 1201, this subsystem is similar to the fluid heating system illustrated and described in FIG. 6. The heating system 1200 comprises a direct-fired fluid heater 1202, which is preferably a 5,000,000 BTU/hr natural gas water heater, such as a Parker Boiler Model 6200. It is contemplated that the heater 1202 would be fired with waste gas from the field metered into the heater 1202 through pressure control valve 1204. Therefore, it is desirable that the heater 1202 burner controls (not shown) allow for substantially real-time gas-to-air adjustments to account for changing gas quality. The working fluid in the closed-loop heating circuit is preferably a 50/50 mixture of water and glycol. The heater 1202 heats the working fluid to temperature T1, which may be, for example, 210° F. The heated working fluid is pumped 1206 through a fluid-to-fluid heat exchanger 1218 to transfer heat from the working fluid to the worked fluid. Working fluid exits the heat exchanger 1218 and enters an atmospheric reservoir or accumulator 1212. Pump 1206 draws working fluid out of the reservoir 1212 and feeds it back to heater 1202. A temperature transducer T1 cooperates with controllable valve 1206 to control the temperature of the working fluid. In the system illustrated in FIG. 12A, the worked fluid may be heated to about 170° F. Disclosure of the structure and/or functions for reference numerals 1203, 1207, 1224, 1230, 1232, 1234, 1235, 1238, 1239, 1240, 1244, 1246, 1250, 1252, 1254, 1256 and 1257 can be found by consulting similarly referenced structures and functions discussed with respect to FIG. 11, i.e, reference numerals 1103, 1107, 1124, 1130, 1132, 1134, 1135, 1138, 1139, 1140, 1144, 1146, 1150, 1152, 1154, 1156 and 1157.

Figure 12B:
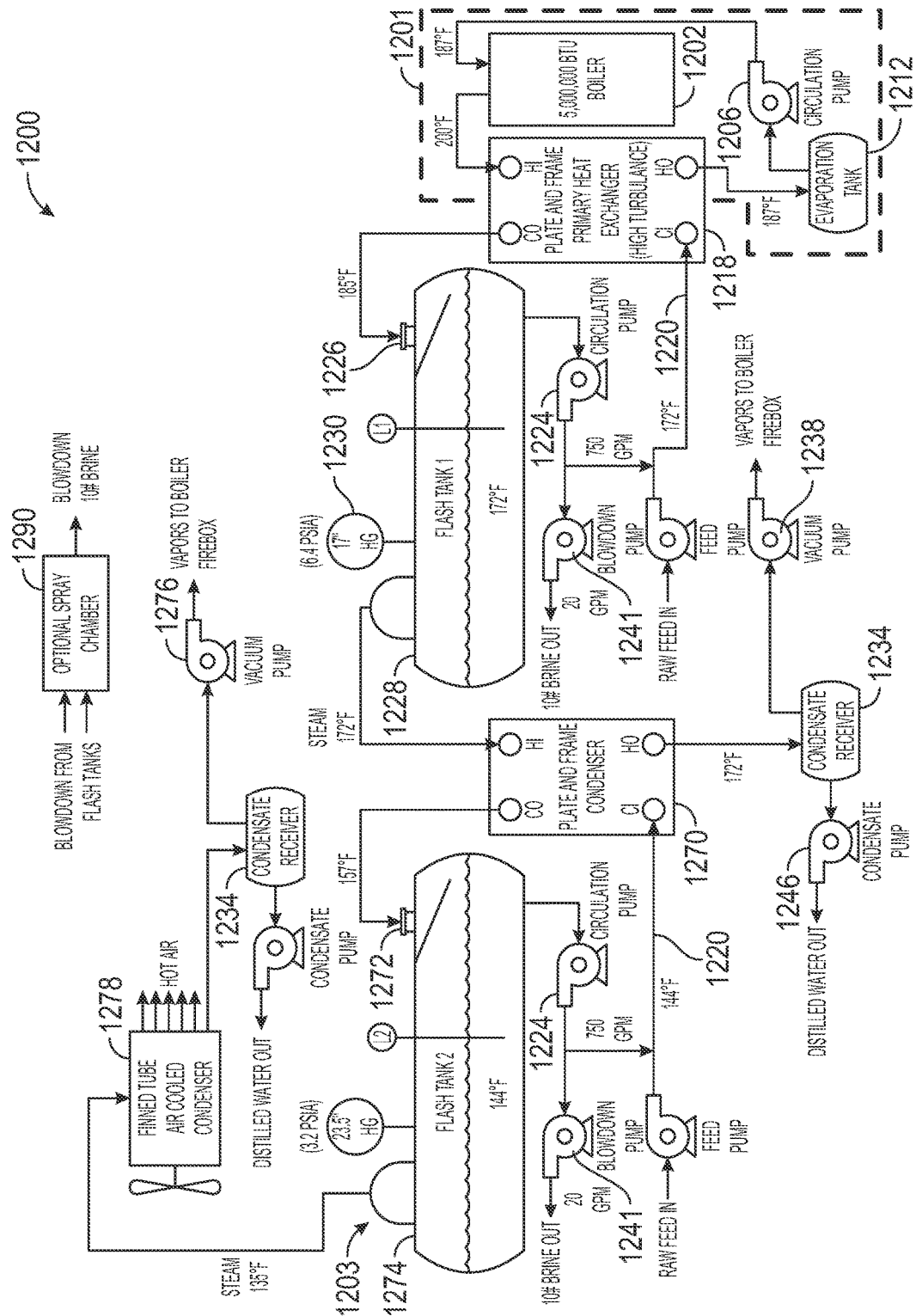
FIG. 12B illustrates a closed-loop, multiple effect fluid evaporating system utilizing a direct-fired boiler.
Figure 12C:
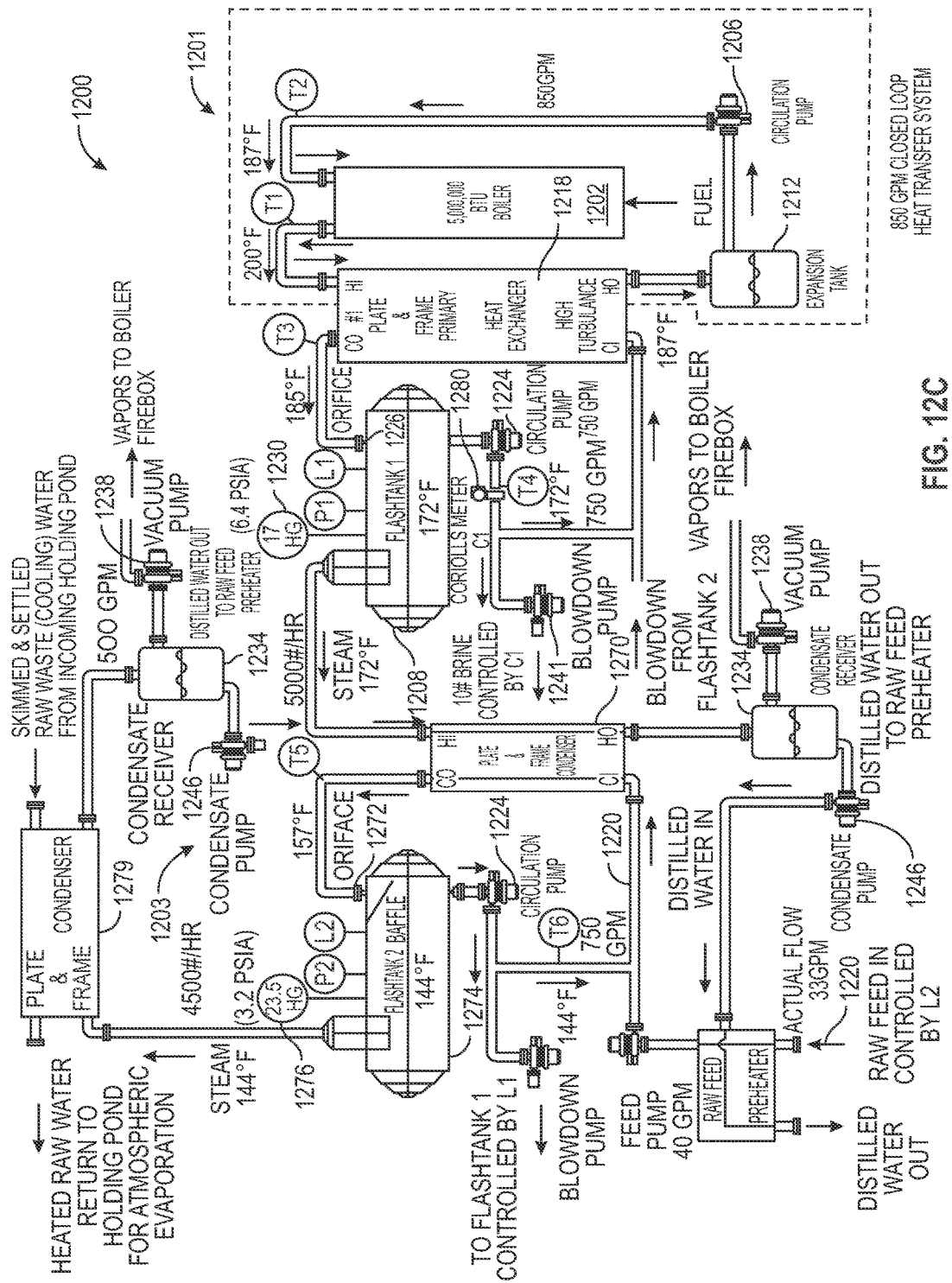
FIG. 12C illustrates another embodiment of a closed-loop, multiple effect fluid evaporating system utilizing a direct-fired boiler.

FIGS. 12B and 12C illustrate other fluid concentrating systems 1200 in accordance with aspects of the present inventions using multiple-effect evaporation. As is known, multiple-effect evaporation is an evaporation process for efficiently using the heat from steam to evaporate water. In a multiple-effect evaporator, water is boiled in a sequence of vessels, each operated at a successively lower pressure. Because the boiling temperature of water decreases as pressure decreases, the vapor (i.e., steam) boiled off in one vessel can be used to heat the next, and only the first vessel, which operates at the highest pressure requires an external source of heat. Evaporation systems with more than four stages are rarely practical, although some multiple-effect systems have up to seven stages.

As illustrated, the fluid evaporating system 1200 of FIG. 12B comprises a heating subsystem 1201, such as any of those described above with respect to FIGS. 1-6. The particular fluid heating subsystem 1201 illustrated in FIG. 12B is a closed-loop subsystem similar to that illustrated in and described by FIGS. 6 and 12A. The reference numbers and descriptions used for FIG. 12A are applicable to FIG. 12B as well. For example, direct-fired heater 1202 in FIG. 12A is direct fired heater 1202 in FIG. 12B. The heating subsystem show in FIG. 12B is preferably configured to achieve a 750 gallon/minute flow rate.

The fluid evaporating system 1200 also comprises an evaporating subsystem 1203. In subsystem 1203, pressurized and metered fluid 1220 is circulated to primary heat exchanger 1218 where the fluid 1220 is heated by the working fluid from heating subsystem 1201. Heated fluid 1220 is passed through an orifice or valve 1226 adapted to create a pressure differential across the device 1226. The fluid 1220 is flashed into tank 1228 where it is separated into its vapor and liquid phases. The flash tank 1228 is preferably operated under negative atmospheric pressure of about 6.4 psia (i.e., a vacuum of about 17 inches of mercury). A vacuum system 1230, such as a liquid ring pump, may be used to maintain the system vacuum.

The vapor phase of fluid 1220, such as steam at about 172° F., is passed through a heat exchanger 1270, which may be a fluid-to-fluid heat exchanger. Heat exchanger 1270 functions to transfer heat from the first evaporation stage to the second evaporation stage. In the second stage, pressurized and metered fluid 1220 is circulated to heat exchanger 1270 where the fluid 1220 is heated by the steam from the first evaporation stage. Heated fluid 1220 is passed through an orifice or valve 1272 adapted to create a pressure differential across the device 1272. The fluid 1220 is flashed into tank 1274 where it is separated into its vapor and liquid phases. The flash tank 1274 is operated under atmospheric pressure less than the operating pressure of tank 1228 (first stage tank), e.g., at about 3.2 psia (i.e., a vacuum of about 23.5 inches of mercury). A vacuum system 1276, such as a liquid ring pump, may be used to maintain the system vacuum.

The vapor phase of fluid 1220, such as steam at about 135° F., may be passed through a heat exchanger 1278, which may be an air-to-fluid heat exchanger. The steam, or a portion thereof, is condensed by heat exchanger 1278 and passed to a condensate receiver 1234, which, preferably is operated under vacuum 1230 by vacuum pump 1238 to remove any volatile components. Any such volatiles may be feed as fuel to the heating subsystem 1201. A condensate pump 1246 may be used to remove the condensate, e.g., distilled water, from the condensate receiver. Similarly, the steam entering heat exchanger 1270 is condensed and may be collected in receiver 1234.

Referring back to flash tanks 1228 and 1274, concentrated liquid accumulates in each tank and may be circulated by pumps 1224. A metering and detecting system may be used to assess, determine or calculate one or more properties of the concentrated fluid. For example, a system can be implemented to determine the temperature, density, specific gravity, conductivity, flow rate or other property or characteristic of the concentrated fluid. An extraction system 1241, such as a variable speed pump may be adapted to extract the desired concentrated fluid from the system 1200 when it has the desired properties. A metering device may be used to determine the amount of concentrated fluid removed from the system.

Also, as illustrated in FIG. 12B, concentrated fluid from tank 1228, at about 172° F. is mixed with incoming fluid 1220 to raise the fluid temperature before it enters primary heat exchanger 1218. Similarly, concentrated fluid from tank 1274, at about 144° F. is mixed with incoming fluid 1220 to raise the fluid temperature before it enters heat exchanger 1270.

It will now be appreciated that the system illustrated in FIG. 12B can be used to evaporate fluids, such as produced water or flowback. For example, it is postulated that the system illustrate in FIG. 12B can process about 875 barrels of produced water having a total dissolved solids of 60,000 ppm into about 688 barrels of distilled water and 210 barrels of 10 $lb_f$-Brine solution every 24 hours. The optional spray chamber 1290 illustrated in FIG. 12B will dispose of another 250 barrels of produced water in a 24 hour period.

Oftentimes, an amount of fluid to be evaporated or processed will be stored in large volumes in an open pit, storage device, tank, or other retention area. Usually such storage device will be open to atmosphere, such that the fluid will exist at ambient temperature and ambient pressure. It is preferred, but not necessary, that solids be allowed to settle out and lighter components, such as oil or other hydrocarbons, to be skimmed off for use or sale. The fluid of interest can then be suctioned out of the tank.

An additional stage of evaporation may be achieved by replacing the air-to-fluid condensing heat exchanger, such as, but not limited to, condenser 1278 in FIG. 12B, with a fluid-to-fluid heat exchanger, such as, but not limited to, a plate and frame heat exchanger and using the untreated fluid in the storage device for cooling. FIG. 12C, for which reference to the description of FIG. 12B should be made, illustrates a system 1203 with a fluid-to-fluid condensing heat exchanger 1279. After passing through the fluid-to-fluid heat exchanger 1210, the heated untreated fluid may be sprayed or passed over an inclined plate on its return to the retention area. This addition would utilize the absorbed heat to evaporate an additional portion of the fluid. Heat not removed by the latent heat of evaporation would be recovered as preheated incoming fluid to the evaporation or other fluid manipulating system. Those of skill will appreciate that the cost of an air-to-fluid heat exchanger typically will be higher than a fluid-to-fluid heat exchanger for the modification discussed here.

It will also be appreciated that the evaporator systems can be used to remove (by evaporation) fluid from the worked fluid to effectively concentrate the worked fluid. The concentrated fluid can be extracted from one or more of the evaporation spray chambers. It will also be appreciated that it may not be desirable to concentrate certain worked fluids (e.g., a diluted well completion fluid) by forcing heated ambient air through the fluid. Particles entrained in the air, such as dirt, dust, pollen, or exhaust gasses may contaminate the worked fluid.

It will be appreciated that the evaporator systems described herein also produce a "blowdown" fluid, such as the liquid in the flashtank(s). Depending on the raw fluid from which water is evaporated, the blowdown may be a desirable product. For example, when evaporating produced water, the blow down likely will be a concentrated brine solution, which have many oil field uses. As shown in the various Figures provided with this disclosure and as discussed herein, a measurement device or meter may be used to determine one or more properties of the flash tank liquid phase, so that the liquid phase, or a portion of the liquid phase, may be withdrawn when the desired fluid properties are reached. For example, meter 1280 is illustrated in FIG. 12C. A measurement device that is presently preferred for all my inventions disclosed herein is the ProMass line of flow meters offered by Endres+Hauser.

Thus, my inventions can be adapted to create a fluid concentrator subsystem comprising a flash tank in which the heated worked fluid is separated into vapor (e.g., steam) and liquid portions. The steam portion may be passed through an air-to-fluid heat exchanger to condense the steam back to liquid. The condensed liquid may be removed from the worked fluid thereby concentrating the worked fluid.

Figure 13A:
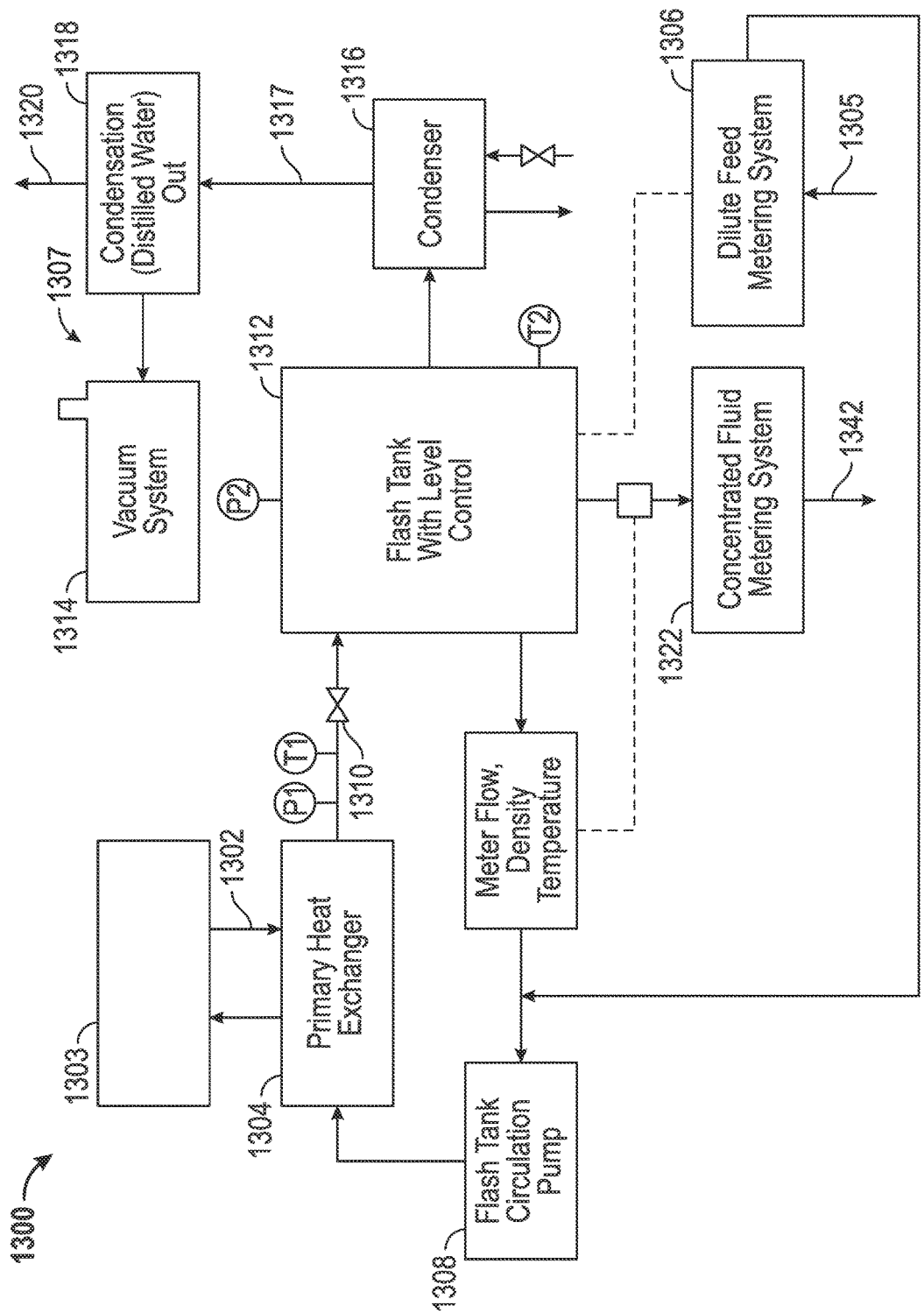
FIG. 13A illustrates a fluid concentrating subsystem.
Figure 13B:
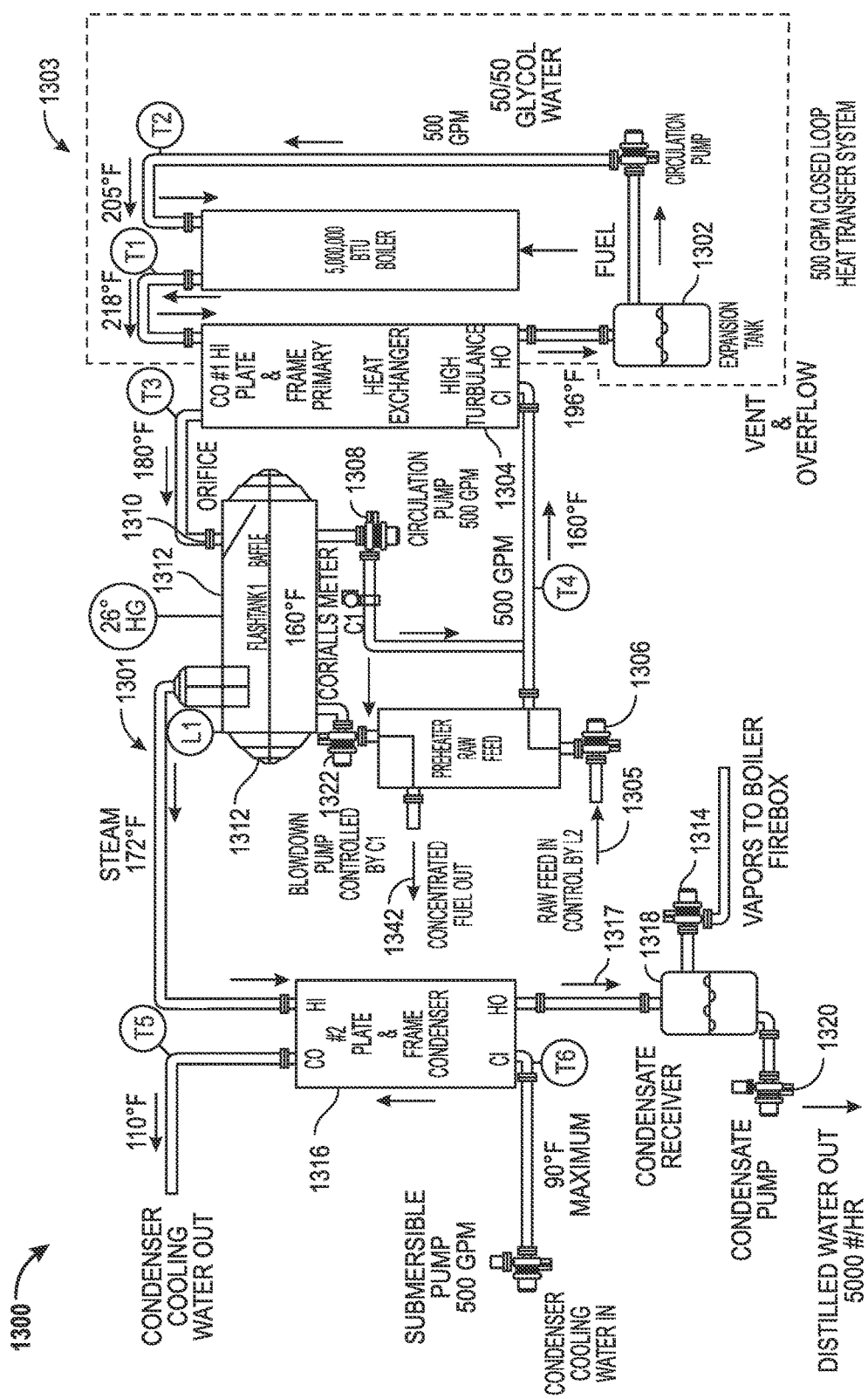
FIG. 13B illustrates a direct-fired fluid concentrating system.

Turning now to FIGS. 13A and 13B, embodiments of a fluid concentrating subsystem 1300 are presented. These two embodiments utilize primary heat exchangers 1304 that separate the working fluid 1302 heating subsystem 1303 from the concentrating subsystem 1301. It will be appreciated that any of the foregoing heating subsystems described with respect to FIGS. 1-12C may be used with the fluid concentrating subsystems illustrated in FIGS. 13A and 13B. FIG. 13B illustrates a direct-fired heating subsystem 1303.

It also will be appreciated from this disclosure that an opened-loop fluid concentrating system may be designed by, among other things, eliminating the primary heat exchanger 1304. For example, the opened-loop fluid evaporating system of FIG. 7 can be modified according to the teaching of this disclosure to produce an opened-loop fluid concentrating system.

Returning to FIGS. 13A and 13B, diluted fluid (aka the "worked" fluid), such as a completion fluid recovered from a well, 1305 is introduced into the system 1300. A metering system 1306 may be used to determine the amount of diluted fluid introduced. A circulation pump 1308 is used to circulate the diluted fluid through the primary heat exchanger 1304 to pick up heat from the heating subsystem 1303. The heated, dilute fluid 1305 flows through a valve or other flow restriction device 1310 configured to create a pressure differential across the device 1310 of about 30 psid. The fluid 1305 is flashed into tank 1312 where the fluid is separated into its vapor and liquid phases.

The flash tank 1312 is preferably operated under negative atmospheric pressure of about 0.9 to 2.5 psia (i.e., a vacuum of about 25 to 28 inches of mercury). A vacuum system 1314, such as a liquid ring pump, may be used to maintain the system vacuum. The vapor phase of fluid 1305, such as steam, is passed through a heat exchanger 1316, which may be a fluid-to-fluid or air-to-fluid heat exchanger. Heat exchanger 1316 functions as a condenser to condense the fluid vapor to its liquid phase, e.g., water. The condensed fluid 1317 is collected in a reservoir 1318. Alternately, the condensate can be used to preheat the incoming fluid 1305. It is preferred that reservoir 1318 be equipped with a level control system that controls a condensate pump 1320. It will be appreciated that the condensate that is produced by system 1300 is relatively clean and may be used for a variety of purposes or discarded as allowed.

Referring back to flash tank 1312, concentrated liquid fluid 1342 accumulates in the tank and may be withdrawn by a fluid extraction and metering system 1322, such as described below with respect to FIGS. 15 and 16.

Figure 14:
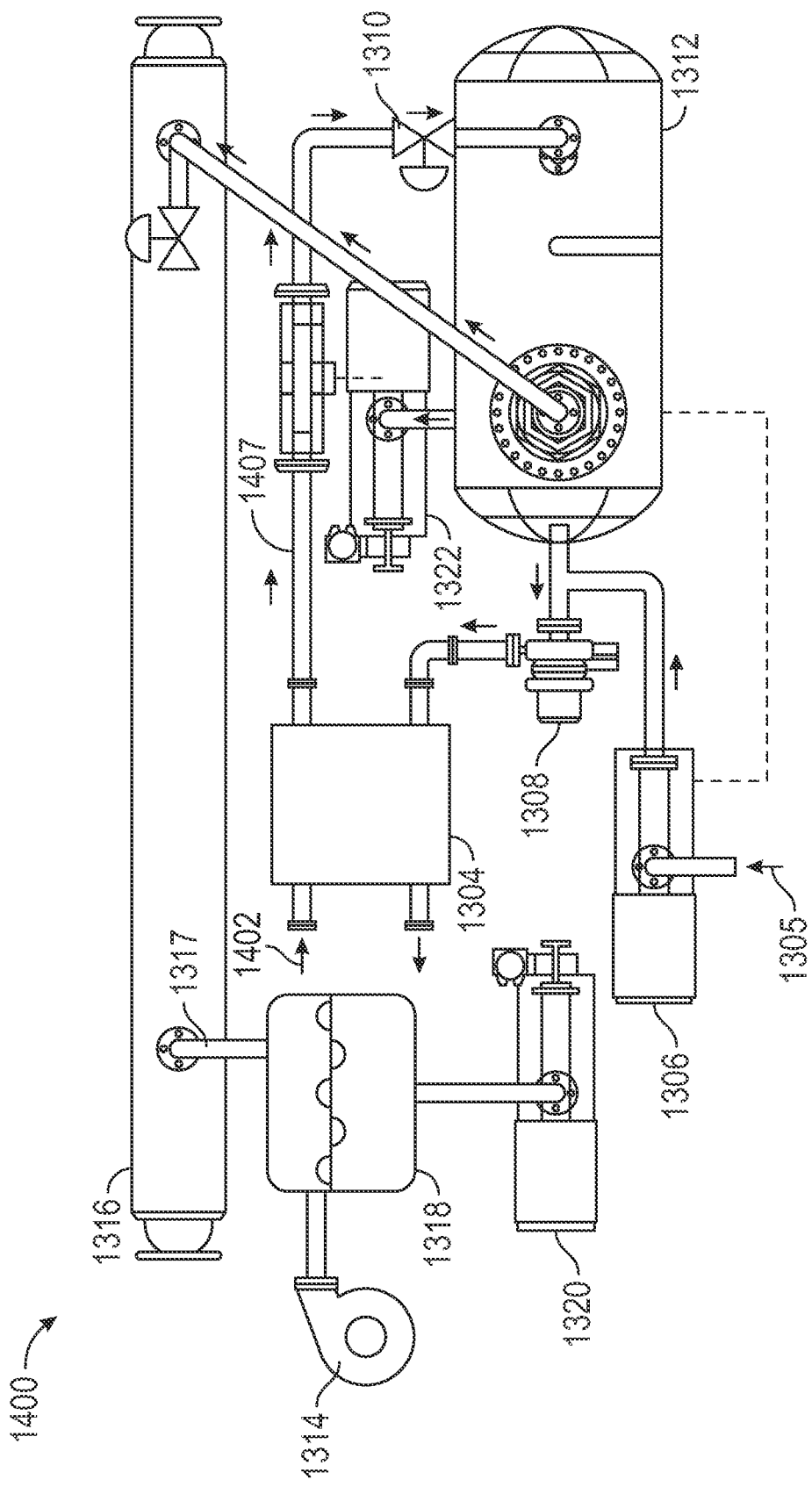
FIG. 14 illustrates a closed-loop fluid concentrating system adapted for use on an offshore rig.

In addition to being coupled to opened-loop or closed loop heating subsystems, such as those described above with reference to FIGS. 1-6, the fluid concentrating subsystem embodiments described in FIGS. 13A and 13B are particularly suited for use on offshore drilling or production platforms. FIG. 14 illustrates a fluid concentrating system adapted for an offshore rig, in which the heating subsystem 1402 (not shown) comprises the stationary engines of the rig. The description with respect to FIGS. 13A and 13B apply to like structures in FIG. 14. In such application, an existing thermal energy source from the rig or platform may be utilized. For example, and preferably, the primary working fluid 1302, 1402 is preferably a fluid heated by conventional rig equipment, such as one or more internal combustion engines. For example, the working fluid may comprise the liquid coolant from diesel engines (e.g., water jacket coolant).

Figure 15:
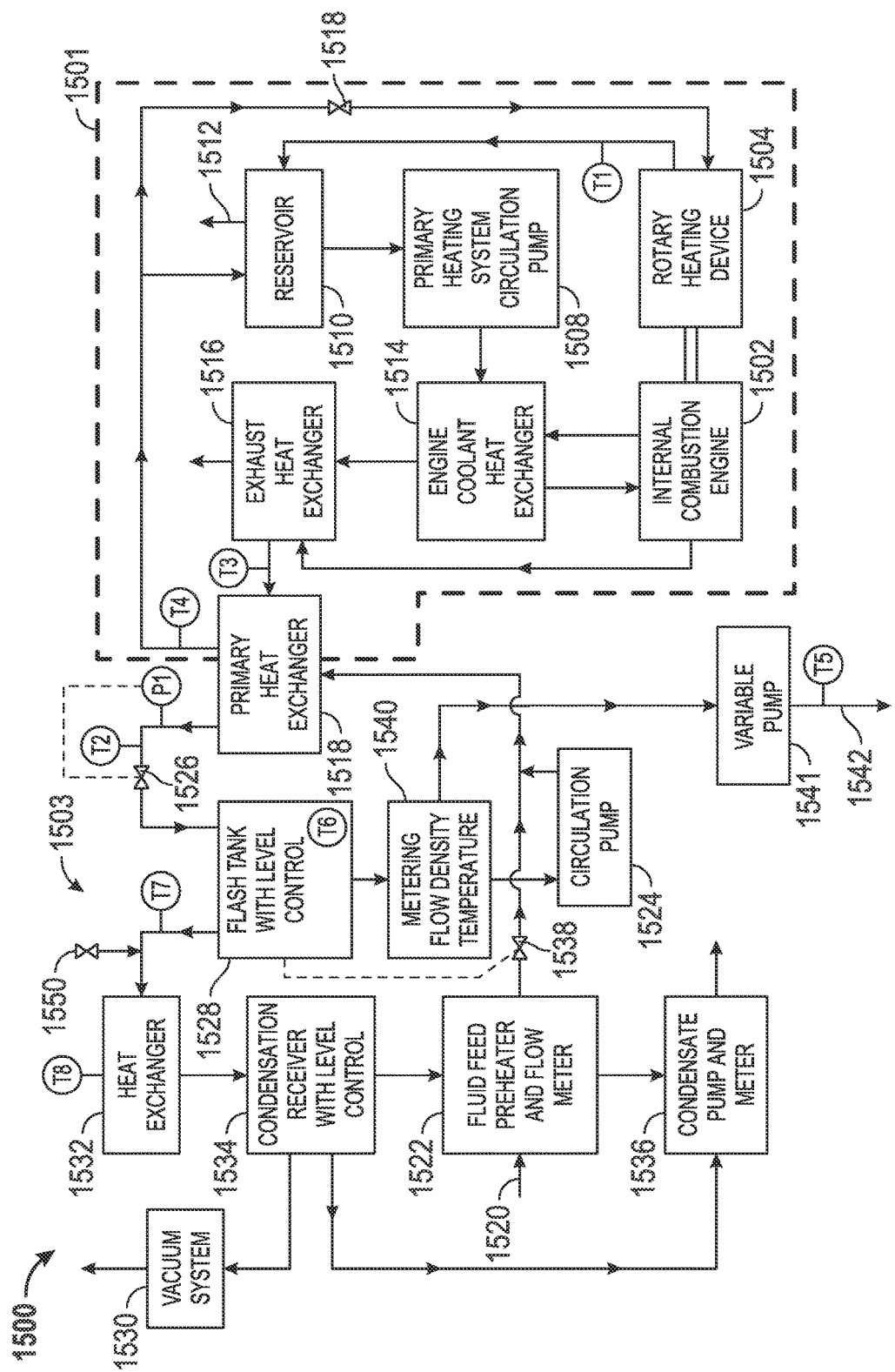
FIG. 15 illustrates another embodiment of a closed-loop fluid concentrating system utilizing a rotary heating device.
Figure 16:
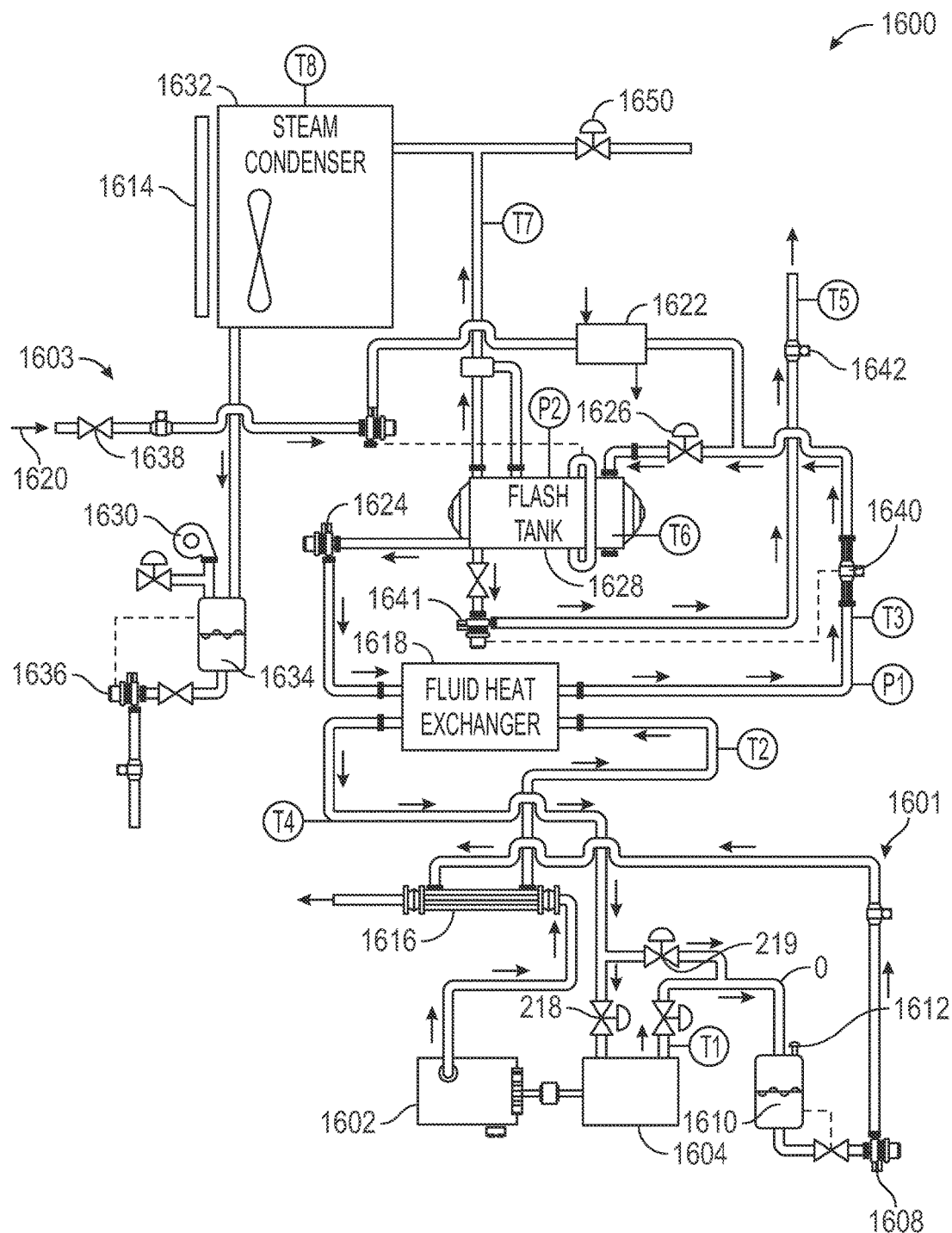
FIG. 16 illustrates yet another embodiment of a fluid concentrating system.

FIGS. 15 and 16 illustrate fluid concentrating systems 1500 and 1600 in accordance with aspects of the present inventions. For purpose of this description, like elements have like reference numerals. Thus, for example, the condensate reservoir is referenced as structures 1534 and 1634 in FIGS. 15 and 16, respectively. While only reference numbers found in FIG. 15 may be described, this description will be understood to apply equally to similarly referenced elements in FIG. 16.

The fluid concentrating system 1500, 1600 comprises a flameless heater subsystem 1501, 1601, such as those described above with respect to FIGS. 1-6. The particular fluid heating subsystem illustrated in FIGS. 15 and 16 is a closed-loop subsystem similar to that illustrated in and described by FIG. 2. The reference numbers and descriptions used for FIG. 2 are applicable to the heating subsystems 1501 and 1601 of FIGS. 15 and 16 as well. For example, rotary heating device 204 in FIG. 2 is rotary heating device 1504 in FIGS. 15 and 1604 in FIG. 16.

The fluid concentrating system 1500, 1600 also comprises a concentrating subsystem 1503, 1603. In subsystem 1503 and 1603, fluid to be concentrated 1520, 1620 (aka, the "worked" fluid) is preheated in heat exchanger 1522, 1622, which is adapted to transfer heat from the condensed fluid, as will be described below, or from the engine 1502, 1602 water jacket as described previously. Pressurized and metered fluid 1520, 1620 is circulated to primary heat exchanger 1518, 1618 where the fluid 1520, 1620 is heated by the working fluid from heating subsystem 1501, 1601. Heated fluid 1520, 1620 is passed through an orifice or valve

1526, 1626 adapted to create a pressure differential across the valve 1526, 1626 of about 30 psid. The fluid 1520,1620 is flashed into tank 1528, 1628 where it is separated into its vapor and liquid phases. The flash tank 1528, 1628 is preferably operated under negative atmospheric pressure of about 0.9 to 2.5 psia (i.e., a vacuum of about 25 to 28 inches of mercury). A vacuum system 1530,1630, such as a liquid ring pump, may be used to maintain the system vacuum.

The vapor phase of fluid 1520, 1620, such as steam, is passed through a heat exchanger 1532, 1632, which may be a fluid-to-fluid or air-to-fluid heat exchanger. Heat exchanger 1532, 1632 functions as a condenser to condense the worked fluid vapor to its liquid phase. The condensed worked fluid is collected in a reservoir 1534, 1634 and, as mentioned above, may be passed through preheater 1522, 1622 to preheat the fluid 1520, 1620 (and to cool the condensate). As shown in FIGS. 15 and 16A, the preheater 1522, 1622 utilizes water jacket coolant from engine 1502, 1602. It is preferred that reservoir 1534, 1634 be equipped with a level control system that controls a condensate pump 1536, 1636. It will be appreciated that the condensate that is produced by system 1500, 1600 is relatively clean and may be used for a variety of purposes or discarded as allowed.

Referring back to flash tank 1528, 1628, concentrated liquid fluid accumulates in the tank 1528, 1628 and may be circulated by pump 1524, 1624. A metering and detecting system 1540, 1640 may be used to assess, determine or calculate one or more properties of the concentrated fluid. As previously mentioned, the Promass line of flow meters offered by Endres+Hauser are suitable for this implementation. For example, system 1540, 1640 can be adapted to determine the temperature, density, specific gravity, conductivity, flow rate or other property or characteristic of the concentrated fluid. An extraction system 1541, 1641, such as a variable speed pump controlled by system 1540, 1640 may be adapted to extract the desired concentrated fluid from the system 1500. A metering device may be used to determine the amount of concentrated fluid removed from the system.

A valve or other flow-restricting device 1538, 1638 may control the amount of incoming fluid 1520, 1620 allowed into the subsystem 1503, 1603, which valve may be controlled by a fluid level device in flash tank 1528, 1628. In other words, additional fluid is allowed into subsystem 1503, 1603 to maintain a desired level of fluid in flash tank 1528, 1628. As fluid is extracted from the subsystem 1503, 1603 through valve 1542, 1642, the liquid level in tank 1528, 1628 decreases thereby allowing more fluid 1520, 1620 into the system. To the extent it is desired to cool extracted concentrated fluid, such fluid may be used, for example, to preheat incoming fluid 1520.

Also illustrated in FIGS. 15 and 16 is an optional desuperheat inlet into heat exchanger 1532, 1632. In the event the steam entering the heat exchanger is superheated, fluid, such as liquid water, can be introduced through valve 1550, 1650 to desuperheat the steam. Condensate removed from the system can be used for this purpose.

Figure 17:
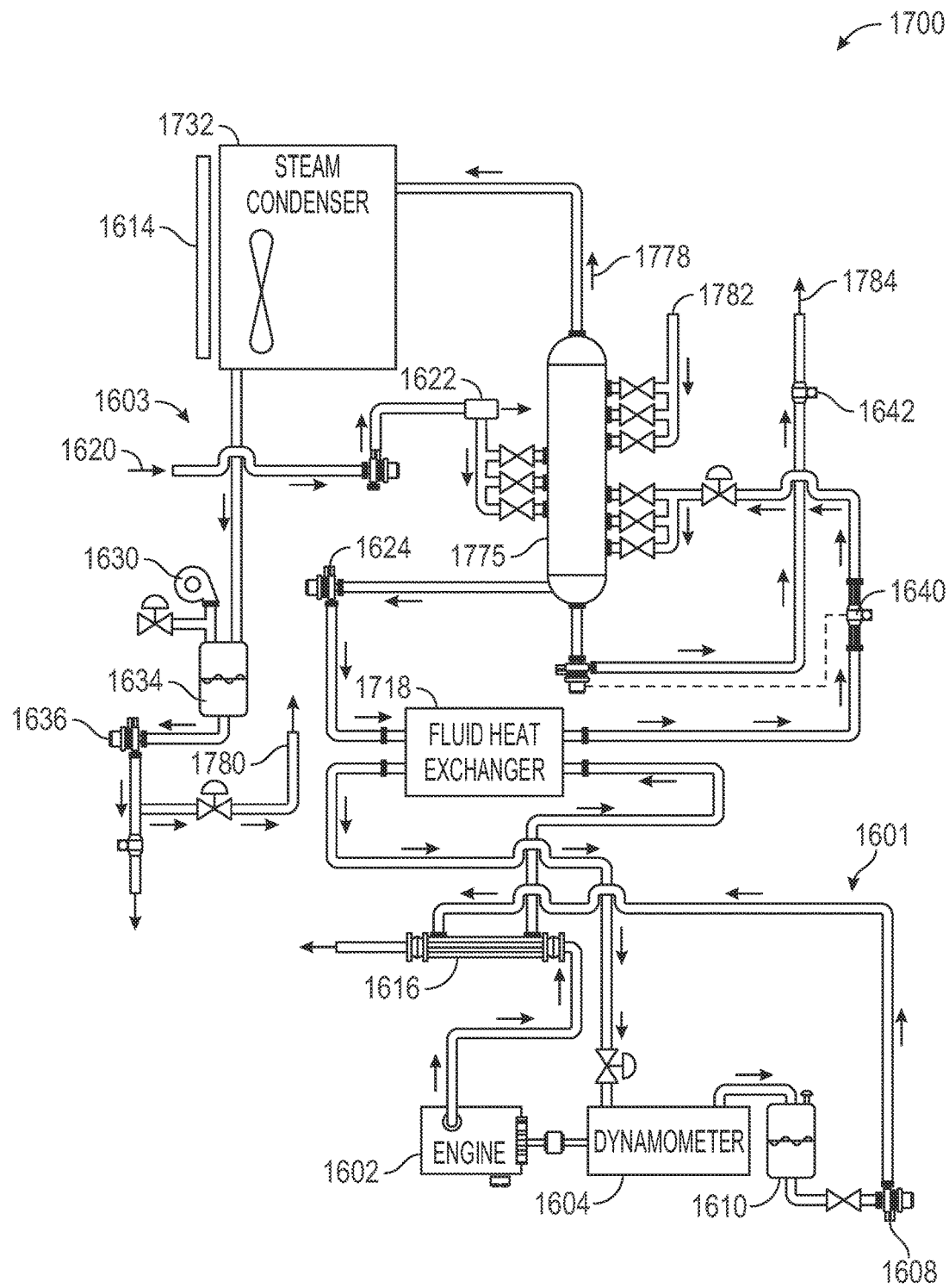
FIG. 17 illustrates an embodiment of a fluid separating or fractionating system.

FIG. 17 illustrates a fluid separating system 1700 according to aspects of the invention previously described, such as in FIGS. 1-16, and like structures have similar reference numbers. For example, in FIG. 16 the fluid heat exchanger is reference number 1618 and in FIG. 17 it is 1718. System 1700 incorporates a fluid separation tower or fluid fractionating tower 1775 to separate the heated fluid into some or all of its boiling point fractions. As is well known in the art, fractionating columns separate a fluid mixture by condensing vapor fluids in accordance with Raoult's law. Each condensation-vaporization cycle causes fluid vapor of a particular boiling point to be separated out. Fluid 1778 exiting the top of the column 1775 is vapor and is passed to condenser 1732 to be condensed back to a liquid. The condensed liquid 1780 may be reinjected into the column 1775 through reflux lines 1782. It will be appreciated that concentrated fluid 1784 exits system 1700 from the bottom of the column or tower 1775.

Figure 18:
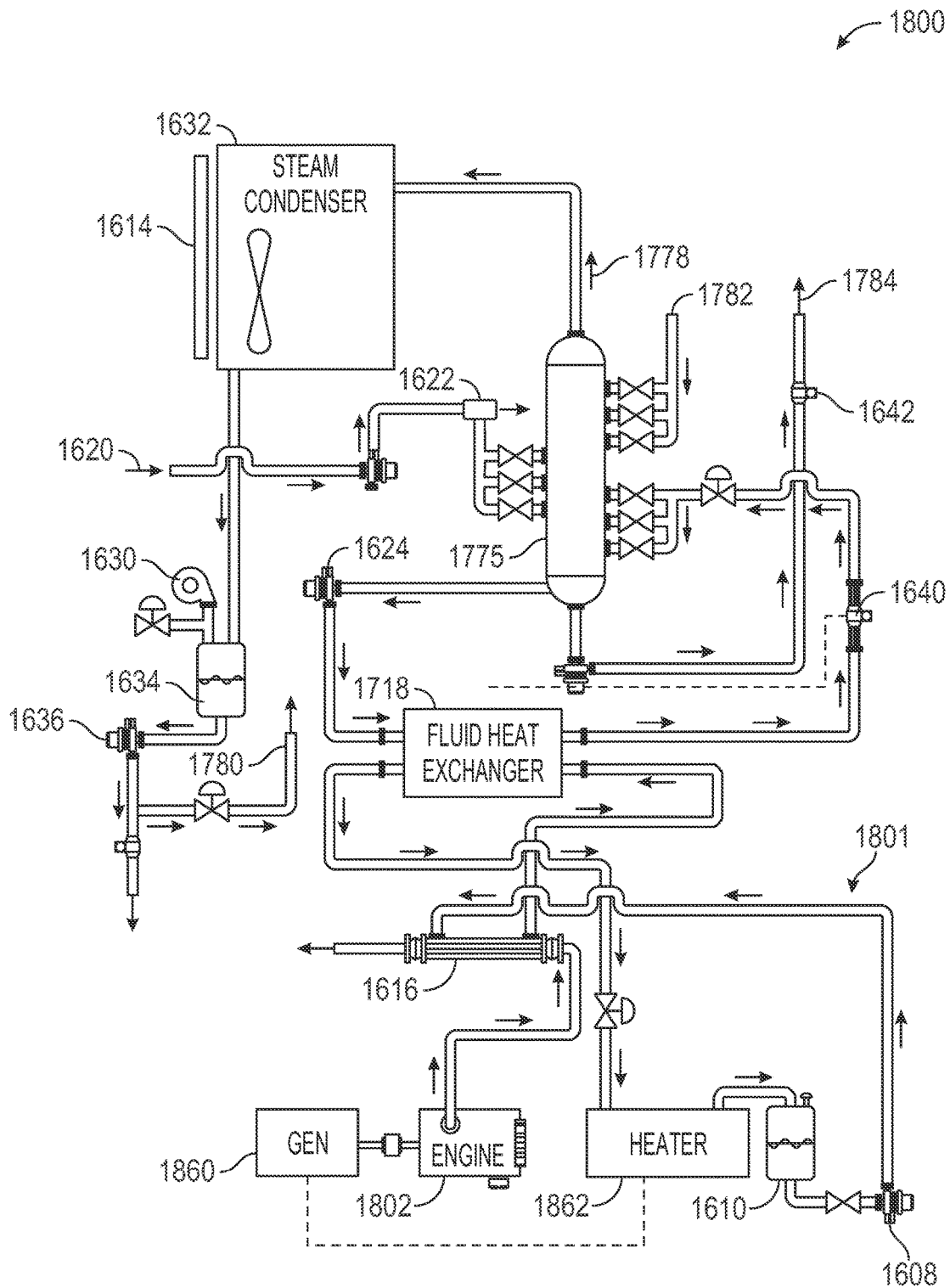
FIG. 18 illustrates another embodiment of a fluid separating or fractionating system

FIG. 18 illustrates another fluid separating system 1800 in which the heating subsystem 1801 comprises engine 1802 that drives an electrical generator 1860, such as described with reference to FIG. 3, rather than rotary heater, such as heater 1604. The energy generated by generator 1860 is used, at least, to heat the working fluid in an electrical heater 1862. In all other material respects, the embodiments illustrated in FIGS. 17 and 18 are similar.

As with other systems described herein, it is preferred, but not required that the worked fluid be limited to temperatures below its atmospheric boiling point. Thus, it is preferred that the systems be operated under vacuum. However, this is not required and is left to the design considerations of the particular system being implemented.

Figure 19A:
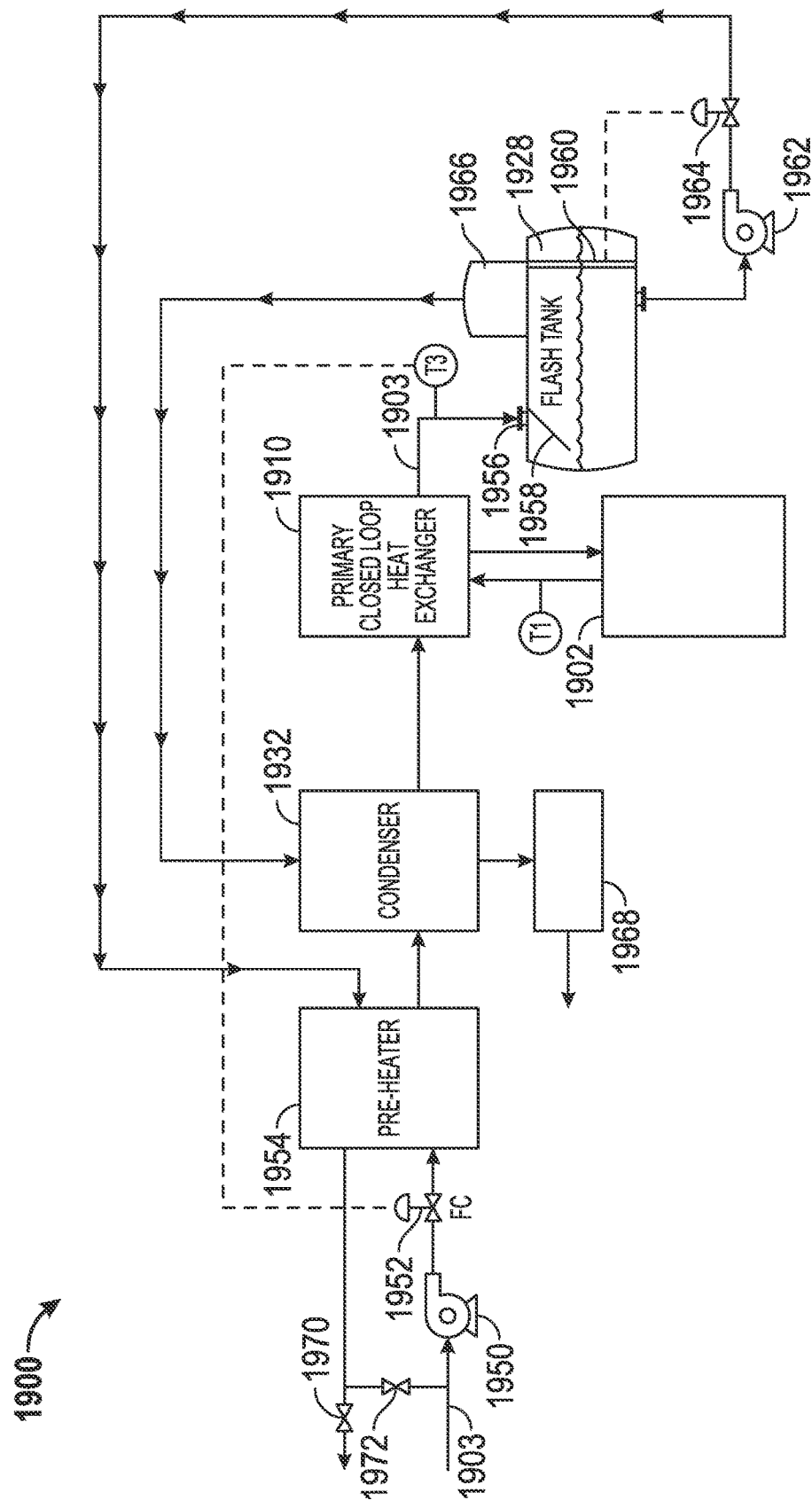
FIG. 19A illustrates one of many embodiments of a pasteurizing system for an industrial fluid.
Figure 19B:
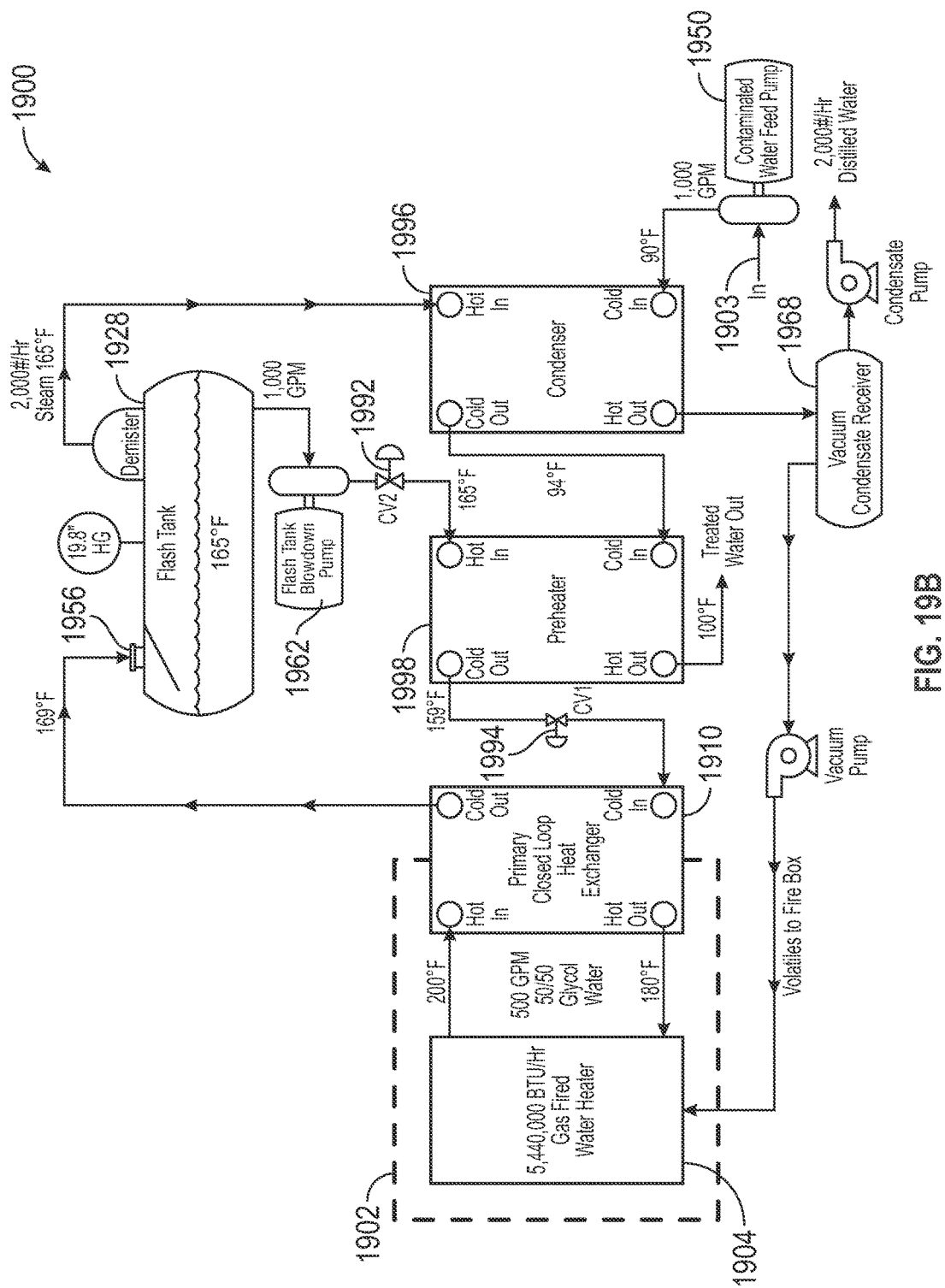
FIG. 19B illustrates another embodiment of a pasteurizing system for an industrial fluid utilizing a direct-fired boiler.

FIGS. 19A and 19B illustrate yet other embodiments utilizing various aspects of the inventions disclosed and taught herein. FIGS. 19A and 19B illustrate systems 1900 that may be used to "pasteurize" a fluid, such as industrial or oil field fluids. "Pasteurize," in the context of this disclosure, means to hold a fluid at a temperature, or above a temperature, for a period, or for at least a period, to destroy objectionable organisms in the fluid, without causing major chemical or functional alteration of the fluid. As an example, but without limitation or definition, a fluid may be "pasteurized" using system 1900 by holding the fluid for at least 15 seconds at a temperature of at least about 161° F.

In general, the system 1900 heats a fluid, such as, but not limited to, oil well fluids, to a temperature above 161° F. by passing the fluid through a fluid-to-fluid heat exchanger that is coupled to a heating subsystem. The heated fluid may then be flashed into its liquid and vapor forms through an orifice into a holding tank, where the liquid is held for at least about 15 seconds and preferably longer. It is preferred, but not required, that the tank be operated under negative pressure (i.e., a vacuum) to, among other things, remove oxygen and other gasses from the liquid. The vapor phase may pass through a demisting hood in which entrained liquid is separated and returned to the tank. The vapor (e.g., steam) may be passed to a fluid-to-fluid heat exchanger that functions to transfer heat from the vapor to the incoming fluid stream. The condensed vapor may be captured in a condensate receiver. After the degassed liquid portion has been held in the tank for 15 seconds or more at 161° F. or higher, the liquid portion may be removed and pumped through another fluid-to-fluid heat exchanger that may also function to transfer heat from the vapor to the incoming fluid stream and concomitantly cool the degassed, pasteurized fluid. Although the vapor portion and the degassed liquid portion may be used to heat (or preheat) the incoming fluid, the majority of the heating may occur in the fluid-to-fluid heat exchanger that that is coupled to a heating subsystem, such as any of those previously described with reference to FIGS. 1-18.

In this fashion, system 1900 is able to concentrate, pasteurize, degas and/or de-oxygenate a fluid, to prevent or minimize growth of objectionable aerobic and anaerobic organisms in the fluid.

Without limitation, the specific embodiment shown in FIG. 19A utilizes a direct-fired, closed loop, heating cycle 1902. FIGS. 6 and 12 illustrate preferred embodiments of a direct-fired, closed loop heating subsystems that may be used with system 1900. It will be appreciated that other heating subsystems, such as one or more of those disclosed herein, may be used based on the performance objectives of system 1900 to be achieved. As shown in FIGS. 6 and 12, the closed-loop heating subsystem may comprise a natural gas or other hydrocarbon-based boiler for heating a working fluid. It is preferred that the direct-fired fluid heater 1904 be a 5,000,000 BTU/hour natural gas water heater. It is contemplated that in certain applications the heater 1904 would be fired with waste gas from an oil field metered into the heater 1904 through a pressure control valve 604, 1204. Therefore, it is desirable that the heater 1904-burner controls allow substantially real-time gas-to-air adjustments to account for changing gas quality.

The working fluid in the closed-loop heating subsystem 1902 is preferably a 50/50 mixture of water and glycol. The heater 1904 may heat the working fluid to temperature T1, which may be, for example, 210° F. The heated working fluid is pumped 606, 1206 through a fluid-to-fluid heat exchanger 1910 to transfer heat from the working fluid to the worked fluid. Working fluid exits the heat exchanger 1910 and enters an atmospheric reservoir or accumulator 612, 1212. Pump 1908 draws working fluid out of the reservoir 1914 and feeds it back to heater 1904. A temperature transducer T1 cooperates with controllable valve 604, 1204 to control the temperature of the working fluid.

The fluid 1903 to be pasteurized (aka the "worked fluid") enters system 1900 at pump 1950, which may be, among other things, a conventional centrifugal pump. A controllable valve 1952, such as a globe valve, may be positioned after the pump 1950 to control the temperature of the worked fluid exiting the heat exchanger 1910. As shown in FIG. 19A, a temperature transducer T3 adjacent the exit of heat exchanger 1910 may be used to control valve 1952 in known fashion.

Typically, the worked fluid 1903 will enter the system 1900 at temperature between about 40° F. and 80° F. It is preferred, but not required that the incoming worked fluid 1903 be pre-heated. One source of energy for a pre-heater is the pasteurized worked fluid. As shown in FIG. 19A, the liquid portion of worked fluid 1903 exits the flash tank 1928 at between about 161° F. and 171° F., and preferably about 162° F. It is often desirable to cool this pasteurized fluid before it exits system 1900, and this fluid can be used to pre-heat the incoming fluid. A fluid-to-fluid heat exchanger 1954 can be used to transfer energy from the pasteurized fluid exiting the flash tank 1928 and to the incoming fluid. For example, and not for limitation, worked fluid entering the pre-heater 1954 at about 162° F. may be cooled to about 90° F. and the incoming fluid may be heated to about 130° F.-132° F.

Similarly, as will be discussed in more detail below, the vapor portion of the worked fluid from the flash tank 1928 can be used to preheat (or heat) further the incoming fluid by passing the vapor (e.g., steam) through a condensing heat exchanger 1932. For example, the vapor portion of the worked fluid may exit the flash tank at a temperature of about 162° F. and transfer some of its thermal energy in heat exchanger 1932 to the worked fluid, raising its temperature to about 142° F.

Regardless of the number of preheating stages used and regardless of the temperature of the incoming fluid, the worked fluid is primarily heated in fluid-to-fluid heat exchanger 1910 which thermally couples the incoming worked fluid 1903 to the heating subsystem 1902. The temperature of the worked fluid exiting the primary heat exchanger 1910 may be controlled by inlet valve 1952, which may be controlled based on the temperature of the exiting worked fluid. As discussed above, it is preferred that the temperature of the worked fluid exiting the primary heat exchanger 1910 is above 161° F. and preferably is about 172° F. It has been found that at temperatures above about 175° F., scaling of the internal surfaces of the heat exchangers and flash tank may occur. Once the worked fluid is at temperature, it is flashed into its vapor and liquid portions through orifice 1956 and into flash tank 1928. A baffle 1958 may be located in flash tank 1928. The liquid portion of the worked fluid 1903 settles in the bottom of the flash tank 1928 as shown in FIG. 19. A liquid level transducer 1960, such as a guided wave transducer may be used to sense the liquid level in the tank. 1928. Once the liquid level in the flash tank reaches a certain height, such as, for example, halfway, pump 1962 and controllable valve 1964 are energized and opened to extract pasteurized liquid from the flash tank 1928, which fluid may be passed through pre-heater 1954, as previously described, to both preheat the incoming fluid and cool the exiting worked fluid.

It will be appreciated that holding the worked fluid in flash tank 1928 at a temperature of about 172° F. for a period greater than 15 seconds will effectively pasteurize the worked fluid and kill all or substantially all of the aerobic and anaerobic objectionable organisms that may exist in the fluid.

In addition, it is preferred that the flash tank 1928 be operated at a sub-atmospheric pressure, such as, but not limited to 18 inches of vacuum. By operating the flash tank under a vacuum, oxygen and other gasses will be removed from the liquid portion of the worked fluid, along with the vapor portion of the worked fluid. It will be appreciated that by depleting or decreasing the amount of oxygen in the worked fluid, objectionable organisms may be destroyed and/or the ability of objectionable organisms to grow in the worked fluid will be minimized. The liquid may be agitated in known manner, as necessary, to achieve maximum de-oxygenation of the fluid.

As previously discussed, the vapor phase of the worked fluid and any gasses removed from the liquid portion of the worked fluid will pass through demister hood 1966 in which any entrained liquid will be separated from the vapor and returned to the flash tank. Thereafter, the vapor (e.g., steam) may be passed through a condensing heat exchanger to condense the vapor to its liquid form (e.g., distilled water) and concomitantly transfer heat to the incoming fluid. The exit of the condenser 1932 may be coupled to a condensate receiver and vacuum pump 1968. Any non-condensable gasses, such as oxygen, nitrogen (air) and light hydrocarbons may be passed to, for example, the direct fired boiler for incineration or combustion.

Having now described the basic layout of the embodiment shown in FIG. 19A, it will be appreciated that during startup of the system, exit valve 1970 may be closed and bypass valve 1972 may be opened so that an amount of incoming fluid 1903 may be circulated through the system until the fluid reaches predetermined temperature T3 of about, for example, 172° F. Once the system reaches its designed operating conditions, exit valve 1970 may be opened and bypass valve 1972 may be closed. At that point, control of the system is accomplished by temperature T3 at the outlet of the primary heat exchanger 1910 and associated controlled valve 1952 and liquid level control 1960 and its associated valve 1964.

The system 1900 functions as a chemical-free purification system for highly contaminated industrial fluids, such as raw water intended to be used as frac water. The system 1900 effectively removes/kills bacterial contaminates, free oxygen and the majority of grease and oils. It virtually eliminates the need for massive quantities of expensive and toxic biocides and oxygen scavengers.

Field testing of a prototype has demonstrated results of effectively reducing total live bacterial cell count from contaminated water at 369,100 cells per ML to under 500 cells per ML, without using chemical treatment agents; reducing dissolved oxygen from 12 PPM to under 1.5 PPM; and reducing grease and oils from 831 mg/ml to 2.4 mg/ml, and incinerates hydrocarbons in the process.

The system 1900 can be designed to heat frac fluids 20° F. at 12 bbl per minute. Higher heating rates are achievable, up to about 60° F., but at lower flow rates. The countercurrent, cold and heated fluid flows allow the system to heat fluids at high temperatures for bacterial elimination and then transfer the heat to the incoming cold fluid. The system functions economically and is cross-exchanged for energy efficiency. Total energy cost for natural gas and grid power rate is estimated at approximately $0.05/bbl. Using generator power and propane, costs to operate are approximately $0.15 per bbl. Further, up to three systems can be operated in parallel from a single control station by a single operator.

The system 1900 of FIG. 19A utilizes a closed loop, direct-fired hot water boiler system, isolating worked fluids from the high temperature boiler tubes that are exposed to the direct flames. Waters to be processed are heated by closed loop titanium Tranter® plate and frame heat exchanger. It is presently desired to keep fluid temperatures below the scale forming temperatures of most contaminated waters to be processed. After waters have been processed through the heat exchanger, they are then circulated through an orifice into a high vacuum flash tank. In the flash tank, the superheated waters flash off steam, which is condensed in a plate and frame heat exchanger cooled by cross-exchange with the cold, raw, contaminated water entering the system, thus recovering the majority of the treatment energy. Under the temperature, vacuum, and during the retention time encountered in the flash tank phase, the water is pasteurized and degassed, killing the organisms by heat and vacuum, and removing oxygen and volatile hydrocarbons. All of the vapors not condensed may be passed to the direct-fired boiler's firebox and are incinerated and harmlessly discharged into the atmosphere. The system 1900 facilitates de-aeration of fluid, e.g., $O_2$ removal at 175° F. and 21 to 23" Hg vacuum.

The pasteurizing system 1900 illustrated in FIG. 19B is similar to the system 1900 illustrated in FIG. 19A, and except as noted below, the description for FIG. 19A applies generally to FIG. 19B. In the system 1900 shown in FIG. 19B, the incoming contaminated fluid is pumped through the steam condenser 1996 to condense the steam that flashes out of tank 1928. The condensate is received in vacuum receiver 1968. The contaminated fluid exits the condenser at about 94° F. and enters preheater 1998, which transfer heat from the blowdown from flash tank 1928 to the contaminated fluid. The contaminated fluid exits the preheater at about 159° F., which can be controlled by valve 1994, and enters the primary heat exchanger 1910 to raise the temperature of the contaminated fluid to about 169° F. The heated contaminated fluid is flashed into tank 1928 where it resides at about 165° F. for a period determined by valve 1992 sufficient to eliminate or reduce objectionable organisms. The system 1900 of FIG. 19B is configured to generated 2,000 lbs of steam at about 165° F. Thus, FIGS. 19A and 19B illustrate another aspect of the present inventions for heating and manipulating fluids.

Figure 20A:
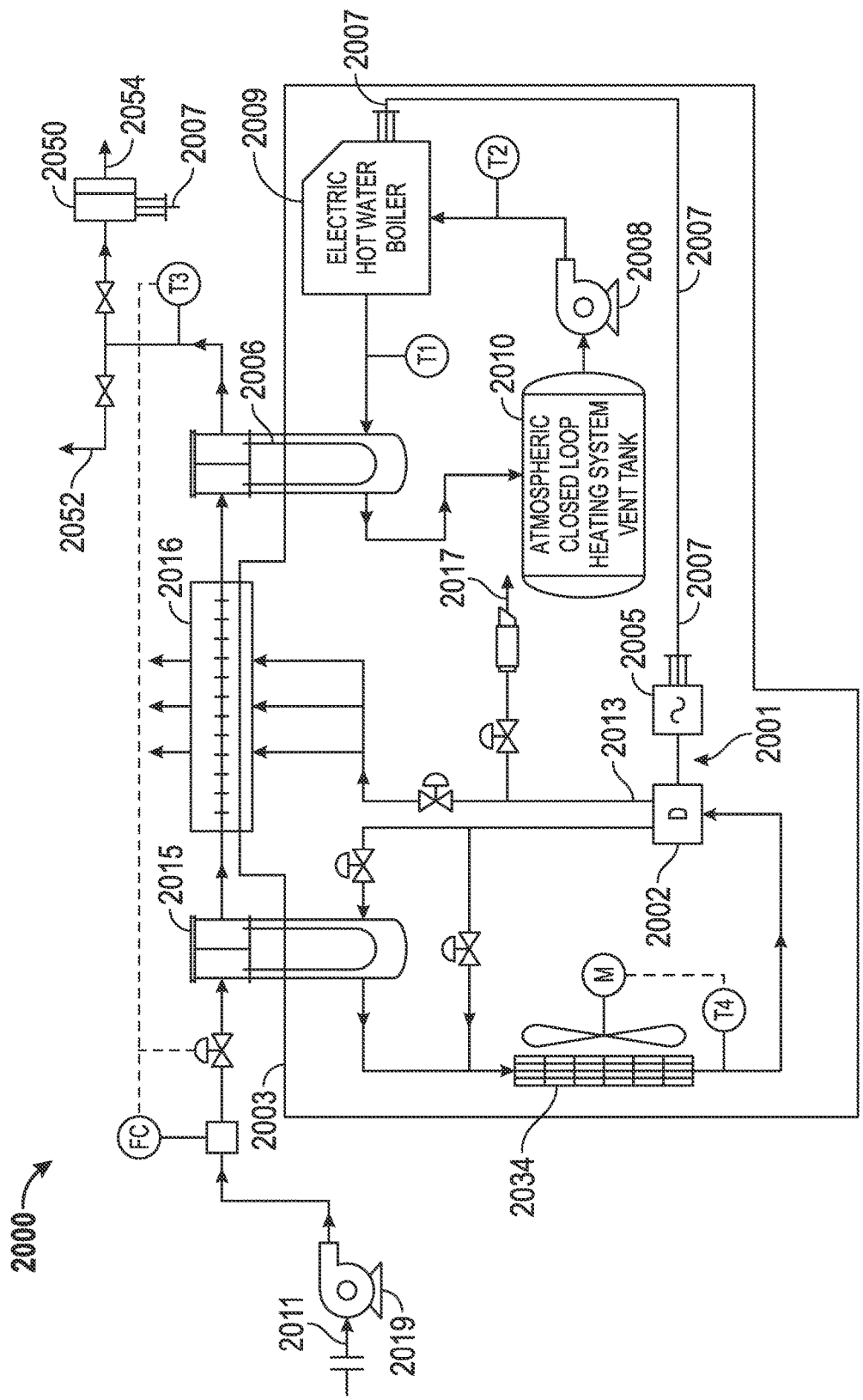
FIGS. 20A and 20B illustrate one of many embodiments of a fluid heating and pumping system comprising an electric boiler and diesel genset.
Figure 20B:
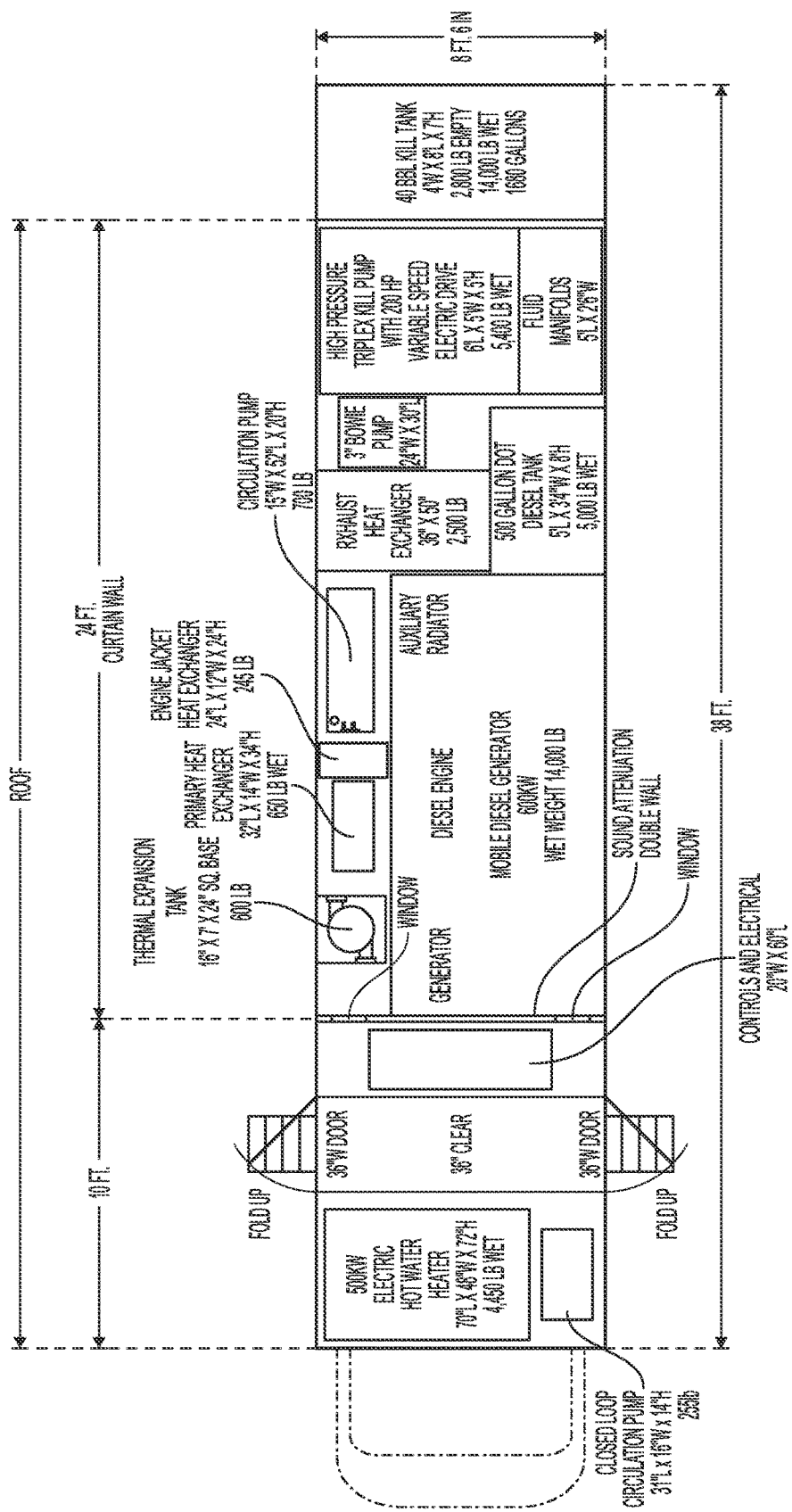

FIGS. 20A and 20B illustrate yet other embodiments of one or more of the inventions disclosed herein. More specifically, FIG. 20A shows system 2000 that may be used to heat fluid 2011, such as industrial or oil field fluids; and to pump or inject such fluids under high pressure. The system 2000 may comprise a closed-loop heating subsystem 2003 having a 600 kw diesel genset 2001 comprising a diesel engine 2002, which is preferably a 600 horsepower, Tier III, turbocharged, diesel engine coupled to an electric generator 2005 supplying, for example, 480 volt, 3-phase electricity 2007 The heating subsystem 2003 may also comprise a working fluid tank 2010, an electric boiler 2009, and a primary heat exchanger 2006, all plumbed in closed-loop fluid communication; an engine water jacket heat exchanger 2015; and an engine exhaust gas heat exchanger 2016. The fluid to be heated 2011 is plumbed through each of the heat exchangers as shown in FIG. 20A, such that the fluid may exit the primary heat exchanger 2006 at the desired or predetermined temperature. The system 2000 also may include a high pressure pump 2050, such as, but not limited to a Gardner Denver 200 Hp kill pump, or other type of pump, including other variable speed, plunger style kill pumps.

The engine water jacket heat exchanger 2015 may be a fluid-to-fluid heat exchanger, such as a plate and frame heat exchanger. One flow path is coupled to the diesel engine 2002 water jacket and engine radiator 2034. A second flow path couples the diesel engine 2002 water jacket and the water jacket heat exchanger 2015. It will be appreciated, as shown, that controllable (or manual) valves may be placed in the flow paths to force the water jacket coolant to flow solely through the engine radiator 2034, or to also flow through the water jacket heat exchanger 2015. It will be understood that when coolant flows through the heat exchanger 2015, heat may be transferred to the incoming fluid 2011. Alternately, when the heat exchanger 2015, is bypassed, the incoming fluid 2011 will not be pre-heated by heat exchanger 2015.

The engine exhaust 2013 may also be used as a source of heat to preheat or heat incoming fluid 2011. As shown in FIG. 20A, controllable (or manual) valves may direct the engine exhaust to a conventional muffler or muffler/catalyst exhaust system 2017 or to an air (i.e., exhaust gas)-to-fluid heat exchanger 2016.

Primary heating of the fluid 2011 occurs in primary heat exchanger 2006. Electricity 2007 from the generator 2005 powers the boiler 2009. The boiler 2009 heats the working fluid in the heating subsystem to a predetermined temperature T1 and then directs the heated fluid to a fluid-to-fluid heat exchanger 2006, such as a plate and frame heat exchanger, to heat the incoming fluid 2011. Cooled working fluid exits the heat exchanger 2006 and flows to a tank 2010. For the embodiment of FIG. 20A, the tank 2010 is unpressurized and vented to atmosphere, thereby operating at atmospheric conditions. The boiler working fluid is preferably a glycol and water mixture and is drawn from the tank 2010 by pump 2008 and pumped back to boiler 2009.

It will now be appreciated that system 2000 may be used to circulate a fluid 2052 into a tank (not shown) by running the diesel engine 2002 and generator 2005 to power incoming fluid pump 2019. Circulation of fluid 2011 can include, optionally, heating of the fluid as described above. Additionally, system 2000 can be used to inject high-pressure fluid 2054 into a well or other structure. High pressure injection of fluid 2054 can include, optionally, heating of the fluid as described above. FIG. 20B illustrates the system 2000 of FIG. 20A disposed on a conventional trailer of an 18 wheel tractor/trailer combination.

Figure 21A:
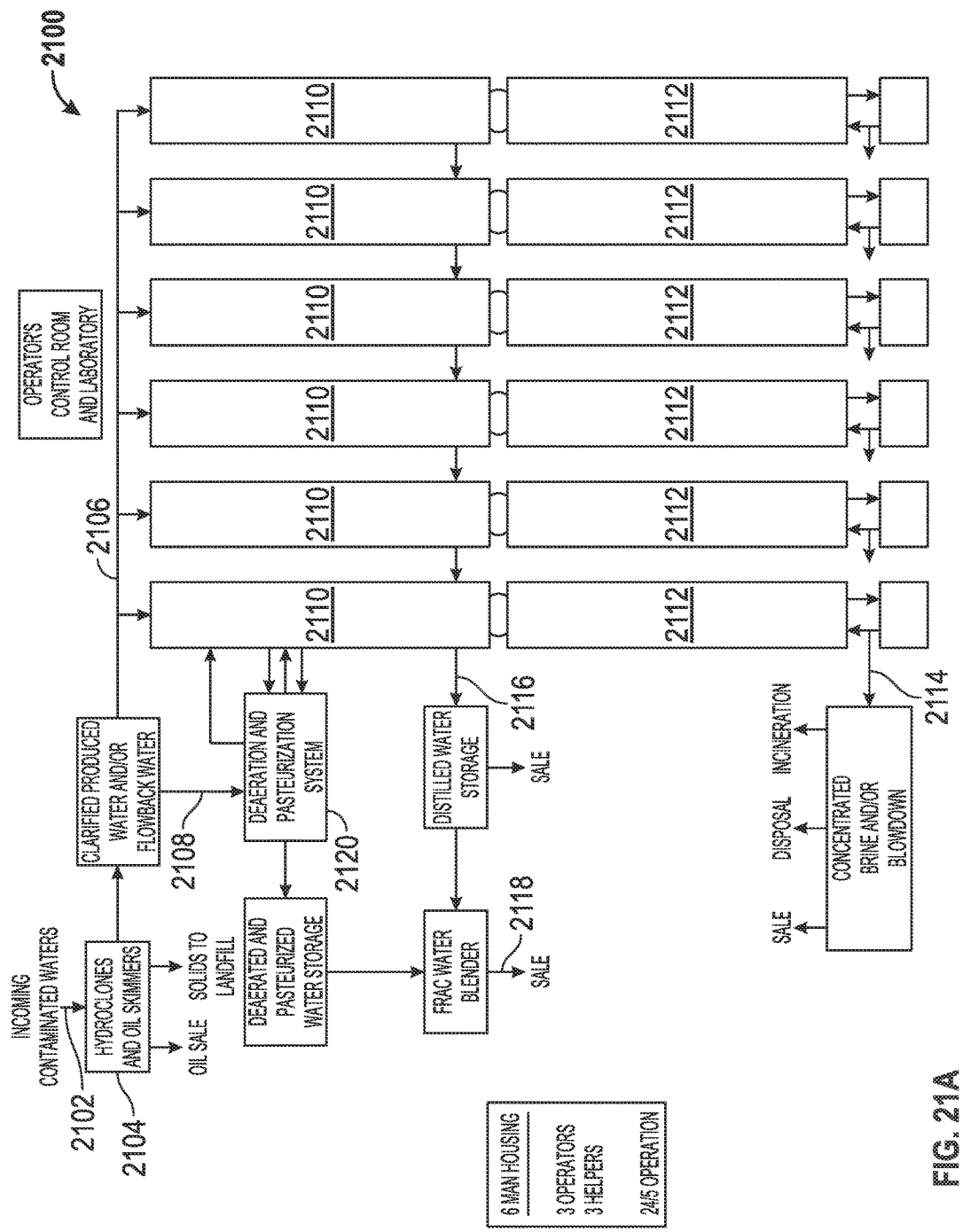
FIGS. 21A and 21B illustrate an embodiment of a system incorporating multiple subsystems incorporating the present inventions.
Figure 21B:
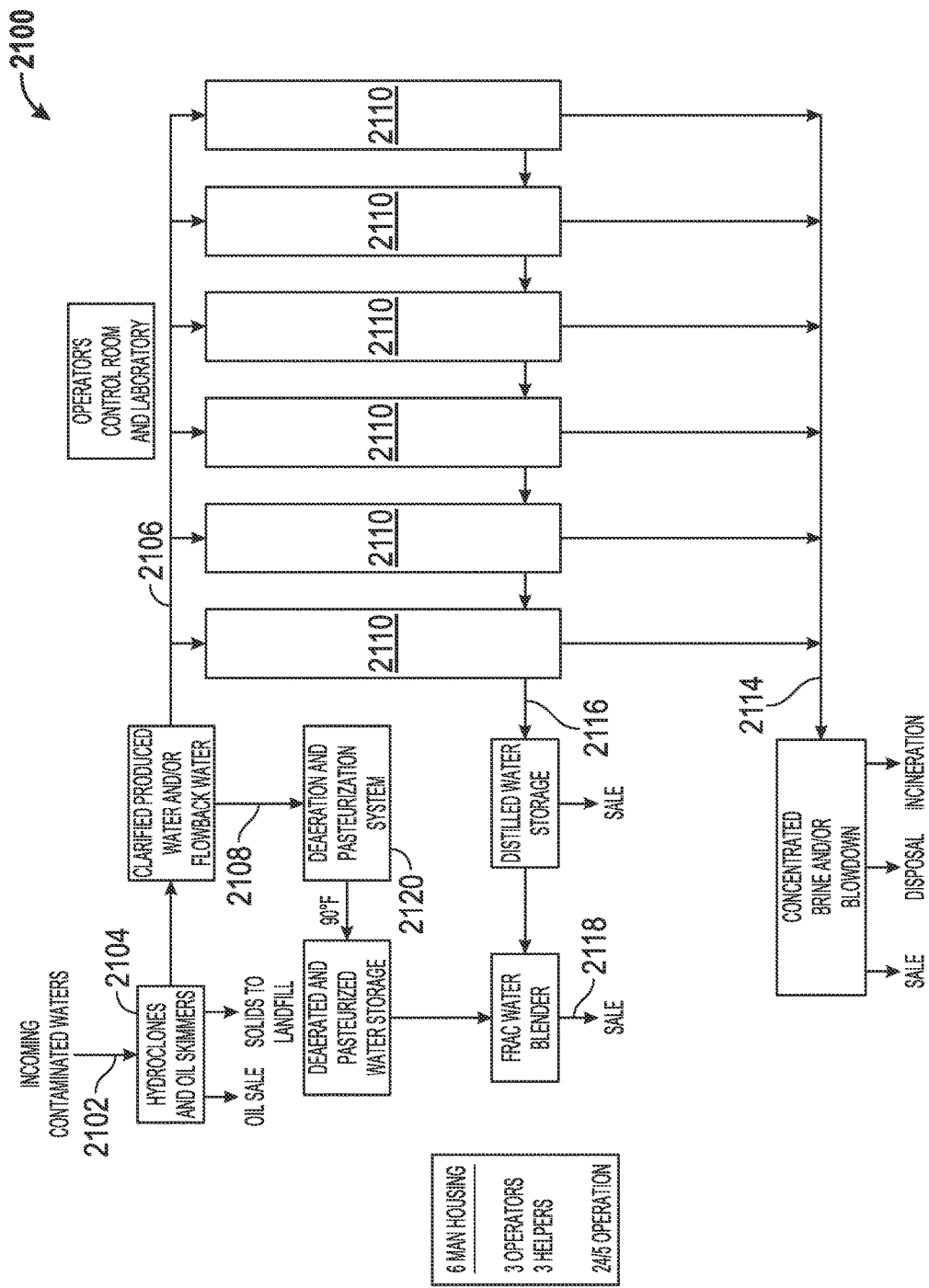

FIGS. 21A and 21B illustrate embodiments of the present inventions that are useful to recover, recycle and/or dispose of water-containing industrial fluids, such as, but not limited to, produced water or flowback water, by vacuum evaporation, de-aeration and/or pasteurization. It is contemplated that a system, such as described and shown in FIGS. 21A and 21B, can process about 13,600 barrels/day of fluid, assuming the fluid is about 60,000 ppm TDS (predominately NaCl).

As illustrated in FIGS. 21A and 21B, system 2100 may be modular in nature and construction to allow adjustability in capacity and to increase transportability. For example, and without limitation, the system 2100 may comprise multiple, such as six, evaporation systems 2110. In FIG. 21A, any of the evaporation systems illustrated in FIGS. 7 through 12B may be used. Preferably, the embodiment of FIG. 21A utilizes an evaporation system 2110 such as described and illustrated in FIG. 12A, including evaporation towers 2112. Preferably, the embodiment of FIG. 21B uses a multiple-effect evaporator system 2110 such as described and illustrated in FIG. 12B. By combining multiple evaporator systems 2110 in this manner, my inventions can be scaled to a particular job based on the amount of fluid to be treated, the location of the job and other such factors.

It will be seen from FIGS. 21A and 21B that contaminated fluid 2102, such as produced water may enter the modular system 2100 at a first process point 2104, which may include hydrocyclones, oil skimmers, filters and other devices configured to remove particulate and other macro contaminants from the fluid. Solid and/or particulates removed from the fluid may be passed to a landfill or otherwise properly disposed of. Any oil recovered from the fluid 2102 may be commercialized or disposed of as allowed or desired. A portion 2106 of the fluid 2102 may then be passed to the evaporation systems 2110 previously described to remove and/or disposed of, through evaporation, a desired portion of the fluid 2102. As described for the evaporation systems illustrated in FIGS. 7-12B, in the case of produced water, the evaporation systems 2110 will produce a concentrated fluid 2114, such as brine or 10 lb brine, which may be sold or disposed of as desired and/or allowed.

In addition, as described for the evaporation systems illustrated in FIGS. 7-12B, the evaporation systems 2110 will produce distilled water or condensate 2116, which may be sold or disposed of or used as desired and/or allowed. Use of condensate 2116 by process 2100 will be described below.

Another portion 2108 of the water 2102 may be passed to a pasteurization system 2120, such as any one of the systems described and illustrated in FIGS. 19A and 19B. Once the fluid 2102 has been pasteurized, it may be blended with condensate 2116, as desired or needed, to produce frac water 2118 for use or sale.

Thus, the systems 2100 illustrated in FIGS. 21A and 21B may utilize various aspects of my inventions disclosed and taught herein to dispose of fluid by evaporation; to generate condensate for use or sale; to pasteurize fluid for use or sale; and to reduce the amount of remaining fluid or solids that need to be disposed of.

My inventions have been described in the context of preferred and other embodiments and not every possible embodiment of the invention has been described. A person of skill in this art having the benefit of this disclosure will now be able to mix and match various aspects of the embodiments described herein to accomplish a particular task. A person of skill will also be able to take the teachings of this disclosure and rearrange components within an embodiment or take components from other embodiments to create new embodiments, all without departing form the spirit of my inventions or the scope of the appended claims. For example, and without limitation, a person of skill having benefit of this disclosure will appreciate and understand that any of the heating subsystems described and illustrated in FIGS. 1 through 6B may be used with any of the fluid evaporation systems or subsystems described and illustrated in FIGS. 7 through 12C; or with any of the fluid concentration systems or subsystems described and illustrated in FIGS. 13 through 16; or with any of the fluid fractioning systems or subsystems described and illustrated in FIGS. 17 and 18; or with any of the fluid pasteurizing systems or subsystems described and illustrated in FIGS. 19A and 19B; any of the fluid systems or subsystems described and illustrated in FIGS. 20A through 21B. Those person of skill having benefit of this disclosure will be encouraged to combine these various systems and subsystems to achieve the functional and operational targets for each implementation of my inventions. In addition, various of these systems and subsystems, such as, but not limited to, when used to produce frac water from produced water, may benefit from conventional filtration techniques including mechanical filtration and/or reverse osmosis filtration. While a developer's efforts to select and combine these various systems and subsystems might be complex and time-consuming, such efforts would be, nevertheless, a normal undertaking for those of ordinary skill in the art having benefit of this disclosure.

It will be appreciated that the fluid transporting conduits used with embodiments of the present invention may comprise piping, tubing and other fluid communications means of conventional and unconventional design and material. For most systems described herein it is preferred that the piping material be carbon steel, when possible. Of course, the operating environment may dictate the material that is used. The circulation pumps may be of any conventional or unconventional design, but for the produced water embodiment described herein, it is preferred that the pumps be hydraulic, pneumatic, electrical or direct drive (e.g., engine PTO) centrifugal pumps. Metering or positive displacement pumps, such as, but not limited to, Moyno pumps, may be used at various locations throughout the system as desired or required by the specific implementation. Detection or determination of system properties or characteristics, such as, but not limited to, pressure, temperature, density, flow rate, or Total Dissolved Solids, may be acquired through conventional instrumentation and data acquisition techniques, including manual techniques, as are well known to those of skill in the art.

Modifications and alterations to the described embodiments are now readily available and apparent to those of skill in the art. The disclosed and undisclosed embodiments are not intended to limit or restrict the scope or applicability of the inventions conceived of, but rather, in conformity with the patent laws, I intend to protect all such modifications and improvements to the full extent that such falls within the scope or range of equivalents of the following claims. If a word or phrase used in a claim does not appear in reference to a figure herein, and such word or phrase has no specialized meaning in the relevant art, then any such word should be construed according to its ordinary and customary meaning and any such phrase should be construed according to the ordinary and customary meaning of each word in the phrase.

What is claimed is:

1. A method of removing water from a mixture, comprising:
providing a first fluid-to-fluid heat exchanger having first and second fluid paths there through;
providing a closed-loop heating subsystem comprising:
a primary heat source,
a fluid pump, and
a fluid reservoir
all configured and arranged to heat a fluid to less than an atmospheric boiling point of the fluid and to circulate the fluid through the first fluid path of the first fluid-to-fluid heat exchanger;
providing an evaporation subsystem comprising:
a tank configured to operate at a pressure less than atmospheric pressure and configured to separate a mixture into its liquid and vapor phases, and
a second fluid-to-fluid heat exchanger;
pumping a first water containing mixture through the second heat exchanger to heat the first mixture to a first temperature;
transferring heat from the closed-loop heating fluid to a second mixture in the first fluid-to-fluid heat exchanger to heat the second mixture to a second temperature greater than the first temperature;
separating the second mixture heated to the second temperature into its liquid and vapor phases in the tank;
extracting at least a portion of the vapor from the tank;
pumping at least a first portion of the liquid phase from the tank through the second heat exchanger to transfer heat from the liquid phase to the first mixture;
mixing at least a second portion of the liquid phase from the tank with the first mixture heated in the second heat exchanger to create the second mixture; and
pumping the second mixture through the second fluid path of the first fluid-to-fluid heat exchanger.

2. The method of claim 1, wherein the primary heat source is an open flame boiler.

3. The method of claim 2, wherein the open flame boiler is configured to combust natural gas.

4. The method of claim 1, wherein the primary heat source comprises waste heat from an internal combustion engine.

5. The method of claim 4, wherein the internal combustion engine is a diesel engine.

6. The method of claim 1, wherein the primary heat source comprises a water brake dynamometer driven by an internal combustion engine.

7. The method of claim 1, wherein the primary heat source comprises an internal combustion engine, electrical generator and an electric boiler.

8. The method of claim 7, wherein the internal combustion engine is a diesel engine.

9. The method of claim 1, further comprising condensing the extracted vapor and thereafter discarding at least a portion of the condensed vapor.

10. A method of removing water from a water-containing mixture, comprising:
providing a closed-loop heating subsystem comprising a hydrocarbon-fueled heater, a fluid pump, a fluid expansion tank and a first path through a primary fluid-to-fluid heat exchanger, all configured to heat and circulate a fluid to less than an atmospheric boiling point of the fluid;
providing a mixture subsystem comprising a second path through the primary fluid-to-fluid heat exchanger, and a tank configured to separate heated mixture into its vapor and liquid phases;
preheating a first water-containing mixture to a first temperature;
transferring heat from the closed-loop fluid to a second mixture in the primary fluid-to-fluid heat exchanger to raise the temperature of the second mixture to a second temperature greater than the first temperature;
creating vacuum in the tank;
separating the second mixture into its liquid and vapor phases in the tank;
mixing at least a first portion of the liquid from the tank with the preheated first mixture to create the second mixture;
drawing the vapor from the tank into a condensing heat exchanger;
transferring heat from the vapor to condense the vapor to liquid; and
extracting at least a second portion of the liquid from the tank.

11. The method of claim 10, wherein the heater is an open flame boiler.

12. The method of claim 11, wherein the open flame boiler is configured to combust natural gas.

13. The method of claim 10, wherein the heater comprises waste heat.

14. The method of claim 13, wherein the waste heat is from an internal combustion engine.

15. The method of claim 14, wherein the internal combustion engine is a diesel engine.

16. The method of claim 10, wherein the heater comprises a water brake dynamometer driven by an internal combustion engine.

17. The method of claim 10, wherein the heater comprises an internal combustion engine, electrical generator and an electric boiler.

18. The method of claim 17, wherein the internal combustion engine is a diesel engine.

19. The method of claim 10, further comprising removing condensed vapor from the evaporation subsystem.

* * * * *